US009451639B2

(12) United States Patent
Li et al.

(10) Patent No.: US 9,451,639 B2
(45) Date of Patent: Sep. 20, 2016

(54) METHOD AND APPARATUS FOR COVERAGE ENHANCEMENT FOR A RANDOM ACCESS PROCESS

(71) Applicant: Samsung Electronics Co., Ltd., Suwon-si, Gyeonggi-do (KR)

(72) Inventors: Ying Li, Richardson, TX (US); Aris Papasakellariou, Houston, TX (US); Boon Loong Ng, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 14/319,711

(22) Filed: Jun. 30, 2014

(65) Prior Publication Data

US 2015/0016312 A1 Jan. 15, 2015

Related U.S. Application Data

(60) Provisional application No. 61/844,752, filed on Jul. 10, 2013, provisional application No. 61/864,366, filed on Aug. 9, 2013, provisional application No. 61/883,857, filed on Sep. 27, 2013, provisional (Continued)

(51) Int. Cl.
*H04W 74/08* (2009.01)
*H04L 5/14* (2006.01)
*H04W 74/00* (2009.01)

(52) U.S. Cl.
CPC ............ *H04W 74/0833* (2013.01); *H04L 5/14* (2013.01); *H04W 74/006* (2013.01)

(58) Field of Classification Search
CPC ................................................. H04W 74/0833
USPC .......................................................... 370/280
See application file for complete search history.

(56) References Cited

U.S. PATENT DOCUMENTS

2006/0269024 A1* 11/2006 Dominique .......... H04B 1/7115
375/350
2007/0140178 A1* 6/2007 Jung ..................... H04L 1/1671
370/335

(Continued)

FOREIGN PATENT DOCUMENTS

KR  10 2002-0078069 A  10/2002
KR  10-2006-0014012 A  2/2006

(Continued)

OTHER PUBLICATIONS

International Search Report dated Oct. 17, 2014 in connection with International Patent Application No. PCT/KR2014/006209, 7 pages.

(Continued)

*Primary Examiner* — Melvin Marcelo
*Assistant Examiner* — Peter Solinsky

(57) ABSTRACT

Methods and apparatus are provided for a User Equipment (UE) and a base station in communication with each other to determine parameters for a Random Access (RA) process. The base station informs the UE through a System Information Block (SIB) of a number of resource sets for RA preamble transmission by the UE. Each resource set is associated with a number of repetitions for a RA preamble transmission, with a maximum number of RA preamble transmissions, and with a number of repetitions the base station transmits a response to a RA preamble reception. The SIB also informs an association between a range of path-loss values and a number of RA preamble repetitions. The UE determines a number of repetitions for a first RA preamble transmission from its path-loss measurement.

20 Claims, 30 Drawing Sheets

Related U.S. Application Data application No. 61/893,039, filed on Oct. 18, 2013, provisional application No. 61/898,292, filed on Oct. 31, 2013, provisional application No. 61/933,738, filed on Jan. 30, 2014.

(56) References Cited

U.S. PATENT DOCUMENTS

| | | | | |
|---|---|---|---|---|
| 2009/0181661 | A1* | 7/2009 | Kitazoe | H04W 48/12 455/418 |
| 2009/0215459 | A1* | 8/2009 | Kuo | H04W 74/002 455/436 |
| 2010/0080307 | A1* | 4/2010 | Lee | H04L 27/2607 375/259 |
| 2010/0142470 | A1* | 6/2010 | Park | H04L 1/188 370/329 |
| 2011/0019694 | A1* | 1/2011 | Kwon | H04L 27/2613 370/474 |
| 2011/0045837 | A1* | 2/2011 | Kim | H04W 74/0833 455/452.1 |
| 2011/0051840 | A1* | 3/2011 | Hooki | H04L 1/08 375/295 |
| 2011/0110240 | A1* | 5/2011 | Bergquist | H04W 74/0866 370/241.1 |
| 2011/0292816 | A1* | 12/2011 | Lee | H04W 16/24 370/252 |
| 2013/0010619 | A1* | 1/2013 | Fong | H04W 74/002 370/252 |
| 2013/0215861 | A1 | 8/2013 | Nam et al. | |
| 2013/0258958 | A1* | 10/2013 | Dinan | H04W 56/0045 370/329 |
| 2013/0279412 | A1* | 10/2013 | Webb | H04W 74/0833 370/328 |
| 2014/0004849 | A1* | 1/2014 | Su | H04W 24/08 455/423 |
| 2014/0198742 | A1* | 7/2014 | Baldemair | H04W 74/0833 370/329 |
| 2014/0269532 | A1* | 9/2014 | Huang | H04W 74/0833 370/329 |
| 2015/0057011 | A1* | 2/2015 | Di Girolamo | H04W 16/14 455/454 |
| 2015/0173105 | A1* | 6/2015 | Bergstrom | H04W 74/006 370/329 |
| 2015/0236932 | A1* | 8/2015 | Yu | H04W 24/08 370/252 |

FOREIGN PATENT DOCUMENTS

| | | |
|---|---|---|
| WO | WO 2007/052972 A1 | 5/2007 |
| WO | WO 2012/044240 A1 | 4/2012 |
| WO | WO 2012/057531 A2 | 5/2012 |

OTHER PUBLICATIONS

Written Opinion of International Searching Authority dated Oct. 17, 2014 in connection with International Patent Application No. PCT/KR2014/006209, 5 pages.

* cited by examiner

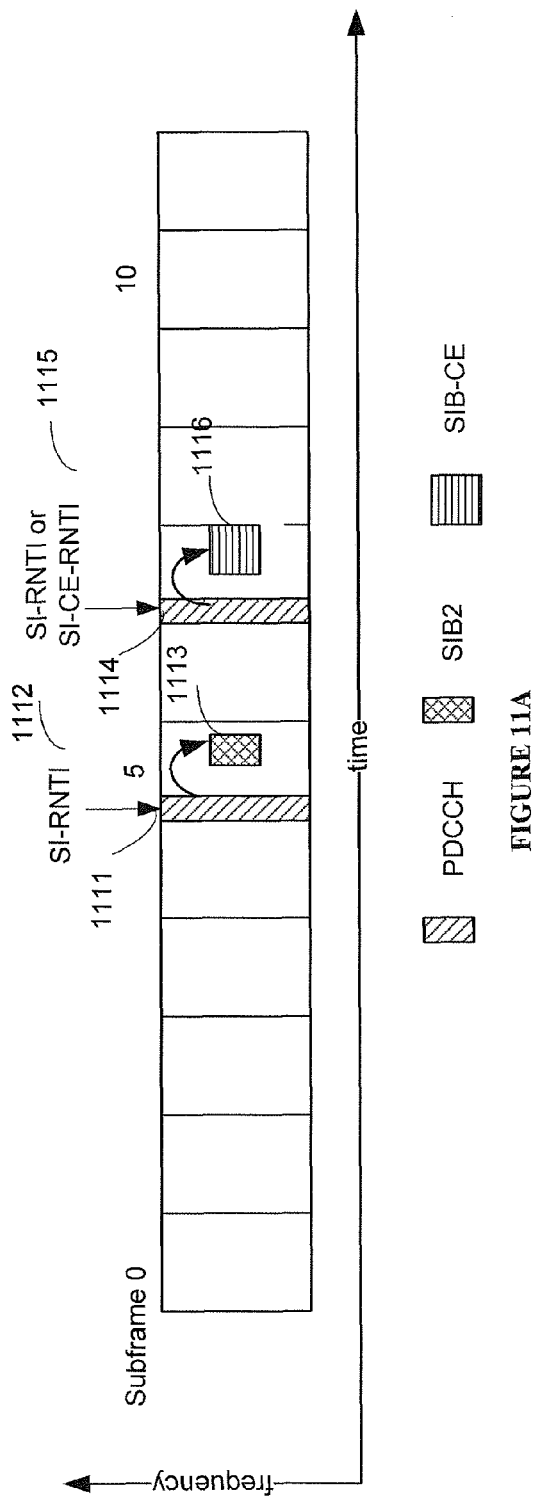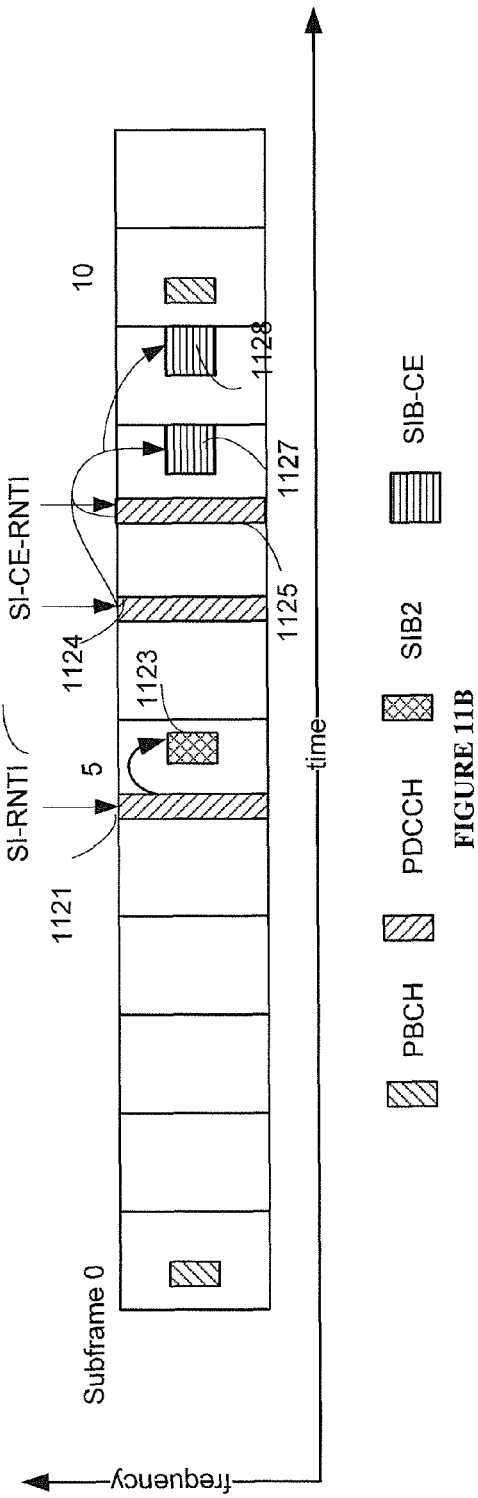
FIGURE 11A
FIGURE 11B

METHOD AND APPARATUS FOR COVERAGE ENHANCEMENT FOR A RANDOM ACCESS PROCESS

CROSS-REFERENCE TO RELATED APPLICATION AND CLAIM OF PRIORITY

The present application claims priority under 35 U.S.C. §119(e) to: U.S. Provisional Patent Application Ser. No. 61/844,752 filed Jul. 10, 2013, entitled "COVERAGE ENHANCEMENT FOR MACHINE TYPE COMMUNICATIONS;" U.S. Provisional Patent Application Ser. No. 61/864,366 filed Aug. 9, 2013, entitled "COVERAGE ENHANCEMENT FOR MACHINE TYPE COMMUNICATIONS;" U.S. Provisional Patent Application Ser. No. 61/883,857 filed Sep. 27, 2013, entitled "COVERAGE ENHANCEMENT FOR MACHINE TYPE COMMUNICATIONS;" U.S. Provisional Patent Application Ser. No. 61/893,039 filed Oct. 18, 2013, entitled "SUPPORT FOR SCALABE COVERAGE ENHANCEMENT FOR MACHINE TYPE COMMUNICATIONS;" U.S. Provisional Patent Application Ser. No. 61/898,292 filed Oct. 31, 2013, entitled "COVERAGE ENHANCEMENT FOR MACHINE TYPE COMMUNICATIONS;" and U.S. Provisional Patent Application Ser. No. 61/933,738 filed Jan. 30, 2014, entitled "COVERAGE ENHANCEMENT FOR MACHINE TYPE COMMUNICATIONS." The content of the above-identified patent documents are incorporated herein by reference.

TECHNICAL FIELD

The present application relates generally to wireless communications and, more specifically, to a random access process for coverage limited user equipment.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

This disclosure provides methods and apparatus to support coverage enhancements for a random access process.

In a first embodiment, a method includes receiving, by a User Equipment (UE) from an Enhanced NodeB (eNB), a signal providing a System Information Block (SIB) that informs a number of resource sets for Random Access (RA) preamble transmission in a resource from a resource set. Each resource set includes time, frequency, and code resources and is associated with a number of repetitions for a RA preamble transmission and with a maximum number of RA preamble transmissions. In response to receiving the SIB, the UE determines a first number of repetitions for a transmission of a RA preamble, a corresponding first resource set, and a corresponding first maximum number of transmissions and a second number of repetitions for a transmission of a RA preamble, a corresponding second resource set, and a corresponding second maximum number of transmissions. The second number of repetitions is larger than the first number of repetitions. The method additionally includes transmitting by the UE, the RA preamble, either in a resource from a first resource set and with a first number of repetitions, until the UE receives a response for a RA preamble transmission with the first number of repetitions or until the first maximum number of RA preamble transmissions is reached and the RA preamble, or in a resource from the second resource set and with the second number of repetitions, after the first maximum number of RA preamble transmissions is reached.

In a second embodiment, a method includes receiving, by a User Equipment (UE) from an enhanced NodeB (eNB), a signal providing a System Information Block (SIB) that informs a number of resource sets for Random Access (RA) preamble transmission in a resource from a resource set. Each resource set includes time, frequency, and code resources and is associated with a number of repetitions for a RA preamble transmission and with a maximum number of RA preamble transmissions. The method further includes determining by the UE a number of repetitions for a transmission of a RA preamble and a corresponding resource set. The method additionally includes transmitting by the UE the RA preamble for the number of repetitions in a resource from the resource set. The method also includes receiving, by the UE from the eNB, a response to the RA preamble transmission. The UE receives the response for a maximum number of repetitions that is associated in the SIB with the number of repetitions for the RA preamble transmission.

In a third embodiment, a User Equipment (UE) includes a receiver, a controller, and a transmitter. The receiver is configured to receive from an enhanced NodeB (eNB) a signal providing a System Info'illation Block (SIB) that informs a number of resource sets for Random Access (RA) preamble transmission in a resource from a resource set. Each resource set includes time, frequency, and code resources and is associated with a number of repetitions for a RA preamble transmission and with a maximum number of RA preamble transmissions. The controller is configured to determine a first number of repetitions for a transmission of a RA preamble, a corresponding first resource set, and a corresponding first maximum number of transmissions. The controller also is configured to determine a second number of repetitions for a transmission of a RA preamble, a corresponding second resource set, and a corresponding second maximum number of transmissions. The second number of repetitions is larger than the first number of repetitions. The transmitter is configured to transmit, to the eNB, in a resource from the first resource set and with the first number of repetitions, the RA preamble until the apparatus receives a response for a RA preamble transmission with the first number of repetitions or until the first maximum number of RA preamble transmissions is reached. The transmitter also is configured to transmit to the eNB, in a resource from the second resource set and with the second number of repetitions, the RA preamble after the first maximum number of RA preamble transmissions is reached.

In a fourth embodiment, a User Equipment (UE) includes a receiver, a controller, and a transmitter. The receiver is configured to receive from an enhanced NodeB (eNB) a signal providing a System Information Block (SIB) that informs a number of resource sets for Random Access (RA) preamble transmissions. Each resource set is associated with a number of repetitions for a RA preamble transmission in a resource from the resource set and with a number of repetitions for a response to the RA preamble transmission. The receiver is also configured to receive, from the eNB, a response to the RA preamble transmission. The response is received for a maximum number of repetitions that is associated in the SIB with the number of repetitions for the RA preamble transmission. The controller is configured to determine a number of repetitions for a transmission of a RA preamble and a corresponding resource set. The transmitter configured to transmit the RA preamble for the number of repetitions in a resource from the resource set.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 11A, 11B and 11C illustrates an example operation for an eNB to convey PRACH resource configurations to a UE according to this disclosure;

DETAILED DESCRIPTION

FIGS. 1 through 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: 3GPP TS 36.211 v 12.1.0, "E-UTRA, Physical channels and modulation" (REF 1); 3GPP TS 36.212 v12.1.0, "E-UTRA, Multiplexing and Channel coding" (REF 2); 3GPP TS 36.213 v12.1.0, "E-UTRA, Physical Layer Procedures" (REF 3); 3GPP TS 36.214 v11.1.0, "E-UTRA, Physical Layer Measurements" (REF 4); 3GPP TS 36.331 v12.1.0, "E-UTRA, Radio Resource Control (RRC) Protocol Specification." (REF 5); and 3GPP TS 36.101 v.11.1.0 "E-UTRA, User Equipment (UE) radio transmission and reception" (REF 6).

This disclosure relates to a random access process for DL or UL coverage limited User Equipments (UEs). A wireless communication network includes a DownLink (DL) that conveys signals from transmission points, such as base stations or enhanced NodeBs (eNBs), to UEs. The wireless communication network also includes an UpLink (UL) that conveys signals from UEs to reception points, such as eNBs.

Figure 1:
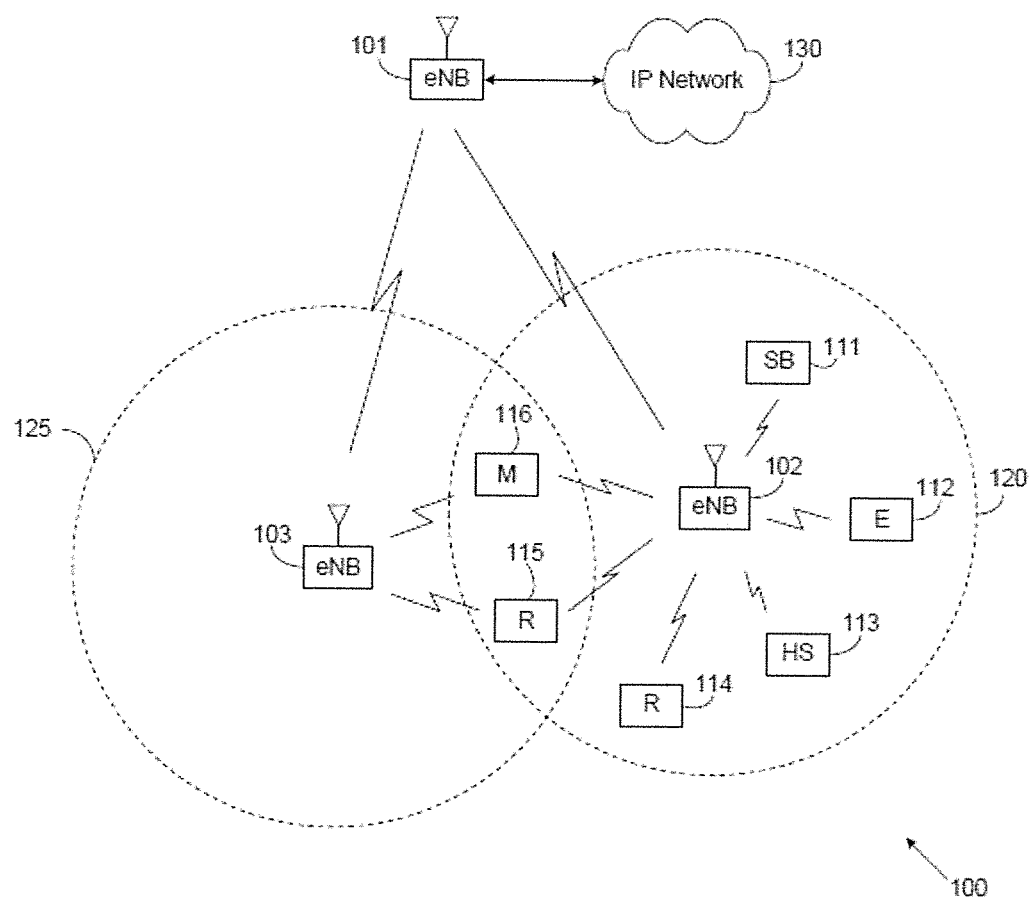
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." A UE, may be fixed or mobile and may be a cellular phone, a personal computer device, and the like. For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, various components of the network 100 (such as the eNBs 101-103 and/or the UEs 111-116) support the adaptation of communication direction in the network 100, and can provide coverage enhancement for their PRACH process.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
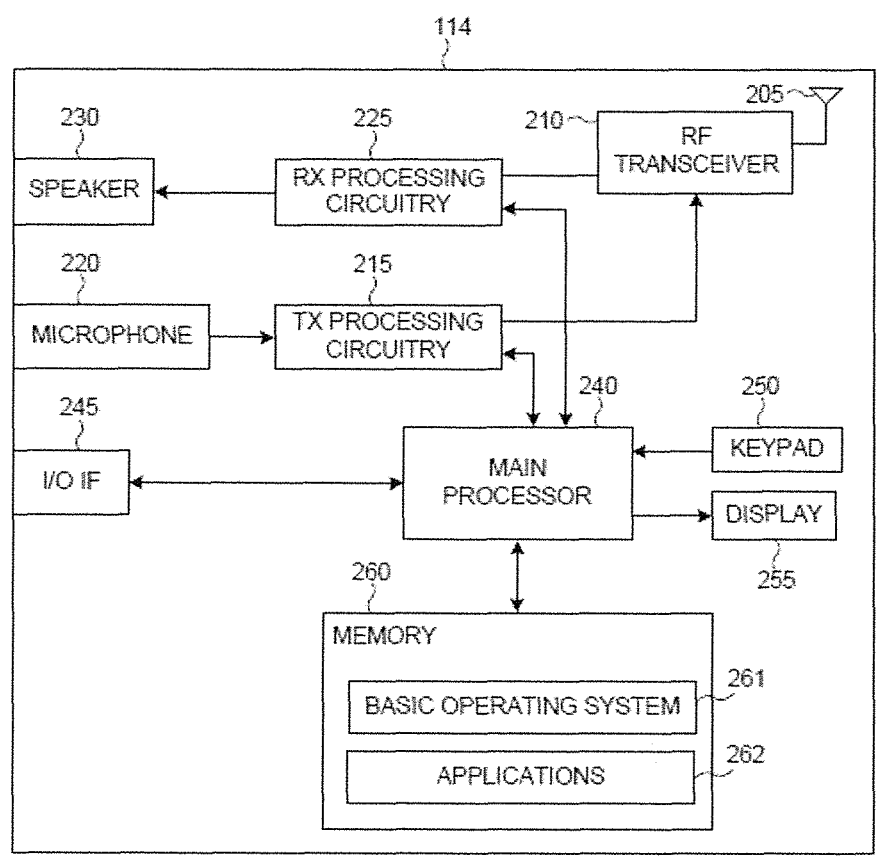
FIG. 2 illustrates an example user equipment (UE) according to this disclosure.

FIG. 2 illustrates an example UE 114 according to this disclosure. The embodiment of the UE 114 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and can execute the basic OS program 261 stored in the memory 260 in order to control the overall operation of the UE 114. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260. The main processor 240 can move data into or out of the memory 260 as required by an executing process. In some embodiments, the main processor 240 is configured to execute the applications 262 based on the OS program 261 or in response to signals received from eNBs, other UEs, or an operator. The main processor 240 is also coupled to the I/O interface 245, which provides the UE 114 with the ability to connect to other devices such as laptop computers and handheld computers. The I/O interface 245 is the communication path between these accessories and the main processor 240.

The main processor 240 is also coupled to the keypad 250 and the display unit 255. The operator of the UE 114 can use the keypad 250 to enter data into the UE 114. The display 255 may be a liquid crystal display or other display capable of rendering text and/or at least limited graphics, such as from web sites. The display 255 could also represent a touchscreen.

The memory 260 is coupled to the main processor 240. Part of the memory 260 could include a random access memory (RAM), and another part of the memory 260 could include a Flash memory or other read-only memory (ROM).

As described in more detail below, the transmit and receive paths of the UE 114 (implemented using the RF transceiver 210, TX processing circuitry 215, and/or RX processing circuitry 225) support a PRACH process in a normal mode or in a coverage enhanced mode.

Although FIG. 2 illustrates one example of UE 114, various changes may be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the UE 114 configured as a mobile telephone or smartphone, UEs could be configured to operate as other types of mobile or stationary devices. In addition, various components in FIG. 2 could be replicated, such as when different RF components are used to communicate with the eNBs 101-103 and with other UEs.

Figure 3:
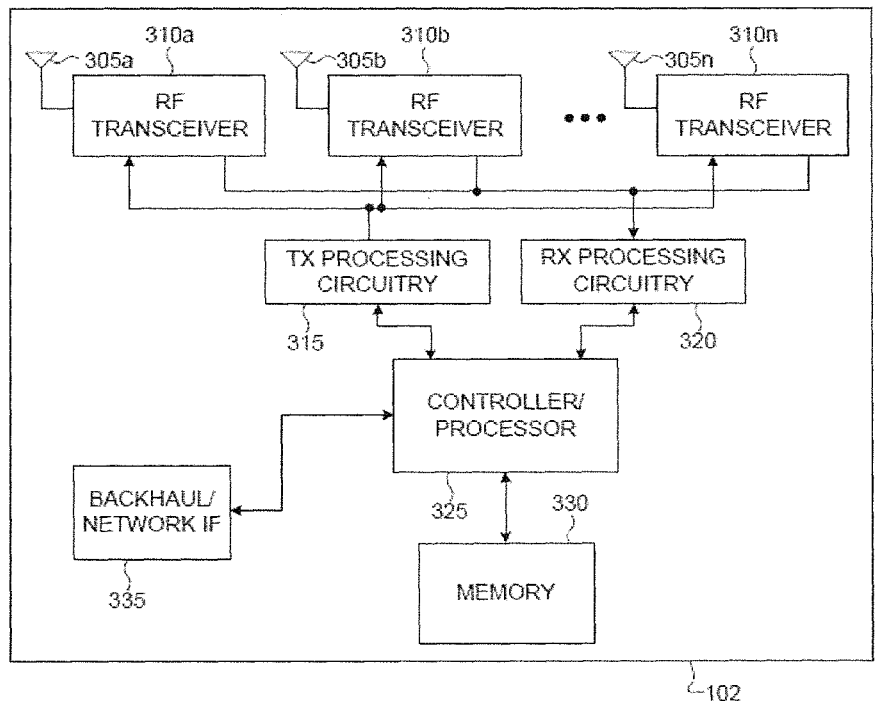
FIG. 3 illustrates an example enhanced NodeB (eNB) according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 (implemented using the RF transceivers 310a-310n, TX processing circuitry 315, and/or RX processing circuitry 320) support a PRACH process in a normal mode or in a coverage enhanced mode.

Although FIG. 3 illustrates one example of an eNB 102, various changes may be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

In some wireless networks, DL signals include data signals conveying information content, control signals conveying DL Control Information (DCI), and Reference Signals (RS), which are also known as pilot signals. An eNB, such as eNB 102, can transmit data information or DCI through respective Physical DL Shared CHannels (PDSCHs) or Physical DL Control CHannels (PDCCHs). The eNB, such as eNB 102, can transmit one or more of multiple types of RS, including a UE-Common RS (CRS), a Channel State Information RS (CSI-RS), and a DeModulation RS (DMRS). A CRS can be transmitted over a DL system BandWidth (BW) and can be used by UEs to demodulate data or control signals or to perform measurements. To reduce CRS overhead, eNB 102 can transmit a CSI-RS with a smaller density in the time or frequency domain than a CRS. For Interference Measurements (IMs), CSI-IM resources associated with a Zero Power CSI-RS (ZP CSI-RS) can be used. A UE, such as UE 114, can determine CSI-RS transmission parameters through higher-layer signaling from an eNB, such as eNB 102. DMRS is transmitted only in the BW of a respective PDSCH or PDCCH, and UE 114 can use the DMRS to demodulate information in a PDSCH or PDCCH. An eNB 102 can also indicate to a UE 114, through a System Information Block (SIB) transmitted to a group of UEs, that a DL Sub-Frame (SF), in each period of 10 successive SFs, is configured as a Multicast-Broadcast Single Frequency Network (MBSFN) SF, in which case the UE 114 can expect a CRS to be transmitted only in the first one or two symbols of the SF.

In some wireless networks, UL signals can include data signals conveying information content, control signals conveying UL Control Information (UCI), RS, and signaling related to a UE 114 establishing a connection to a network. The UE 114 can transmit data information or UCI through a respective Physical UL Shared CHannel (PUSCH) or a Physical UL Control CHannel (PUCCH). If the UE 114 simultaneously transmits data information and UCI, the UE 114 can multiplex both in a PUSCH. The UCI can include Hybrid Automatic Repeat reQuest ACKnowledgement (HARQ-ACK) information indicating correct or incorrect detection of data Transport Blocks (TBs) in a PDSCH, Scheduling Request (SR) information indicating whether a UE 114 has data in its buffer, and Channel State Information (CSI) enabling the eNB 102 to select appropriate parameters for PDSCH transmissions to a UE 114. HARQ-ACK information can include a positive ACKnowledgement (ACK) in response to a correct PDCCH or data TB detection, a Negative ACKnowledgement (NACK) in response to an incorrect data TB detection, and an absence of a PDCCH detection (DTX) that can be implicit or explicit. A DTX could be implicit if a UE 114 does not transmit a HARQ-ACK signal. The UL RS can include DMRS and Sounding RS (SRS)—see also REF 3.

A DCI format in a respective PDCCH can schedule a PDSCH or a PUSCH transmission conveying data information to or from a UE, respectively. In some implementations, a UE, such as UE 114, monitors a DCI format 1A for PDSCH scheduling and a DCI format 0 for PUSCH scheduling. These two DCI formats are designed to have the same size and can be jointly referred to as DCI format 0/1A. Another DCI format, DCI format 1C, in a respective PDCCH can schedule a PDSCH providing System Information Blocks (SIBs) to a group of UEs for network configuration parameters, or a response to a Random Access (RA) by UEs, or paging information to a group of UEs, and so on. Another DCI format, DCI format 3 or DCI format 3A (jointly referred to as DCI format 3/3A) can provide Transmission Power Control (TPC) commands to a group of UEs for transmissions of respective PUSCHs or PUCCHs.

A DCI format typically includes Cyclic Redundancy Check (CRC) bits in order for a UE, such as UE 114, to confirm a correct detection. A DCI format type is identified by a Radio Network Temporary Identifier (RNTI) that scrambles the CRC bits. For a DCI format scheduling a PDSCH or a PUSCH to a single UE, such as UE 114, the RNTI can be a Cell RNTI (C-RNTI) and serves as a UE identifier. For a DCI format scheduling a PDSCH conveying a System Information (SI) to a group of UEs, the RNTI can be an SI-RNTI. For a DCI format scheduling a PDSCH providing a response to a RA from a group of UEs, the RNTI can be an RA-RNTI. For a DCI format scheduling a PDSCH paging a group of UEs, the RNTI can be a P-RNTI. For a DCI format providing TPC commands to a group of UEs, the RNTI can be a TPC-RNTI. Each RNTI type can be configured to a UE 114 through higher-layer signaling such as RRC signaling (and a C-RNTI is unique to each UE).

Figure 4:
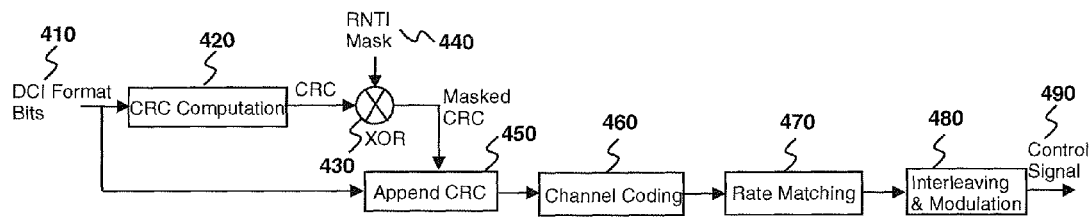
FIG. 4 illustrates an example encoding process for a downlink control information (DCI) format for use with an eNB according to this disclosure.

FIG. 4 illustrates an example encoding process for a DCI format for use with an eNB according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE.

As shown in FIG. 4, eNB 102 separately codes and transmits each DCI format in a respective PDCCH. A RNTI for a UE 114, for which a DCI format is intended, masks a CRC of a DCI format codeword in order to enable the UE 114 to identify that a particular DCI format is intended for the UE 114. The CRC of (non-coded) DCI format bits 410 is determined using a CRC computation operation 420, and the CRC is masked using an exclusive OR (XOR) operation 430 between CRC bits and RNTI bits 440. The XOR operation 430 is defined as XOR(0,0)=0, XOR(0,1)=1, XOR(1,0)=1, XOR(1,1)=0. The masked CRC bits are appended to DCI format information bits using a CRC append operation 450. Channel coding is performed using a channel coding operation 460 (such as convolutional coding), followed by a rate matching operation 470 applied to allocated resources. Interleaving and modulation operations 480 are performed, and the output control signal 490 is transmitted. In the present example, both a CRC and an RNTI include 16 bits; however, it will be understood that either or both of the CRC and the RNTI could include more or fewer than 16 bits.

Figure 5:
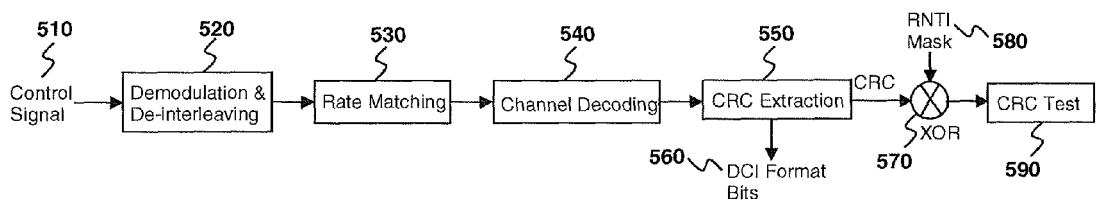
FIG. 5 illustrates an example decoding process for a DCI format for use with a UE according to this disclosure.

FIG. 5 illustrates an example decoding process for a DCI format for use with a UE according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE.

As shown in FIG. 5, UE 114 performs reverse operations of an eNB transmitter to determine whether the UE 114 has a DCI format assignment in a DL SF. A received control signal 510 is demodulated and the resulting bits are de-interleaved at operation 520. A rate matching applied at an eNB transmitter is restored through operation 530, and data is decoded at operation 540. After decoding the data, DCI format information bits 560 are obtained after extracting CRC bits 550. The DCI format information bits are de-masked 570 by applying the XOR operation with a UE RNTI 580. UE 114 performs a CRC test 590. If the CRC test passes, UE 114 determines that the DCI format corresponding to the received control signal 510 is valid and determines parameters for signal reception or signal transmission. If the CRC test does not pass, UE 114 disregards the presumed DCI format.

PDCCH transmissions can be either Time Division Multiplexed (TDM) or Frequency Division Multiplexed (FDM) with PDSCH transmissions. For convenience of explanation, the TDM case is considered herein. However, embodiments of the present disclosure are also applicable to other multiplexing methods. To avoid a PDCCH transmission to a first UE, such as UE 114, blocking a PDCCH transmission to a second UE, such as UE 115, a location of each PDCCH transmission in the time-frequency domain of a DL control region is not unique. As a consequence, each UE can perform multiple decoding operations to determine whether there are PDCCHs intended for the UE 114 in a DL SF. The resources carrying each PDCCH can be grouped into Control Channel Elements (CCEs) in the logical domain. For a given number of DCI format bits, a number of CCEs for a respective PDCCH depends on a channel coding rate (Quadrature Phase Shift Keying (QPSK) is assumed as the modulation scheme). The eNB 102 can use a lower channel coding rate and more CCEs for a PDCCH transmission to a UE experiencing low DL Signal-to-Interference and Noise Ratio (SINR) than to a UE experiencing a high DL SINR. The CCE aggregation levels can, for example, include 1, 2, 4, and 8 CCEs.

DCI formats conveying information to multiple UEs, such as DCI format 1C or DCI format 3/3A, can be transmitted in a UE Common Search Space (CSS). If enough CCEs remain after the transmission of DCI formats conveying information to multiple UEs, a CSS can also convey DCI formats 0/1A for scheduling respective PDSCHs or PUSCHs to individual UEs. A DCI format conveying scheduling information for a PDSCH reception or a PUSCH transmission to a single UE, such as DCI format 0/1A, can be transmitted in a UE Dedicated Search Space (UE-DSS). For example, a CSS can include 16 CCEs and support 2 DCI formats with 8 CCEs, 4 DCI formats with 4 CCEs, or 1 DCI format with 8 CCEs and 2 DCI formats with 4 CCEs. The CCEs for a CSS are placed first in the logical domain (prior to a CCE interleaving).

One of the fundamental requirements in an operation of a communication system is a capability for UE 114 to request a connection setup; such request is commonly referred to as random access. Random access is used for several purposes, including: initial access when establishing a radio link; re-establishing a radio link after radio-link failure, handover when UL synchronization needs to be established to a new cell, UL synchronization, UE positioning based on UL measurements, and as a SR if no dedicated SR resources have been configured on a PUCCH. Acquisition of uplink timing at a serving eNB 102 is one of the main objectives of random access; when establishing an initial radio link, a random-access process also serves for assigning a unique identity, referred to as Cell Radio Network Temporary Identifier (C-RNTI), to UE 114. Either a contention based (multiple UEs may use same resources) or a contention-free (a dedicated resource is used by a UE) scheme can be used.

Figure 6:
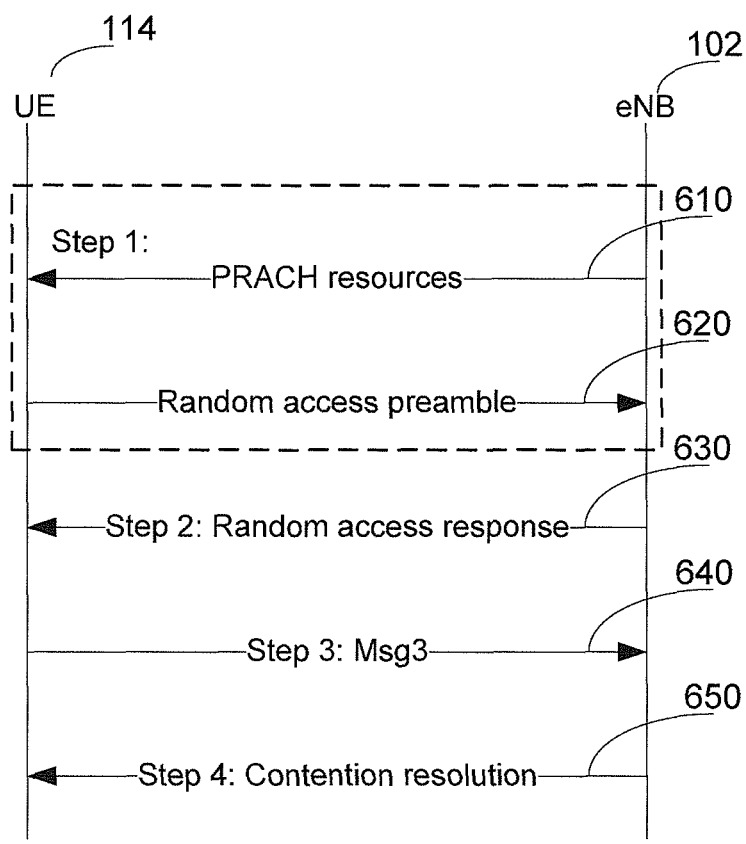
FIG. 6 illustrates a random access procedure according to this disclosure.

FIG. 6 illustrates a random access procedure 600 according to this disclosure. While the signaling diagram depicts a series of sequential signals, unless explicitly stated, no inference should be drawn from that sequence regarding specific order of performance, performance of steps or portions thereof serially rather than concurrently or in an overlapping manner, or performance of the signals depicted exclusively without the occurrence of intervening or intermediate signals. The process depicted in the example depicted is implemented by a transmitter chains in, for example, a UE and a base station.

As shown in FIG. 6, in Step 1, UE 114 acquires information of Physical Random Access CHannel (PRACH) resources 610 from an eNB 102. UE 114 determines resources for a Random-Access (RA) preamble transmission 620 (also referred to as PRACH preamble) and transmits the RA preamble to eNB 102. In Step 2, UE 114 receives a random access response 630 from eNB 102. In Step 3, UE 114 transmits what is referred to as message 3 (Msg3) 640 to eNB 102. In Step 4, eNB 102 and UE 114 perform contention resolution 650. The contention resolution 650 message also is referred to as message 4 (Msg4).

In certain embodiments, in Step 1, UE 114 acquires a SIB that conveys information for PRACH resources 610 as well as RA preamble format (examples are presented herein below with respect to FIG. 7). PRACH resources 610 consist of a set of: SFs where a PRACH transmission can occur; RBs where a PRACH can be transmitted in the frequency domain; and a number of (64-$N_{cf}$) Zadoff-Chu (ZC) sequences from which UE 114 can select to use for generating a PRACH transmission ($N_{cf}$ is a number of ZC sequences reserved by eNB 102 to use for contention-free PRACH transmissions). UE 114 identifies PRACH resources 610 and a RA preamble format and transmits the RA preamble 620 on the determined PRACH resources thereby allowing eNB 102 to estimate transmission timing for the UE. UL synchronization is necessary as otherwise a UE cannot properly communicate other UL signaling to an eNB.

In Step 2, upon detecting a RA preamble 620 transmitted from UE 114, eNB 102 transmits a Random Access Response (RAR) 630 including a Timing Advance (TA) command for UE 114 to adjust its transmission timing, also transmits an RA preamble that eNB 102 detected, an UL grant assigning UL resources to UE 114 for the UE 114 to transmit a message 3 (Msg3) of the random-access process, and a Temporary C-RNTI (TC-RNTI). Upon failing to detect a transmitted RA preamble in a RAR within a RAR time window configured by eNB 102, UE 114 retransmits a new RA preamble (i.e., repeats the first step). UE 114 also can perform power ramping to adjust a transmission power of UE 114.

In Step 3, UE 114 transmits Msg3 640 in a PUSCH where Msg3 640 can include a TC-RNTI. The exact contents of Msg3 depends upon the state of UE 114, in particular, whether UE 114 previously connected to eNB 102 or not.

In Step 4, eNB 102 transmits a contention-resolution message 650 to UE 114 in a PDSCH. Step 4 also resolves any contention issue that may arise when multiple UEs, try to access a network using a same RA preamble.

Once a random access process is successful, the TC-RNTI is converted to C-RNTI. Step 1 uses physical-layer processing specifically designed for a random access process. The subsequent three steps utilize a same physical-layer processing as for PDSCH or PUSCH transmissions after UE 114 has established communication with eNB 102 where Step 2 does not use HARQ retransmissions while Step 3 and Step 4 use HARQ retransmissions.

Contention-free random access can only be used for reestablishing UL synchronization upon DL data arrival, handover, and positioning. Only Step 1 and Step 2 of the random access process described above are used as there is no need for contention resolution in a contention-free scheme where Step 2 can deliver C-RNTI instead of TC-RNTI.

Figure 7:
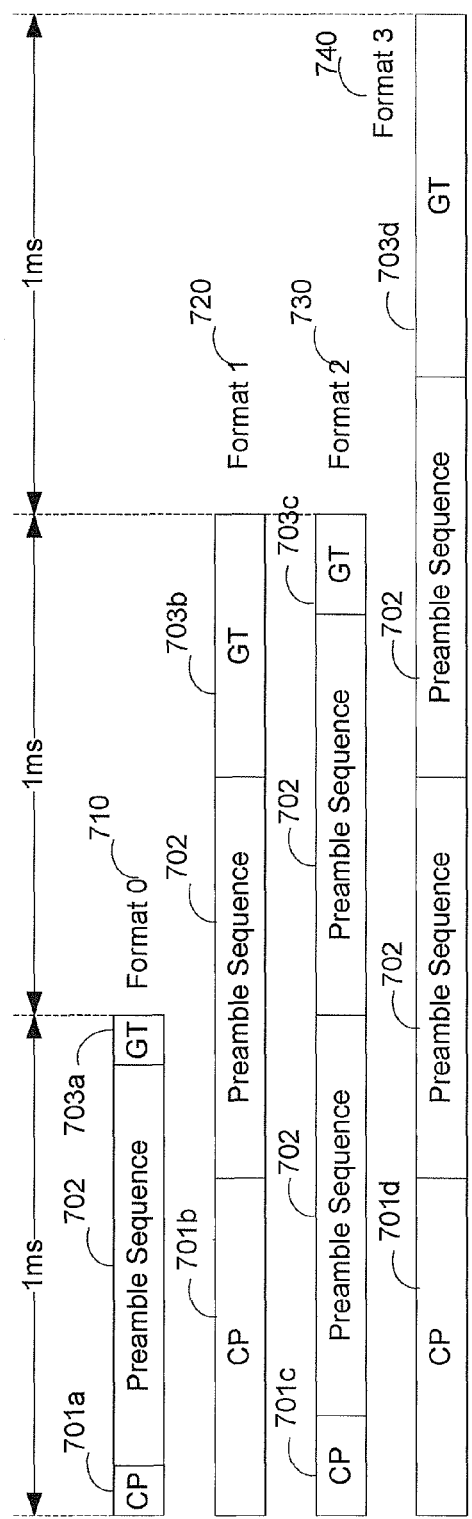
FIG. 7 illustrates RA preamble formats according to this disclosure.

FIG. 7 illustrates four examples of RA preamble formats according to this disclosure. The embodiments of the RA preamble formats shown in FIG. 7 are for illustration only. Other embodiments could be used without departing from the scope of the present disclosure.

As shown in FIG. 7, each RA preamble format includes a Cyclic Prefix (CP) 701, a preamble sequence 702, and a Guard Time (GT) 703. Each preamble sequence 702 has a length of 0.8 milliseconds (ms). In format 0 710, both CP 701*a* and GT 703*a* are equal to approximately 0.1 ms. In format 1 720, the CP 701*b* is 0.68 ms and GT 703*b* is 0.52 ms. In format 2 730 and format 3 740, the preamble sequence 702 is repeated once to provide energy gain. In format 2, both CP 701*c* and GT 703*c* equal approximately 0.2 ms. In format 3, the CP 701*d* is 0.68 ms and GT 703*d* is 0.72 ms.

Figure 8:
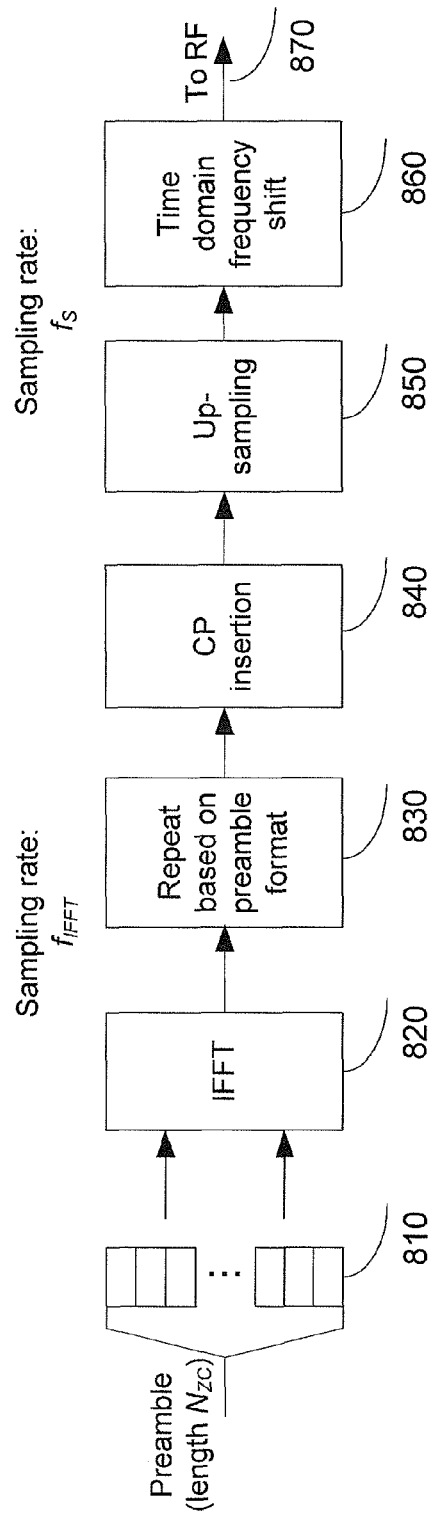
FIG. 8 illustrates an example RA preamble transmission from a UE according to this disclosure.

FIG. 8 illustrates an example for RA preamble transmission from a UE according to this disclosure. The embodiment of the RA preamble transmission shown in FIG. 8 is for illustration only. Other embodiments could be used without departing from the scope of the present disclosure.

As shown in FIG. 8, a RA preamble 810 with length $N_{ZC}$ is processed by an Inverse Fast Fourier Transform (IFFT) 820. The RA preamble 810 is repeated based on a preamble format 830 if the preamble format is format 2, or format 3. For preamble format 0 or format 1, the RA preamble 810 is not repeated. CP is inserted 840 prior to the RA preamble 810 and upsampling 850 is subsequently applied. Finally, a time domain frequency shift 860 is applied and a signal is transmitted by Radio Frequency (RF) 870 processing circuitry of UE 114.

Figure 9:
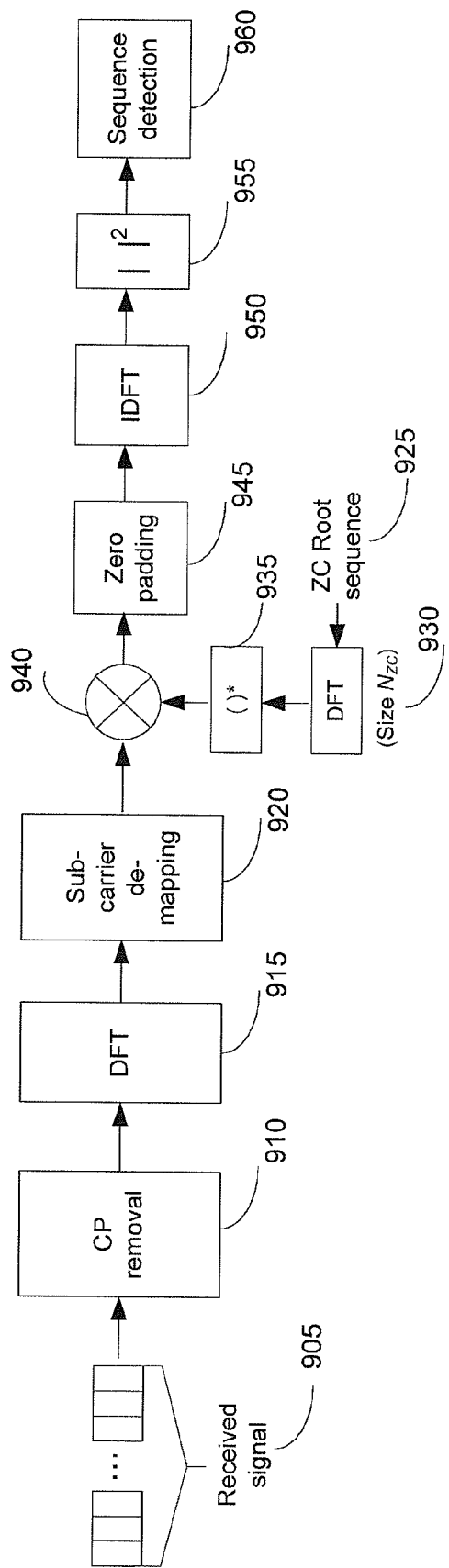
FIG. 9 illustrates an example RA preamble detection at an eNB according to this disclosure.

FIG. 9 illustrates an example for RA preamble detection at an eNB according to this disclosure. The embodiment of the RA preamble detection shown in FIG. 9 is for illustration only. Other embodiments could be used without departing from the scope of the present disclosure.

As shown in FIG. 9, a received signal 905 is first processed by CP removal unit 910 and subsequently a Discrete Fourier Transform (DFT) is applied by DFT unit 915. The output of the DFT unit 915 is processed by subcarrier de-mapping in unit 920 to obtain the sub-carriers of a RA preamble transmission. Correlation with a replica of a RA preamble that is the conjugate of the DFT 930 of ZC root sequence 925 is then applied by correlator 940, where the ZC sequence 925 can be each of the available sequences for contention based random access for contention based PRACH transmissions. Zero padding 945 is applied to the correlator output. The result of the zero padding 945 is processed by Inverse DFT (IDFT). The energy of the IDFT output is obtained 955 and finally a sequence detection unit 960 determines whether a RA preamble was transmitted based on a detected energy for a respective sequence where, for example, a sequence 925 resulting a largest energy, or an energy above a threshold, can be considered as detected. When there are multiple receiver antennas, respective received signals can be combined 955 before sequence detection 960.

From a physical layer (L1) perspective, a random access process encompasses a transmission of RA preamble and a RAR. Remaining messages are scheduled for transmission by higher layers on a PDSCH or a PUSCH and may not be considered as part of L1 random access process. A PRACH occupies six RBs in a SF or set of consecutive SFs reserved for RA preamble transmissions. The eNB 102 is not prohibited from scheduling data in RBs reserved for RA preamble transmission. The following steps are required for a L1 random access process:

1. A L1 RE process triggered upon a request of a preamble transmission by higher layers.
2. A RA preamble index, a target RA preamble received power (PREAMBLE_RECEIVED_TARGET_POWER), a corresponding RA-RNTI and a PRACH resource indicated by higher layers as part of the request.

A preamble transmission power $P_{PRACH}$ determined as in Equation 1:

$$P_{PRACH} = \min\{P_{CMAXc}(i), \text{PREAMBLE\_RECEIVED\_TARGET\_POWER} + PL_c\}[\text{dBm}] \quad (1),$$

where $P_{CMAXc}(i)$ is a configured UE transmit power for SF i of serving cell c (see also REF 6) and $PL_c$ is a DL path-loss estimate calculated in a UE for serving cell c (see also REF 4).

3. A preamble sequence selected from a preamble sequence set using the preamble index.
4. A single preamble transmitted using the selected preamble sequence with transmission power $P_{PRACH}$ on the indicated PRACH resource.
5. Detection of a PDCCH with indicated RA-RNTI attempted during a window controlled by higher layers. If detected, a corresponding transport block is passed to higher layers that parse the transport block and indicate an uplink grant to the physical layer. This is referred to as RAR Grant.

For a L1 random access process, an UL transmission timing for a UE after a random access preamble transmission is as follows:

a. If a PDCCH with associated RA-RNTI is detected in SF n and a corresponding transport block in a PDSCH contains a response to a transmitted preamble sequence, a UE, according to information in the response, transmits a transport block in a PUSCH in a first SF $n+k_1$, $k_1 \geq 6$, if a UL delay field in RAR is set to zero where $n+k_1$ is a first available UL SF for PUSCH transmission. The UE postpones a PUSCH transmission to a next available UL SF after $n+k_1$ if the UL delay field is set to 1.

b. If a RAR is received in SF n and a corresponding transport block in a PDSCH does not contain a response to a transmitted preamble sequence, a UE, if requested by higher layers, transmits a new preamble sequence no later than in SF n+5.

c. If no RAR is received in SF n, where SF n is a last SF of a RAR window, a UE, if requested by higher layers, transmits a new preamble sequence no later than in SF n+4.

In case a random access procedure is initiated by a "PDCCH order" (see REF 3) in SF n, UE 114, if requested by higher layers, transmits random access preamble in a first SF $n+k_2$, $k_2 \geq 6$, where a PRACH resource is available. If UE 114 is configured with multiple TA Groups (TAGs) and if the UE 114 is configured with a carrier indicator field that is included in a DCI format conveyed by a PDCCH to identify an intended serving cell, the UE 114 uses the carrier indicator field value from the detected "PDCCH order" to determine the serving cell for a corresponding random access preamble transmission.

Once a RA Preamble is transmitted, and regardless of a possible occurrence of a measurement gap, UE 114 monitors a PDCCH for RAR. The PDCCH for RAR is identified by a RA-RNTI in a RAR window that starts at a SF that contains the end of an RA preamble transmission plus three SFs and has length of ra-ResponseWindowSize SFs. A RA-RNTI associated with a PRACH where a RA Preamble is transmitted is computed according to Equation 2:

$$\text{RA-RNTI} = 1 + t\_id + 10 * f\_id \quad (2)$$

where t_id is an index of a first SF of a specified PRACH ($0 \leq t\_id < 10$) and f_id is an index of a specified PRACH within that SF, in ascending order of frequency domain ($0 \leq f\_id < 6$). UE 114 can stop monitoring for RAR(s) after successful reception of a RAR containing RA Preamble identifiers that matches a transmitted RA Preamble.

For Machine-Type Communication (MTC) UEs, it is more efficient to use an already deployed radio access technology and exploit economies of scale to control cost rather than create a new radio access technology specifically for MTC UEs. Therefore it is important to enable LTE to be a radio access technology for MTC UEs. MTC UEs typically require low operational power consumption and are expected to communicate with infrequent small burst transmissions. In addition, a substantial market exists for MTC UEs deployed deep inside buildings and this can require significant Coverage Enhancement (CE) relative to a conventional LTE cell coverage footprint.

MTC UEs can be installed in basements of residential buildings or, generally, in locations experiencing significantly larger penetration losses than conventional UEs. In extreme coverage scenarios, MTC UEs may have characteristics such as very low data rate, greater delay tolerance, and no mobility, thereby potentially being capable to operate without some messages/channels. Required system functionalities for MTC UEs in an enhanced coverage operating mode are assumed to include synchronization, cell search, power control, random access process, channel estimation, measurement reporting, and DL/UL data transmission (including DL/UL resource allocation). Not all MTC UEs require CE or require a same amount of CE. Therefore, as CEs for physical channels consume additional resources and consequently result to lower spectral efficiency, it should be possible to enable associated techniques only for MTC UEs that require such CEs.

CE needs to be supported in both FDD and TDD systems. In a TDD system, a communication direction in some SFs in a frame that includes 10 SFs is in the DL and in some other SFs is in the UL. Table 1 lists indicative TDD UL/DL configurations over a period of a frame. In Table 1, "D" denotes a DL SF, "U" denotes an UL SF, and "S" denotes a special SF that includes a DL transmission field referred to as DwPTS, a Guard Period (GP), and an UL transmission field referred to as UpPTS [see REFI]. Several combinations exist for the duration of each field in a special SF subject to a condition that a total duration is one SF (1 ms).

TABLE 1

TDD UL/DL configurations.

| TDD UL/DL Configuration | DL-to-UL Switch-point periodicity | SF number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Existing LTE designs may not satisfy a required CE for all deployment scenarios as a CE as high as, for example, a 15 dB may be required. In addition, in different deployment scenarios, a required CE can be different for different eNBs, such as, depending upon an eNB transmission power, an associated cell size, or a number or receiver antennas. Additionally, a required CE can be different for different UEs, such as, depending upon a location of a UE.

Embodiments of this disclosure provide mechanisms to support scalable CE for a random access process according to a CE level required for a UE. Embodiments of this disclosure also provide mechanisms for a UE to determine an initial number of repetitions for a RA preamble transmission, associated with an estimate for an initial CE level, based on measurements or other statistics, or based on a configuration by an eNB, and to determine a subsequent number of repetitions for a RA preamble transmission, associated with a higher CE level, if the UE does not receive a response from the eNB to the RA preamble transmission corresponding to the estimated initial CE level. Moreover, embodiments of this disclosure provide a mechanism for a UE to determine a number of repetitions for a response to a RA preamble transmission. Additionally, embodiments of this disclosure provide a mechanism for a UE to determine a number of repetitions for a Msg3 transmission to the eNB after a reception of a response from the eNB to a RA preamble transmission.

Determination of PRACH Resources and Transmission of RA Preamble by a UE

In certain embodiments, UE 114 determines a path-loss $PL_c$ for serving cell c from a signal such as a CRS or a CSI-RS. Subsequently, UE 114 determines a RA preamble transmission power $P_{PRACH}$ as in Equation 3

$$P_{PRACH} = \min\{P_{CMAX,c}(i), \text{PREAMBLE\_RECEIVED\_TARGET\_POWER} + PL_c\}[\text{dBm}] \quad (3),$$

where $P_{CMAX,c}$ is a configured maximum UE transmission power for a SF ($P_{CMAX,c}$ can be SF specific but respective indexing is omitted for brevity) in serving cell c.

Denoting $PL_{th}$ as a path-loss threshold (for example, $PL_{th}$ can result to $P_{PRACH} = P_{CMAX,c}$ for a reference SF) and assuming for simplicity that eNB 102 does not configure an additional power offset, then, if $PL_c$ is not larger than $PL_{Th}$, UE 114 uses a conventional method to transmit a RA preamble. Otherwise, if $PL_c > PL_{Th}$, UE 114 can use more PRACH resources, such as more resources in the time domain, to transmit a RA preamble. For example, a RA preamble can be transmitted with repetitions in different SFs. A mapping can be provided to UE 114, either by specifications or by eNB 102 through higher layer signaling, such as signaling in a SIB, linking sets of path-loss ranges to sets of respective resources for a RA preamble transmission. For example, as it is subsequently described, a mapping can be from a path-loss range to a number of RA preamble repetitions and each number of repetitions can have an associated PRACH resource configuration. Then, based on the mapping, UE 114 can determine a set of PRACH resources based on a path-loss that UE 114 computes.

Figure 10A:
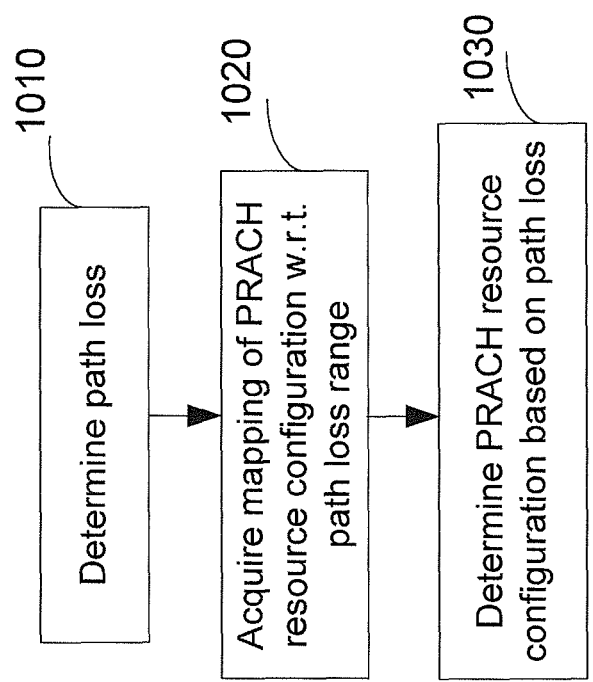
FIG. 10A illustrates an example process for a UE to determine PRACH resources according to this disclosure.

FIG. 10A illustrates an example operation for a UE to determine PRACH resources according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE.

As shown in FIG. 10A, UE 114 measures a path-loss in operation 1010. In operation 1020, the UE 114 acquires from a SIB a mapping of PRACH configurations corresponding to path-loss ranges that include the measured path-loss. The UE 114 then determines a PRACH resource configuration from the acquired mapping in operation 1030.

In general, there are two dimensions for UE 14 to adjust resources for a RA preamble transmission, namely, a transmission power and a number of RA preamble repetitions that can be mapped to resources in one or more of: a time, frequency, or preamble (code) domain. Any combination of resources in the two aforementioned dimensions can apply. For example, UE 114 can first transmit a RA preamble with an initial transmission power, for example as in Equation 3, and if UE 114 fails to receive a RAR within a respective time window, the UE 114 retransmits the RA preamble with a higher transmission power (power ramping) as long as the transmission power is not larger than $P_{CMAX,c}$.

The UE 114 is configured by higher layer signaling with a power ramping step, $\delta_{step}$, to increase a RA preamble transmission power when the UE 114 does not receive a subsequent RAR. If the UE 114 transmits the RA preamble with repetitions, the power ramping step can be same as the one when the UE 114 transmits the RA preamble without repetitions, or the UE 114 can be separately configured for each RA preamble repetition level corresponding to a CE level, or the UE 114 can be implicitly determined by a number of RA preamble transmission attempts at a CE level (this number can be informed separately for each CE level or can be same for all CE levels).

Power ramping can be relative to different path-loss thresholds (CE levels). For example, for a first CE level and a second CE level that differ by $\delta_{1,2}$ dB, a number of RA preamble transmissions $N_1$ for the first CE level, wherein each RA preamble transmission includes a first number of repetitions $R_1$, that the UE 114 performs before continuing RA preamble transmissions for the second CE level if the UE 114 does not receive a RAR, can be either $N_1 = \lceil \hat{\delta}_{1,2}/\hat{\delta}_{step} \rceil$ or $N_1 = \lfloor \hat{\delta}_{1,2}/\hat{\delta}_{step} \rfloor$ where $\hat{\delta}_{1,2}$ and $\hat{\delta}_{step}$ are the linear values of $\delta_{1,2}$ and $\delta_{step}$ respectively. If $\delta_{step}$ is separately configured to the UE 114 for a CE level, relative to non-CE operation, a number of preamble transmissions $N_k$ that the UE 114 performs at CE level k, with $R_k$ repetitions for each of the $N_k$ transmissions, before continuing with CE level k+1 (if it does not receive a RAR) can be either $N_k = \lceil \hat{\delta}_{k,k+1}/\hat{\delta}_{step,k} \rceil$ or $N_k = \lfloor \hat{\delta}_{k,k+1}/\hat{\delta}_{step,k} \rfloor$, where $\delta_{k,k+1}$ and $\delta_{step,k}$ are the linear values of $\delta_{k,k+1}$ $\delta_{step,k}$, $\delta_{k,k+1}$ is the dB difference of CE levels k and k+1, and $\delta_{step,k}$ is the configured power ramping step value at CE level k. Then, even if the UE 114 transmits with $P_{CMAX,c}$ or reaches $P_{CMAX,c}$ after a number of transmissions less than $N_k$ for CE level k and the UE 114 does not receive a RAR, the UE 114 continues RA preamble transmissions for CE level k and does not continue RA preamble transmissions for CE level k+1 before it exhausts $N_k$ RA preamble transmissions at CE level k without receiving a RAR. Alternatively, the number of RA preamble transmissions $N_k$ at CE level k can be configured and the power ramping step $\delta_{step,k}$ can be independent of $\delta_{k,k+1}$. If power ramping is possible and the UE 114 reaches $P_{CMAX,c}$ before the UE 114 exhausts $N_k$ RA preamble transmissions at CE level k without receiving a RAR, the UE 114 continues the remaining RA preamble transmissions at CE level k using $P_{CMAX,c}$.

Subsequently, if after a predetermined number $N_k$ of RA preamble transmissions with a repetition level $R_k$, the UE 114 fails to receive a RAR within a respective time window, the UE 114 transmits the RA preamble with a next higher configured repetition level that includes $R_{k+1} > R_k$ repetitions and corresponds to a different path-loss threshold. If after a predetermined number $N_{k+1}$ of RA preamble transmissions with $R_{k+1}$ repetitions per transmission the UE 114 does not receive an RAR, the UE 114 continues RA preamble retransmissions using a next higher configured repetition level that includes $R_{k+2} > R_{k+1}$ repetitions, and so forth, until the maximum CE level is reached. Similar to a number of repetitions for a RA preamble at each level, a total number of RA preamble transmissions at each level can also be provided to the UE 114 by system information. Then, for CE level k, both the number $R_k$ of RA preamble repetitions and the number $N_k$ of total RA preamble transmissions (each with $R_k$ repetitions) can be provided by system information to the UE 114. Alternatively, a number of transmissions can be same for all repetition levels and be provided by system information.

When a DL coverage limited UE can transmit a RA preamble without repetitions (UE is not UL coverage limited), respective resources can be included in system information intended for DL coverage limited UEs. Therefore, system information for DL coverage UEs can include information for both UEs that are UL coverage limited and UEs that are not UL coverage limited, at least with respect to RA preamble transmissions. Then the UE 114 that is not DL coverage limited, but is UL coverage limited, can obtain the information for RA preamble repetitions and, in general for the PRACH process, from system information for DL coverage limited UEs. Similar, system information for UEs that are not DL coverage limited can also include information for the PRACH process for UEs that are UL coverage limited.

In a variation of the above procedure, if the UE 114 detects a Master Information Block (MIB) or a SIB in a CE mode that is defined by repetitions of a respective Physical Broadcast CHannel (P-BCH) conveying the MIB or by repetitions of a respective PDSCH conveying the SIB, respectively, the UE 114 operates in a CE mode for the RA preamble transmission regardless of whether an initial RA preamble transmission power the UE 114 determines (based on its computed path-loss) is smaller or larger than $P_{CMAX,c}$, that is regardless of whether the UE 114 is UL coverage limited (that is, if the UE 114 is DL coverage limited, the UE 114 also operates as if UE 114 is UL coverage limited even if UE 114 is not). A reason for this approach is to possibly simplify the UE operation and establish a common design among UEs that are UL coverage limited and UEs that are not UL coverage limited when all such UEs are DL coverage limited.

For the UE 114 operating in UL CE mode, if an initial transmission power computed as in Equation 3 is not larger than $P_{CMAX,c}$, the UE 114 transmits a RA preamble with the initial transmission power for each of the $R_1$ repetitions and, if UE 114 fails to receive a RAR in a respective time window, the UE 114 increases a RA preamble transmission power by a predetermined step $\delta_{step,1}$ for the next $R_1$ repetitions. If after a number of RA preamble retransmissions, a further increase in the RA preamble transmission power results to a value larger than $P_{CMAX,c}$, a next retransmission of the RA preamble with $R_1$ repetitions can be with a power equal to $P_{CMAX,c}$ (at respective SFs).

A reason for a UE in CE mode to not always transmit a RA preamble with power equal to $P_{CMAX,c}$ is because it is desirable for RA preambles from different UEs to be received with a similar power at an eNB as multiplexing of RA preambles for a same repetition level can be in a code (preamble) domain and unequal reception powers can cause "near-far" effects and degrade a reception reliability of a RA preamble received with smaller power than other RA preambles. Therefore, it is beneficial to determine an initial RA preamble transmission power as in Equation 3 and not use $P_{CMAX,c}$ even when a RA preamble is transmitted with repetitions. RA preamble transmissions with different levels of repetitions (corresponding to different CE levels) can use different frequency of time resources in order to avoid the previously discussed "near-far" effects as different repetition levels correspond to significantly different differences in respective RA preamble received power, for example due to different path-losses, and either different time resources or different frequency resources can be used.

Table 1A provides an exemplary RA preamble resource adjustment in the dimension of transmission power. Table 1B provides an exemplary RA preamble resource (time, or frequency, or preamble domain) adjustment according to a number of repetitions for a transmission of a RA preamble. In Table 1A, a path-loss has two categories and an initial RA preamble transmission power has two respective configurations. For path-loss that is not larger than $PL_{Th}$, the UE 114 can use a conventional method with power ramping to transmit a RA preamble or, assuming the UE 114 is UL coverage limited, UE 114 can use a first number of $R_1$ RA preamble repetitions while also using power ramping between successive RA preamble retransmissions (for up to a configured number of $N_1$ transmissions) with the first CE level. For a path-loss larger than $PL_{Th}$, UE 114 can use $P_{CMAX,c}$ as an initial RA preamble transmission power if UE 114 does not increase a number of repetitions.

In Table 1B, different resource (time, or frequency, or preamble code) configurations can be mapped according to a number of RA preamble repetitions. Each number of RA preamble repetitions per RA preamble transmission can correspond to a respective CE level and it can be assumed that $R_1 \leq R_2 \leq R_3$.

TABLE 1A

Exemplary UL TX power for PRACH preamble transmission

| Path-loss | Initial UL TX power |
|---|---|
| $PL_c \leq PL_{Th}$ | Conventional design |
| $PL_{Th} < PL_c$ | $P_{CMAX,c}$ |

TABLE 1B

Exemplary resource (time, or frequency, or preamble code) configurations according to numbers of PRACH preamble repetitions

| Number of repetitions | Resources |
|---|---|
| 1 | First PRACH resource configuration |
| $R_1$ | Second PRACH resource configuration |
| $R_2$ | Third PRACH resource configuration |
| $R_3$ | Fourth PRACH resource configuration |

Some of the subsequent Tables, such as Tables 2, 3, 4A, 4B, 4C, can be viewed as particular cases for combinations of Table 1A and Table 1B.

Table 2 provides exemplary PRACH resource configurations relative to path-loss ranges. In Table 2, there are four categories for path-loss ranges. The numbers $\delta_{PL1}$ and $\delta_{PL2}$, and the numbers of repetitions $R_1$, $R_2$, and $R_3$ ($R_1 \leq R_2 \leq R_3$), can be configured (for example, by system information, such as a SIB) or be predefined in a system operation. PRACH resource configurations can be also configured (for example, by system information, such as an SIB). For example, $\delta_{PL1}=6$ dB and $\delta_{PL2}=12$ dB while $R_1=4$, $R_2=16$, and $R_3=32$.

Although Table 2 has four categories for a path-loss range, a different number of categories, such as two, can also apply as in Table 1A. The same can apply for the other Tables, such as Tables 3, 5, 5A.

TABLE 2

Exemplary PRACH resource configurations for corresponding path-loss ranges

| Category | CE level | Path-loss | Number of repetitions | Resources |
|---|---|---|---|---|
| 1 | 0 | $PL_c \leq PL_{Th}$ | 1 | First PRACH resource configuration |
| 2 | 1 | $PL_{Th} < PL_c \leq PL_{Th} + \delta_{PL1}$ | $R_1$ | Second PRACH resource configuration |
| 3 | 2 | $PL_{Th} + \delta_{PL1} < PL_c \leq + PL_{Th} + \delta_{PL2}$ | $R_2$ | Third PRACH resource configuration |
| 4 | 3 | $PL_{Th} + \delta_{PL2} < PL_c$ | $R_3$ | Fourth PRACH resource configuration |

Part of the information in Table 2 can be broadcasted by the eNB 102 in a SIB. The eNB 102 can include a number of PRACH (RA preamble) repetitions, from a set of predetermined number of PRACH repetitions, and respective path-loss ranges in a SIB such as a first SIB (SIB1) or a second SIB (SIB2). Different eNBs can include different numbers of PRACH repetitions depending on a respective CE target. For example, a first eNB 102 can include an indication of number $R_1$ using a value of '00' in a SIB, a second eNB 103 can include an indication of R, using a value of '01' in a SIB. If $R_2$ is included in a SIB, it can either imply that both $R_1$ and $R_2$ are supported or that only $R_2$ is supported. UE 114 that receives an indication for a number of PRACH repetitions for a CE level in a SIB repeats PRACH according to the indicated repetitions for the CE level. Alternatively, numbers for RA preamble repetitions and respective path-loss ranges can be predetermined in a system operation.

An alternative is for the eNB 102 to directly include its targeted CE level in a SIB. Different eNBs can include different respective targeted CE levels. For example, a two-bit field can be used, where '00' indicates a first level, '01' indicates a second level, and so forth. When the UE 114 receives the indicated CE level from the eNB 102, the UE 114 can derive the number of repetitions of PRACH, or even the resources for the repetitions of PRACH (for example, if the mapping of the CE level, or the number of repetitions, and the resources for repetitions are predefined), which can be based on a predefined mapping table. For example, a first CE level means the UE 114 repeats PRACH for $R_1$ times, a second CE level means the UE 114 repeats PRACH for $R_2$ times, and so forth.

Certain embodiments of the present disclosure include the aforementioned information in an MIB transmitted in a P-BCH and the UE 114 can then also determine a CE level that the eNB 102 uses for transmission of SIBs.

Figure 10B:
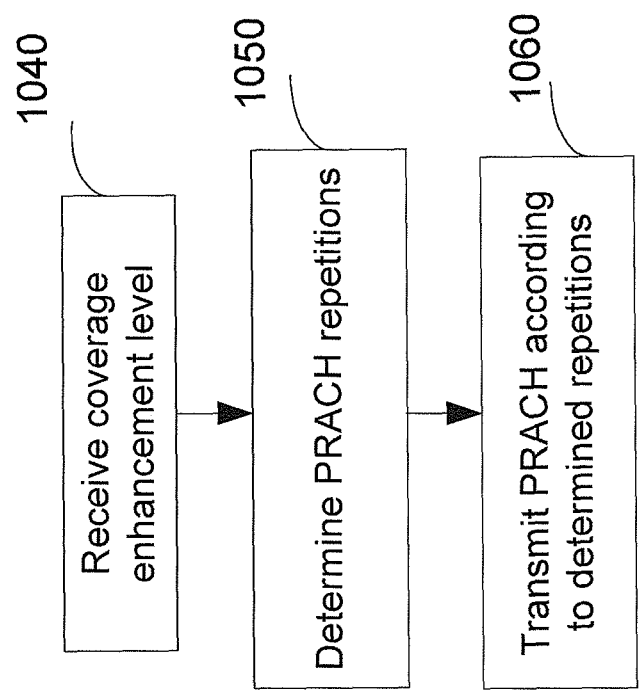
FIG. 10B illustrates example process for a UE to determine a number of PRACH repetitions according to this disclosure.

FIG. 10B illustrates example operations for a UE to determine a number of PRACH repetitions according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE.

As shown in FIG. 10B, the UE determines CE level in operation 1040 (for example, via SIB, or MIB, according to a measured path-loss). The UE determines a number of PRACH repetitions in operation 1050 (it may determine the resources for PRACH repetitions if a mapping of the CE level to the resources for PRACH repetitions is predefined). The UE then transmits PRACH according to the determined repetitions in operation 1060.

Figure 10C:
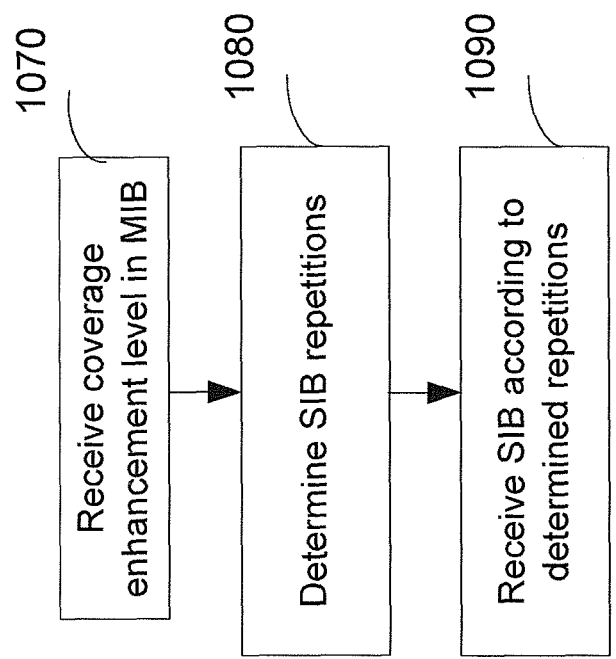
FIG. 10C illustrates example process for a UE to determine SIB repetitions according to this disclosure.

FIG. 10C illustrates example operations for a UE to determine SIB repetitions according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE.

As shown in FIG. 10C, in operation 1070 a UE receives a CE level for a cell via an MIB. The UE determines a number of SIB repetitions in operation 1080 (it may determine the resources for SIB repetitions if a mapping of the CE level to resources for SIB repetitions is predefined). The UE then receives SIB according to the determined repetitions in operation 1090.

PRACH resources can be orthogonal to each other for each category of path-loss (CE level). For example, a first set of SFs or a first set of RBs can be used from a UE using no repetitions for a respective PRACH transmission while a second set of SFs or a second set of RBs can be used from a UE using $R_3$ repetitions for PRACH transmissions.

Alternatively, PRACH resources can be overlapped and the eNB 102 can then determine a RA preamble detection considering a detected energy for each possible PRACH resource. For example, if for a same ZC sequence a first detected energy in PRACH resources corresponding to no repetition of a PRACH transmission is within a first threshold of a second detected energy in PRACH resources corresponding to a repetition of the PRACH transmission, and the first detected energy or the second detected energy is above a second threshold, the eNB 102 can assume that the transmission of the ZC sequence is repeated; otherwise, the eNB 102 can assume either that there is no PRACH transmission (for example, when the first detected energy is below the second threshold and is not within the first threshold relative to the second detected energy) or that there is no repetition (for example, when the first detected energy is above the second threshold and is not within the first threshold relative to the second detected energy).

For category 1 UEs in Table 2, a PRACH resource configuration indicated in SIB2 can be same or different than a PRACH resource configuration for category 1 conventional UEs; in the latter case, the selected PRACH resource configuration by the UE 114 can indicate to the eNB 102 whether or not the UE is UL coverage limited.

The eNB 102 can convey PRACH resource configurations to UEs using one of the following options.

In a first option, PRACH resources can be indicated in a SIB for UEs requiring CE (SIB-CE). SIB-CE is transmitted in a PDSCH that can be scheduled by a PDCCH conveying a DCI format with CRC scrambled with a SI-RNTI that is same as the SI-RNTI for non-CE conventional UEs. The PDCCH with SI-RNTI for SIB-CE can be transmitted with enhanced reliability and with a predefined configuration, (for example, predefined CCE locations, a predefined DCI format, predefined CCE aggregation level, and so forth), that will enable a UE to differentiate it from a PDCCH with SI-RNTI scheduling a SIB for non-CE UEs. In a first example, a reserved set of CCEs can be used for transmission of a PDCCH scheduling SIB-CE where the reserved set of CCEs is never used for transmission of a PDCCH scheduling SIB for non-CE UEs. In a second example, a PDCCH scheduling SIB-CE can be transmitted in a first set of SFs while a PDCCH scheduling SIB2 can be transmitted in a second set of SFs wherein the first and second sets of SFs do not have any common SFs. The UE 114 can monitor a PDCCH with SI-RNTI for SIB-CE assuming a predefined transmission configuration. A transmission configuration for a PDSCH conveying a SIB-CE can be different from a transmission configuration of a PDSCH conveying a SIB for non-CE UEs. For example, a transmission configuration for SIB-CE can include repetitions in multiple SFs to enhance coverage and can be, for example, configured by the PDCCH with SI-RNTI for SIB-CE.

In a second option, PRACH resources can be indicated in an SIB for CE UEs (SIB-CE). SIB-CE is transmitted in a PDSCH that can be scheduled by a PDCCH conveying a DCI format with CRC scrambled with a SI-CE-RNTI that can be different from a SI-RNTI used for non-CE UEs. A PDCCH using SI-CE-RNTI can be transmitted with enhanced reliability and a respective configuration can be predefined. For example, a PDCCH using SI-CE-RNTI can be transmitted in predetermined SFs and use predetermined resources to enable the UE 114 to accumulate a PDCCH in multiple such resources, thereby enhancing a detection reliability. For SIB-CE reception, the UE 114 can monitor a PDCCH conveying a DCI format with CRC scrambled with a SI-CE-RNTI assuming the predefined configuration. A transmission of SIB-CE in a first PDSCH can be with different parameters than a transmission of conventional SIB in a second PDSCH. For example, a transmission of SIB-CE can be with repetitions (such as via SF bundling) to enhance coverage.

In a third option, PRACH resources for respective CE levels can be indicated in a SIB for CE UEs (SIB-CE) where the SIB-CE can be transmitted in a predefined manner (for example, in predetermined time and frequency resources and with predetermined modulation and coding rate) instead of using a PDCCH to schedule a PDSCH conveying SIB-CE and explicitly configure respective transmission parameters for SIB-CE. A transmission for SIB-CE can be with repetitions to enhance coverage. For example, a SIB-CE can be transmitted in a PDSCH conveyed in a predetermined number of SFs, in a predetermined number of symbols per SF, and in predetermined RBs using QPSK modulation and a lowest possible code rate.

For the three previous options, several methods can exist for the eNB 102 to convey the PRACH resource configurations to the UE 114. A first method is for the UE 114 to acquire only SIB-CE and not acquire SIB2. PRACH resources indicated in SIB-CE can be for PRACH having a certain number of repetitions for a RA preamble, for example, the information in Table 2 for categories 1-4. A second method is for the UE 114 to acquire SIB2 or SIB-CE, where for example, information on category 1 in Table 2 can be in SIB2 and information on categories 2-4 in Table 2 can be provided in SIB-CE. With the second method, the UE 114 operates as a non-CE UE (acquiring SIB2) when its path-loss is in category 1.

Figure 11C:
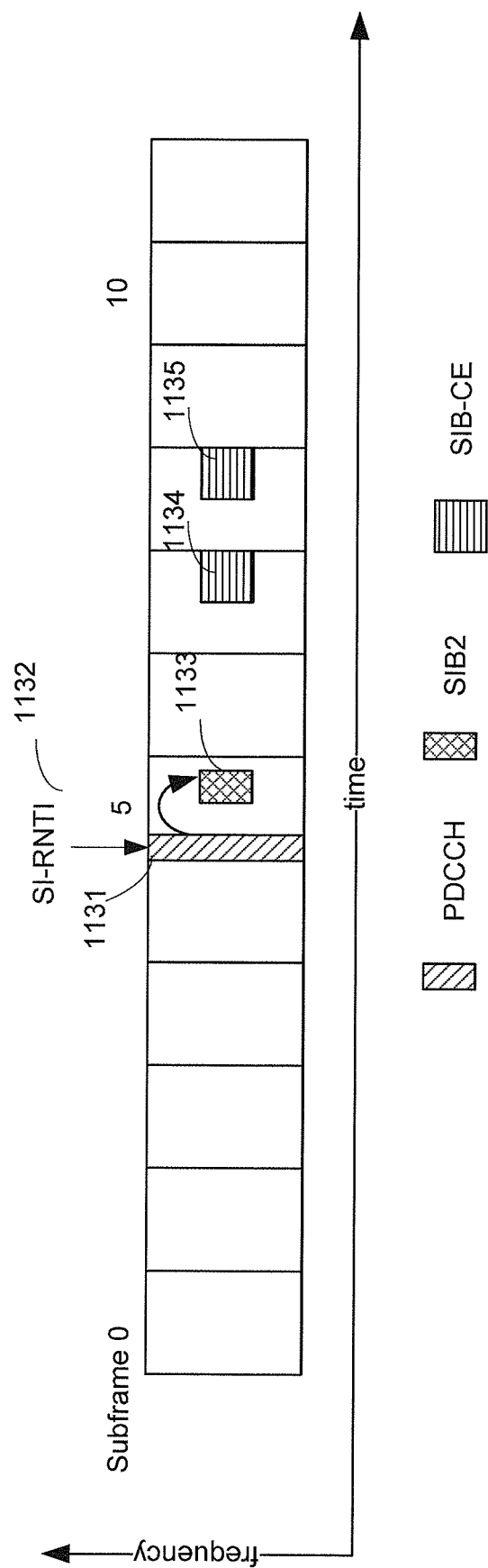

FIGS. 11A, 11B and 11C illustrate example operations for an eNB to convey PRACH resource configurations to a UE for each of the previous three options according to this disclosure. The embodiments of the operations shown in FIGS. 11A, 11B and 11C are for illustration only. Other embodiments could be used without departing from the scope of the present disclosure.

As shown in FIG. 11A, a PDCCH 1111 conveying a DCI format with CRC scrambled with a SI-RNTI 1112 can configure resources for SIB2 1113 reception by a CE UE. A PDCCH 1114 conveying a DCI format with CRC scrambled with a SI-RNTI or SI-CE-RNTI 1115 can configure resources for SIB-CE 1116 reception by a UE.

As shown in FIG. 11B, a PDCCH 1121 conveying a DCI format with CRC scrambled with a SI-RNTI 1122 can configure resources for SIB2 1123 reception by a UE and a first PDCCH 1124, and a second PDCCH 1125 conveying a DCI format with CRC scrambled with a SI-RNTI or a SI-CE-RNTI 1126 can configure resources for SIB-CE 1127 and SIB-CE 1128 reception by a UE. PDCCH 1125 can be a repetition of PDCCH 1124, and SIB-CE 1128 can be a repetition of SIB-CE 1127.

As shown in FIG. 11C, a PDCCH 1131 conveying a DCI format with CRC scrambled with a SI-RNTI 1132 can configure resources for SIB2 1133 reception by a UE, while SIB-CE 1134 and SIB-CE 1135 are transmitted on predefined resources without a respective scheduling by an associated PDCCH 1131. SIB-CE 1135 can be a repetition of SIB-CE 1134.

The UE 114 can further select a RA preamble from a set of RA preamble groups as it is subsequently described.

Within PRACH resources for each level of repetitions (for example, as given in Table 2), the UE 114 can select, based on its estimated path-loss, a RA preamble from a number of RA preamble groups and other parameters for contention based random access. A selected RA preamble can be used to indicate to the eNB 102 an amount of data that the UE 114 wants to (and from a power perspective can) transmit in a PUSCH for Msg3. From a RA preamble the UE 114 uses, the eNB 102 can determine an estimate for UL resources to allocate to the UE 114. In another example, if all UEs always transmit a same amount of data in Msg3, the UE 114 can select a RA preamble from different RA preamble groups based on its path-loss or, equivalently, based on its required CE. Therefore, from a RA preamble the UE 114 uses, the eNB 102 can obtain an estimate of a path-loss or of a CE level for the UE 114. For example, the UE 114 can use $R_1$ repetitions for a RA preamble transmission when a respective path-loss estimate is in category 2 as in Table 2. A finer path-loss or CE amount can be differentiated via the group the RA preamble belongs to.

For path-loss in category 1, if the UE 114 has not transmitted Msg3, the UE 114 can select Random Access Preamble group B if the path-loss is less than $P_{CMAX,c}$-preambleInitialReceivedTargetPower-deltaPreambleMsg3-messagePowerOffsetGroupB; otherwise, the UE 114 can select Random Access Preambles group A. preambleInitialReceivedTargetPower, deltaPreambleMsg3, and messagePowerOffsetGroupB, can be configured from the eNB 102, for example, using system information.

For path-loss in category i, (for example, as in Table 2, i=2, 3, 4), if the UE 114 has not transmitted Msg3, the UE 114 can select a first Random Access Preambles group if the path-loss is less than $P_{CMAX,c}$-preambleInitialReceivedTargetPower-deltaPreambleMsg3-messagePowerOffsetGroupB-MTCPowerOffsetCategory-i; otherwise, select a second Random Access Preambles group. MTCPowerOffsetCategory-i (for example, as in Table 2, i=2, 3, 4), can be configured from the eNB 102, for example, using system information.

Table 3 provides an example of PRACH resource configurations and preamble groups with respect to path-loss ranges. In Table 3, Group A, 1, 1a, 1b can be same or different. Group B, 2, 2a, 2b can be same or different. The grouping can be predefined.

To achieve R repetitions for a RA preamble transmission, a first option is to have a new RA preamble format supporting R repetitions for a RA preamble. A second option is to have RA preamble in a given format (for example, one of the formats in FIG. 8 or any new formats), to be repeated R times consecutively (for example, for a FDD system) or non-consecutively (for example, for a TDD system), as long as R repetitions are achieved. A third option is to transmit a RA preamble using multiple formats (for example, multiple of the formats in FIG. 8 or any new formats), and repeat these formats consecutively (for example, for a FDD system) or non-consecutively (for example, for a TDD system) in order to achieve R repetitions accumulatively.

For a TDD system, the third option can be beneficial. For example, if the RA preamble format is format 3, it requires a consecutive 3 ms for one transmission of a RA preamble. Because of this requirement, PRACH format 3 can be supported only for TDD UL/DL configurations 0, 3, 6 as only these configurations have three consecutive UL SFs available in a frame (as indicated in Table 1). When additional repetitions for a RA preamble are needed for TDD UL/DL configuration 6 having three consecutive UL SFs in the first half frame and two consecutive UL SFs in the second half frame, two PRACH formats (format 3 for the first half frame and format 1 or format 2 for the second half frame) in a same frame can be used to support repetitions of PRACH. This can reduce RA preamble transmission latency.

TABLE 3

Exemplary PRACH resource configurations and preamble groups for path-loss ranges

| Category | Path-loss | Number of repetitions | Resources | Preamble |
|---|---|---|---|---|
| 1 | $PL_c \le PL_{Th}$ | 1 | First PRACH resource configuration | Group A Group B |
| 2 | $PL_{Th} < PL_c \le PL_{Th} + \delta_{PL1}$ | $R_1$ | Second PRACH resource configuration | Group 1 Group 2 |
| 3 | $PL_{Th} + \delta_{PL1} < PL_c \le PL_{Th} + \delta_{PL2}$ | $R_2$ | Third PRACH resource configuration | Group 1a Group 2a |
| 4 | $PL_{Th} + \delta_{PL2} < PL_c$ | $R_3$ | Fourth PRACH resource configuration | Group 1b Group 2b |

Figure 12:
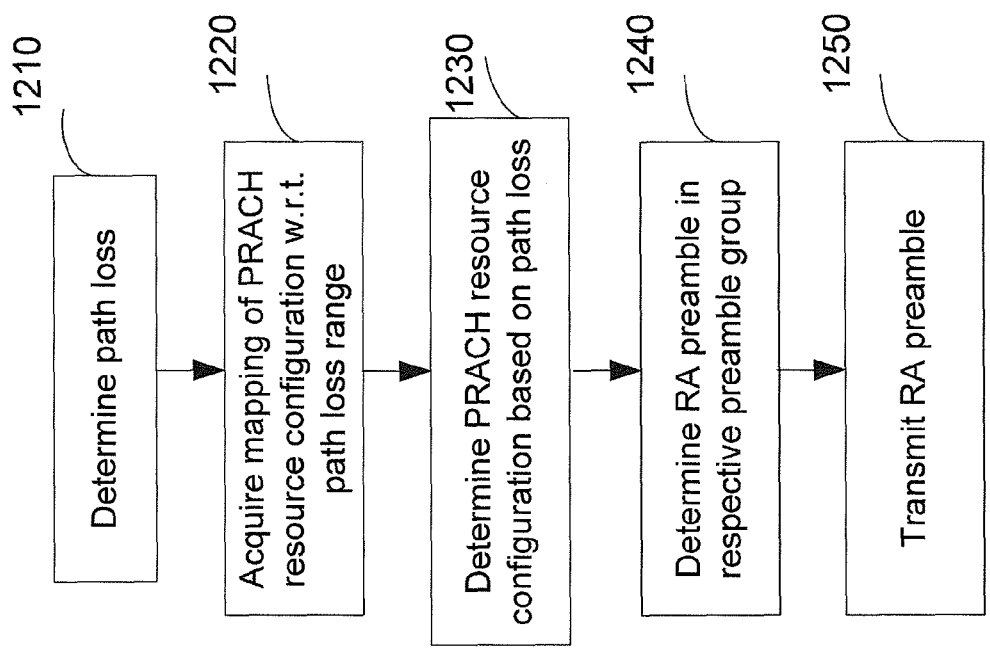
FIG. 12 illustrates an example UE process for determining PRACH resources according to this disclosure.

FIG. 12 illustrates example UE operations for determining PRACH resources according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE.

As shown in FIG. 12, a UE determines a path-loss in operation 1210. Thereafter, the UE performs a mapping for a PRACH resource configuration relative to path-loss range categories in operation 1220. The UE can subsequently determine a PRACH resource configuration based on the path-loss in operation 1230. The UE further determines a RA preamble in a respective preamble group in operation 1240 (for example, based on Table 3). Thereafter, the UE transmits the RA preamble using the determined resources in operation 1250.

If a TDD UL/DL configuration can be dynamically adapted in a cell through indication by a DCI format (see also REF 3), RA preamble repetitions (and Msg3 transmissions) can be based on a DL-reference UL/DL configuration for which all UL SFs remain UL SFs in any adapted UL/DL configuration.

Figure 13A:
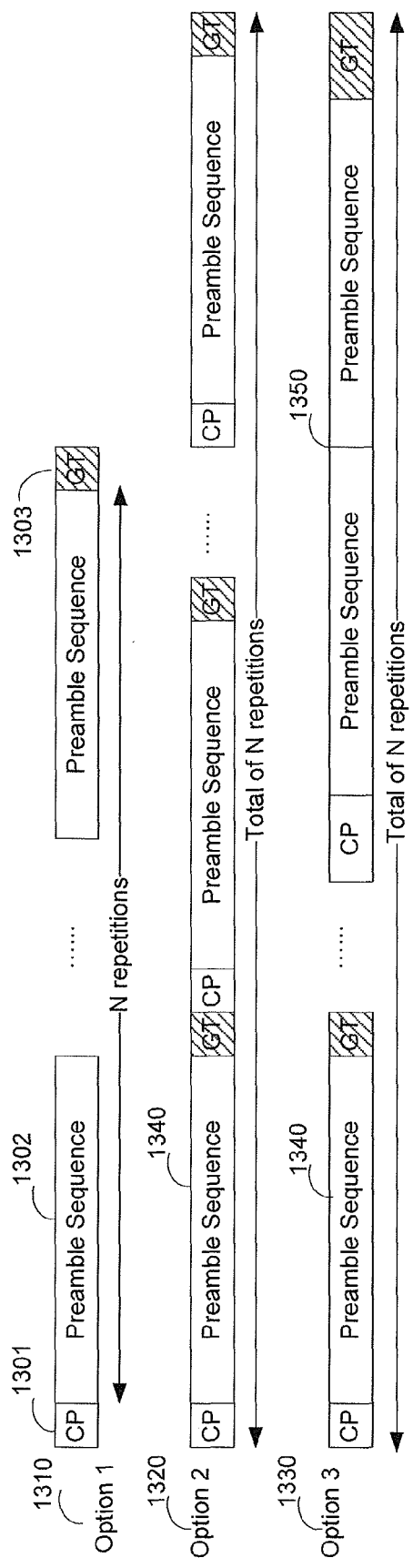
FIGS. 13A, 13B, 13C, 13D and 13E illustrate example options for R repetitions for a RA preamble transmission according to this disclosure.

FIG. 13A illustrates example options for R repetitions for an RA preamble transmission according to this disclosure. The embodiment of the R repetitions for an RA preamble transmission shown in FIG. 13A is for illustration only. Other embodiments could be used without departing from the scope of the present disclosure.

As shown in FIG. 13A, in Option 1 1310, an RA preamble sequence 1302 is repeated by R times between CP 1301 and GT 1303. In Option 2 1320, preamble format 0 1340 is repeated for R times. In Option 3 1330, preamble format 0 1340 and preamble format 2 1350 are used to achieve R repetitions.

RA preamble format(s) and their respective resource allocation(s) (such as, for example, SF(s) associated with respective RA-preamble formats) can be signaled from the eNB 102 to the UE 114 using SIB-CE. One or multiple PRACH configuration indexes (for example, two indexes, one for the first half frame and the other for the second half frame) can be included in SIB-CE if there are multiple RA preamble formats to be used by the UE 114. Alternatively, a second RA preamble format can be uniquely determined by a first RA preamble format without additional signaling. The UE 114 can use a combination of multiple RA preamble formats to transmit a RA preamble. A starting frame j can be signaled from the eNB 102 and is a frame with number F such that F mod J=j, where j=0, . . . , J−1 and J is a number of frames to achieve R repetitions and J=R/y where y is a number of repetitions in each frame.

When there are multiple preamble formats within a frame, a starting point within a frame to accumulate a repetition of R times can be also be indicated. For example, 1-bit signaling can be used, where '0' indicates that the starting point is in the first half frame and '1' indicates that the starting point is in the second half frame. Alternatively, without any signaling, the starting point can always be in the first half frame. With the starting frame and the starting point within a frame, when the UE 114 has a random back-off to determine SF(s) for PRACH transmission, the UE 114 can adjust its starting SF(s) for PRACH transmission as allowed by a restriction determined by the starting point. As an alternative, if the starting frame or the starting point within the starting frame is not signaled, the UE 114 can choose a starting SF(s) for PRACH transmission that are suitable for either of the multiple preamble formats. The eNB 102 can then perform blind decoding to determine the starting point and accumulate the R repetitions. A frequency index field can be also used to indicate, to a UE, frequency index(es) that can be used for RA preamble transmission with R repetitions. Table 4 provides an example of information fields in a SIB-CE for indicating RA preamble resources with one or multiple RA preamble formats to support R repetitions.

TABLE 4

Exemplary information fields in SIB-CE for indicating RA preamble resources with RA preamble formats to support R repetitions

| Field | Size (bits) | Information |
| --- | --- | --- |
| PRACH configuration index 1 | 8 | The PRACH configuration index for the first half frame |
| PRACH configuration index 2 | 8 | The PRACH configuration index for the second half frame |
| Starting frame | $\log_2 J$ | This field has a value j. Starting frame has number F, F mod J = j, j = 0, . . . , J − 1. J is number of frames for R repetitions, J = R/y, y is number of repetitions in each frame. |
| Starting point within starting frame | 1 | '0' starting from first half frame '1' starting from second half frame |
| Frequency index | 2 | '00' frequency index > 0, '01' frequency index > 1 '10' frequency index > 2, '11' frequency index > 3 |

For the previous example, when PRACH repetitions are needed for a UE operating with TDD UL/DL configuration 6 having three consecutive 3 UL SFs in the first half frame and two consecutive UL SFs in the second half frame, two PRACH formats (format 3 for the first half frame and format 1 for the second half frame) in a same frame can be used to support PRACH repetitions. In this case, if PRACH configuration index 1 in Table 4 is 43 (as in Table 5.7.1-4 in REF 1) and PRACH configuration index 2 is 23 (as in Table 5.7.1-4 in REF 1), there are 2 repetitions (counting repetitions as all occurrences of preamble sequences transmissions) in the first half frame, and 1 repetition in the second half frame. Then each frame can support y=3 repetitions. For R=6, a number of frames to achieve R repetitions J=R/y=2. If the starting frame in Table 4 is 0 and the starting point within the starting frame is '0', the starting SF will be within a frame having an even frame number and in the first half frame. If there are other restrictions for the UE 114 to determine a SF for PRACH transmission (such as a measurement gap), the starting SF can be adjusted towards the next PRACH SF taking into account the RA preamble format.

In the above example, if a PRACH configuration index 1 in Table 4 is 46 (as in Table 5.7.1-4 in REF 1) and a PRACH configuration index 2 is 28 or 29 (as in Table 5.7.1-4 in REF 1), the UE 114 only considers a configuration for the second half frame in configuration index 28 or 29 (for example, in Table 5.7.1-4 in REF 1 there are 5 possibilities for configuration index 28 for TDD UL/DL configuration 6, two for the first half frame and three for the second half frame, and the UE only considers the 3 possibilities for the second half frame). If PRACH configuration index 1 in Table 4 is 46 (as in Table 5.7.1-4 in REF 1) and PRACH configuration index 2 is 28 or 29 (as in Table 5.7.1-4 in REF 1), then for each of the first or the second half frame, there are three frequency indexes 0, 1, 2. If in Table 4 a frequency index field has a value '00', then frequency indexes 1, 2 are used by UEs with R repetitions of a RA preamble transmission. The UE 114 uses a same frequency index across all R repetitions of a RA preamble sequence. If in Table 4 a frequency index field has a value '01', then frequency index 2 is used by UEs with R repetitions of a RA preamble transmission.

When there are multiple frequency indexes for one RA preamble format (such as in a TDD system as it was previously described) then, within repetitions of a RA preamble transmission, the UE 114 can use a same frequency index to simplify implementation and processing and enable coherent averaging of RA preambles. If the UE 114 uses different frequency indexes during R repetitions of a RA preamble, additional signaling from the eNB 102 is needed to configure how the UE 114 uses the different frequency indexes or a predefined hopping pattern can be used such as for example frequency hopping in different 6 RBs after four successive transmissions in same 6 RBs. This can enable coherent averaging of a RA preamble transmission over four SFs and obtain frequency diversity gains from a same RA preamble transmission over next four SFs.

Alternatively, as it is further subsequently described, a new table similar to Table 5.7.1-4 in REF 1 can be defined to provide configuration indexes and corresponding resources for PRACHs.

Alternatively, a frequency band for PRACH resources for UEs with repetitions of a RA preamble transmission can be different from the frequency resources (indexes 0, 1, 2, 3, 4, 5) in Table 5.7.1-4 in REF 1.

As previously indicated herein above, PRACH resources can be orthogonal to each other for each category of pathloss or CE. A total set of RA preamble sequences can be divided among the different CE levels with the division being informed to a UE by a SIB. For example, a first number of RBs can be informed to be associated with a first CE level, a second number of RBs can be informed to be associated with a second CE level, and so on, until a final CE level, from a predetermined number of CE levels. RA preamble sequences for different CE levels can be used in a same SF and in a same set of frequency resources (RBs) or in different sets of SFs or in different sets of frequency resources.

Different sets of RA preamble sequences corresponding to different coverage levels can be used in different sets of SFs (SFs) or RBs. For example, $R_1$ repetitions of an RA preamble sequence for a first coverage level can be in first set of SFs or RBs $S_1$, $R_2$ repetitions of a RA preamble sequence for second coverage level can be in a second set of SFs or RBs $S_2$, and so forth.

Staggering of repetitions can additionally occur. For example, the second set of SFs $S_2$ for $R_2$ repetitions for the second coverage range can be after the first $S_1$ SFs, and so forth. Different realizations can be devised. For example, the second set of SFs $S_2$ can consist of subsets, that are orthogonal to subsets of the first set of SFs $S_1$, and the subsets of $S_2$ and $S_1$ can be interlaced. Alternatively, all subsets of $S_1$ can occur first, followed by all subsets of $S_2$. For each SF, the eNB 102 only attempts to detect a preamble corresponding to a single coverage range.

Frequency domain can be additionally considered together with or separate from the time domain, for the PRACH resources orthogonal to each other for each category of path-loss or CE level.

FIGS. 13B-13E illustrate example options for orthogonal PRACH resources for different categories of CE in time/frequency domain according to this disclosure. The embodiments of the options for orthogonal PRACH resources shown in FIGS. 13B-13E are for illustration only. Other embodiments could be used without departing from the scope of the present disclosure.

Figure 13B:
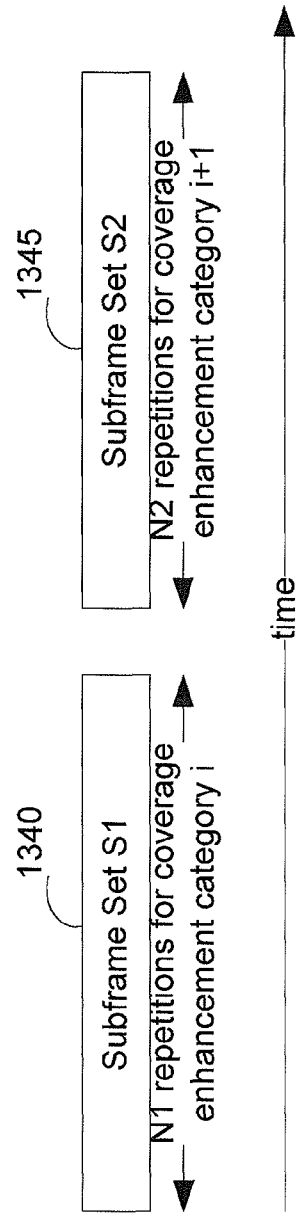

SF sets are considered for brevity but similar principles apply for sets of RBs. As shown in FIG. 13B, SF set $S_1$ 1340 is used for $R_1$ repetitions of the RA preamble transmission for CE category i, SF set $S_2$ 1345 is used for R, repetitions of the RA preamble transmission for CE category i+1, and set $S_2$ occurs after set $S_1$.

Figure 13C:
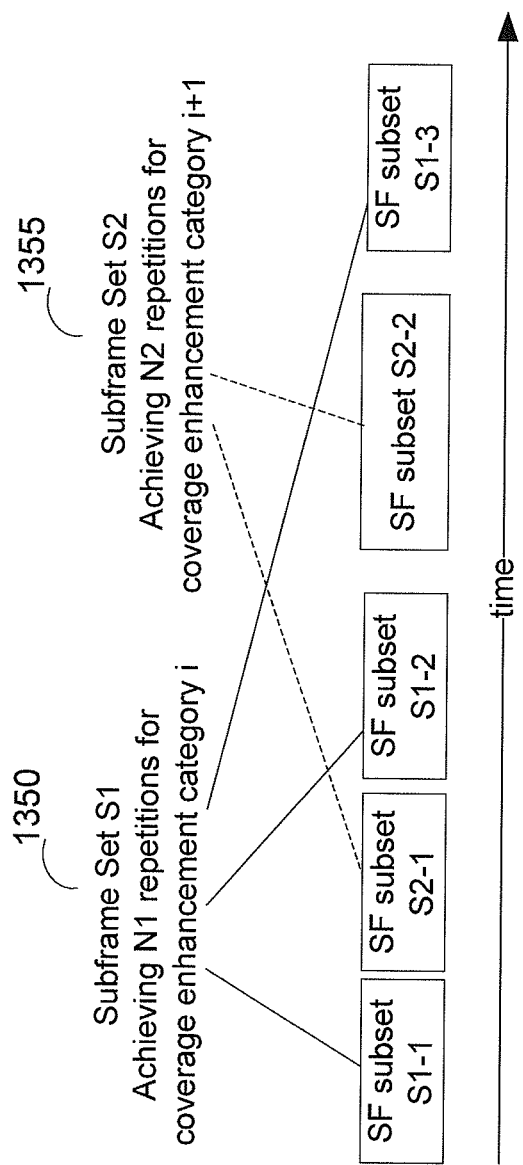

As shown in FIG. 13C, SF set $S_1$ 1350 (consisting of subsets $S_1$-1,2,3) is used for $R_1$ repetitions of the RA preamble transmission for CE category i, SF set $S_2$ 1355 (consisting of subsets $S_2$-1,2) is used for $R_2$ repetitions of the RA preamble transmission for CE category i+1, and the occurrence of the subsets are in the order (earliest to latest) $S_1$-1, $S_2$-1, $S_1$-2, $S_2$-2, $S_1$-3.

Figure 13D:
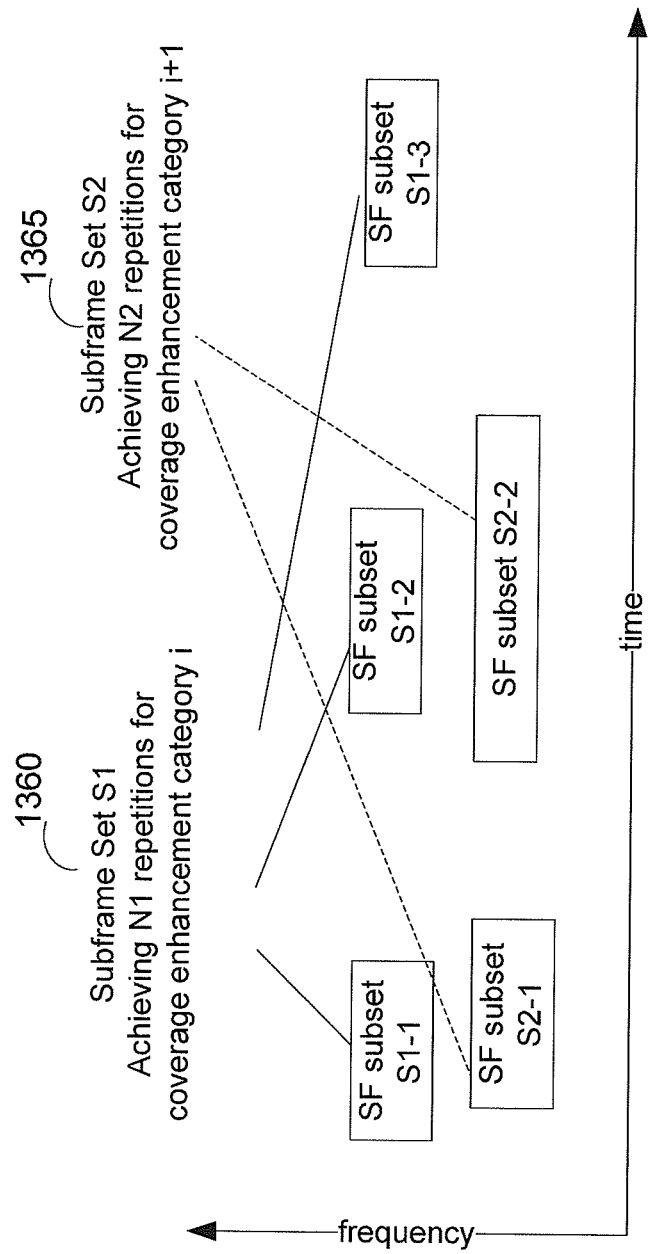

As shown in FIG. 13D, SF set $S_1$ 1360 (consisting of subsets $S_1$-1,2,3) is used for $R_1$ repetitions of RA preamble transmission for CE category i, SF set $S_2$ 1365 (consisting of subsets $S_2$-1,2) is used for R, repetitions of RA preamble transmission for CE category i+1, and set $S_1$ and $S_2$ have different frequency indexes. It is also possible that subsets of a set can have different frequency index and the resource orthogonality can be at the subset level in the frequency domain rather than the set level.

Figure 13E:
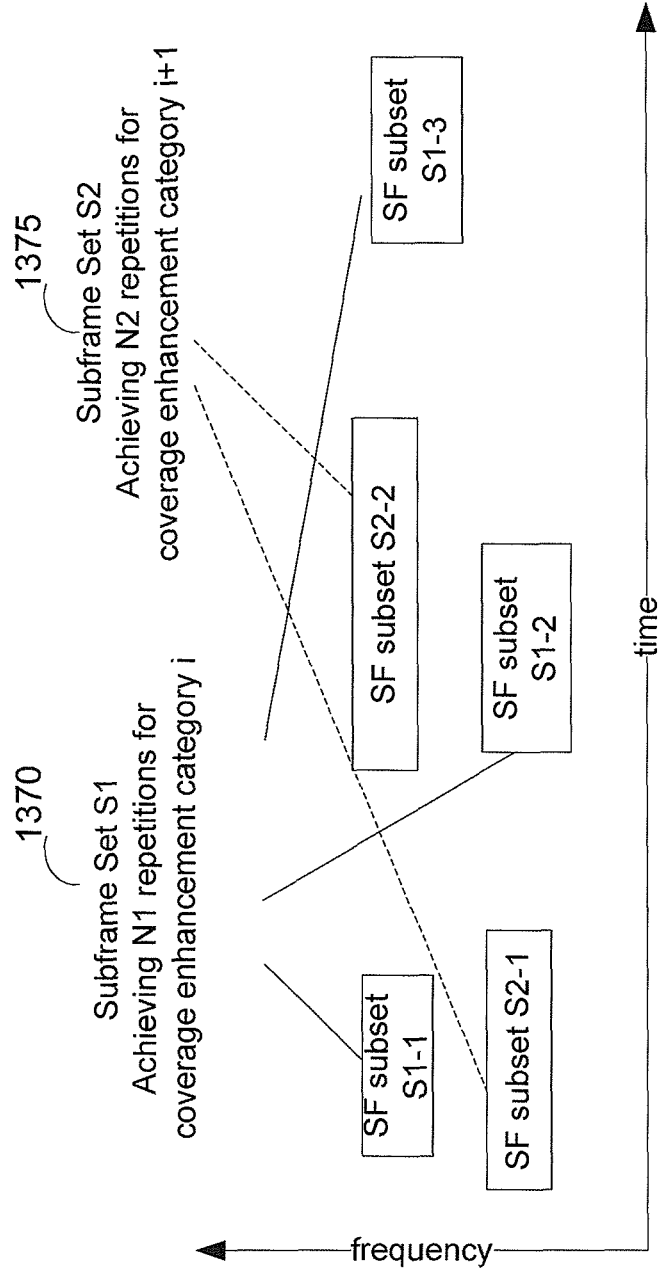

As shown in FIG. 13E, SF set $S_1$ 1370 (consisting of subsets $S_1$-1,2,3) is used for $R_1$ repetitions of the RA preamble transmission for CE category i, SF set $S_2$ 1375 (consisting of subsets $S_2$-1,2) is used for $R_2$ repetitions of the RA preamble transmission for CE category i+1. Subset $S_1$-1, $S_2$-2, $S_1$-3 use different frequency index than subsets $S_2$-1, $S_1$-2.

A RA preamble transmission with R repetitions and a respective reception can be different from conventional ones as it is further subsequently described.

Figure 14:
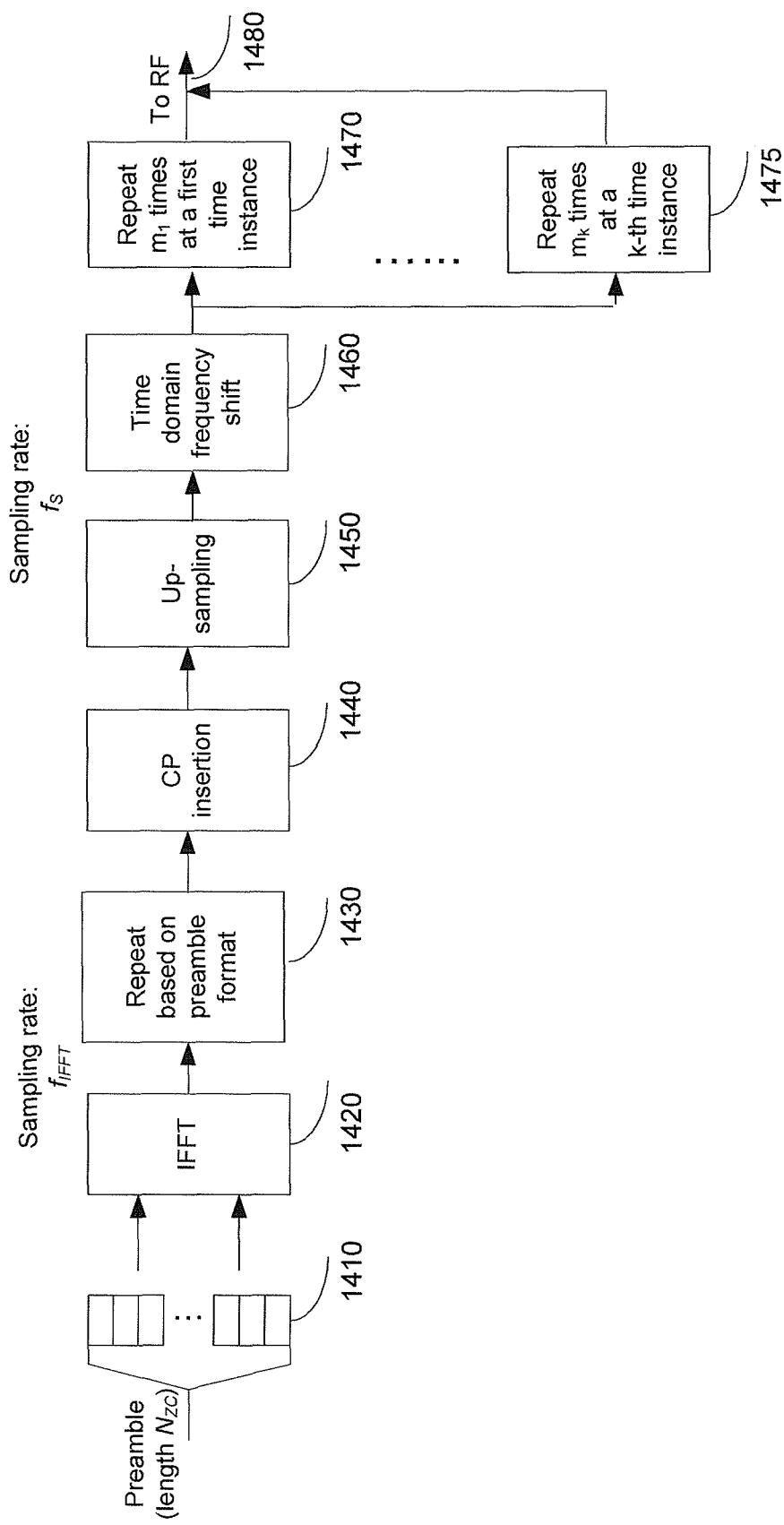
FIG. 14 illustrates an example process for a RA preamble transmission with R repetitions using a same preamble format for all repetitions according to this disclosure.

FIG. 14 illustrates an example process for a RA preamble transmission with R repetitions using a same preamble format for all repetitions according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE.

As shown in FIG. 14, a RA preamble 1410 with length $N_{ZC}$ is processed by an IFFT 1420. The RA preamble 1410 is repeated once based on a preamble format 1430 if the preamble format is 2 or 3. For preamble format 0 or preamble format 1, the RA preamble 1410 is not repeated. CP is inserted 1440 in front of the RA-preamble and up-sampling 1450 is applied. Subsequently, the signal is processed by time domain frequency shift 1460 and is then repeated $m_1$ times 1470 at a first time instance and $m_k$ times 1475 at a k-th time instance. For a FDD system, there can be one time instance. For a TDD system, there can be multiple time instances where each time instance can be within UL SF(s) in a frame (for example, if the preamble format is 0 for TDD UL/DL configuration 6, a first time instance can be in the first half frame, $m_1$=3, and a second time instance can be in the second half frame, $m_2$=2). After repetition at each time instance, a signal is transmitted by RF unit 1480. To achieve R repetitions, if there is one frequency index for RA preamble transmission in each SF, then for preamble format 0 or 1 it is $m_1$+ . . . +$m_k$=R, and for preamble format 2 or 3 it is 2·($m_1$+ . . . +$m_k$)=R If there are multiple frequency indexes used for a PRACH transmission in a SF then, for each time instance, a RA preamble repetition also counts a number of repetitions due to using multiple frequency indexes (for example, each RA preamble sequence on one frequency index is counted as one repetition).

A SIB-CE can include an indication for a set of mappings among CE levels and resources that can be used by the UE 114 to transmit PRACH for a respective CE level. A set of predefined mappings can be one of M possible combinations for PRACH resource configurations that are associated with respective CE levels. A number of ceiling ($\log_2 M$) bits can be included in SIB-CE, where ceiling(x) is the smallest integer that is larger than or equal to x.

TABLE 4A

Indication of PRACH configuration in SIB-CE

| Field | Length | Usage |
| --- | --- | --- |
| PRACH Configuration Mapping Index | ceiling($\log_2 M$) | Indicates PRACH resource configuration mapping |

Table 4B provides an exemplary association among values of a PRACH Configuration Mapping Index field included in a SIB or a SIB-CE and sets of predefined mappings among PRACH resource configurations for respective CE levels. There are four sets of predefined mappings (M=4) and therefore, a 2-bit PRACH configuration mapping index suffices. Each set of predefined mappings is defined by a respective association among PRACH resource configurations and corresponding CE levels.

TABLE 4B

Exemplary PRACH resource configuration mappings

| PRACH Configuration Mapping Index | Resources (preamble/time/frequency) |
|---|---|
| 00 | First PRACH resource configuration mapping |
| 01 | Second PRACH resource configuration mapping |
| 10 | Third PRACH resource configuration mapping |
| 11 | Fourth PRACH resource configuration mapping |

Table 4C represents a first exemplary set of predefined mappings among PRACH resource configurations and respective CE levels and can be indicated with a value of '00' of the PRACH Configuration Mapping Index field. It includes four CE levels and associates a PRACH resource configuration to each CE level.

TABLE 4C

PRACH resource configuration mapping for corresponding CE levels

| PRACH Configuration index | CE level | Enhancement amount (dB) | Initial UL TX power | Number of repetitions | Resources (preamble/time/frequency) |
|---|---|---|---|---|---|
| 00 | 0 | 0 | Conventional design | 0 | PRACH resource configuration (1, 1) |
| 01 | (1, 1) | E(1, 1) | $P_{CMAX, c}$ | N(1, 1) | PRACH resource configuration (1, 2) |
| 10 | (1, 2) | E(1, 2) | $P_{CMAX, c}$ | N(1, 2) | PRACH resource configuration (1, 3) |
| 11 | (1, 3) | E(1, 3) | $P_{CMAX, c}$ | N(1, 3) | PRACH resource configuration (1, 4) |

Table 4D represents a second exemplary set of predefined mappings among PRACH resource configurations and respective CE levels and can be indicated with a value of '01' of the PRACH Configuration Mapping Index field. It includes five CE levels and associates a PRACH resource configuration to each CE level. In a first alternative, the UE 114 can determine its required CE level, using for example one of the four previously described approaches, and transmit a PRACH using a resource configuration corresponding to a CE level from an indicated set of predefined mappings that is equal to or larger than the required CE level. In a second alternative, an UL coverage limited UE can start a random access process using a first CE level and, if the random access process fails, continue with a second CE level and so on until the largest CE level is reached or until the random access process is successful.

TABLE 4D

PRACH resource configuration mapping for corresponding CE levels

| PRACH Configuration index | CE level | Enhancement amount (dB) | Initial UL TX power | Number of repetitions | Resources (preamble/time/frequency) |
|---|---|---|---|---|---|
| 000 | 0 | 0 | Conventional design | 0 | PRACH resource configuration (2, 1) |
| 001 | (2, 1) | E(2, 1) | $P_{CMAX, c}$ | N(2, 1) | PRACH resource configuration (2, 2) |
| 010 | (2, 2) | E(2, 2) | $P_{CMAX, c}$ | N(2, 2) | PRACH resource configuration (2, 3) |
| 011 | (2, 3) | E(2, 3) | $P_{CMAX, c}$ | N(2, 3) | PRACH resource configuration (2, 4) |
| 100 | (2, 4) | E(2, 4) | $P_{CMAX, c}$ | N(2, 4) | PRACH resource configuration (2, 5) |
| 101, 110, 111 | reserved | reserved | Reserved | reserved | reserved |

If a SIB or a SIB-CE also indicates a maximum CE level in a cell, the ceiling ($\log_2 M$) bits of a PRACH Configuration Mapping Index field can be interpreted relative to the maximum CE level. For example, if a value of a PRACH Configuration Mapping Index field is '00' then, in Table 4C, E(1,3) can be 15 dB, E(1,2) can be 10 dB, E(1,1) can be 5 dB. If a maximum indicated CE level is 15 dB, then all CE levels and all PRACH resource configurations in Table 3A are supported. However, if a maximum indicated CE level is 10 dB, PRACH resources corresponding to a CE level of 15 dB in Table 4C can either ignored, or be absorbed in the ones for 10 dB, or be distributed to the ones for 5 dB and 10 dB, in a predetermined manner such as, for example, with an equal distribution to supported CE levels of 5 dB and 10 dB. Alternatively, different sets of predefined mappings among PRACH resource configurations and respective CE levels and can be defined for different maximum CE levels. For example, instead of Table 4C, Table 4E can be predefined and used by the UE 114 when a SIB-CE indicates a maximum CE level in a cell of 10 dB (E(1,1)=5 dB, E(1,2)=10 dB).

TABLE 4E

PRACH resource configuration mapping for corresponding CE levels

| PRACH Configuration index | CE level | Enhancement amount (dB) | Initial UL TX power | Number of repetitions | Resources (preamble/time/frequency) |
|---|---|---|---|---|---|
| 00 | 0 | 0 | Conventional design | 0 | PRACH resource configuration (1, 1) |
| 01 | (1, 1) | E(1, 1) | $P_{CMAX,c}$ | N(1, 1) | PRACH resource configuration (1, 2) |
| 10 | (1, 2) | E(1, 2) | $P_{CMAX,c}$ | N(1, 2) | PRACH resource configuration (1, 3) |

A mapping can also include more than one PRACH configurations for a CE level. Table 4F provides an example of PRACH resource configurations relative to CE levels. There are four CE levels, where for each of CE levels 1, 2, and 3, there are two different PRACH resource configurations. The numbers E1, E2, and E3 (E1<=E2<=E3), and the number of repetitions N1, N2, and N3 (N1<=N2<=N3 in general), can be predefined in a system operation. PRACH resources (preamble/time/frequency) can be also predefined.

TABLE 4F

Exemplary PRACH resource configurations for corresponding CE levels

| PRACH Configuration index | CE level | Enhancement amount (dB) | Initial UL TX power | Number of repetitions | Resources (preamble/time/frequency) |
|---|---|---|---|---|---|
| 000 | 0 | 0 | Conventional design | 0 | First PRACH resource configuration |
| 001 | 1 | E1 | $P_{CMAX,c}$ | N1 | Second PRACH resource configuration |
| 010 | 1 | E1 | $P_{CMAX,c}$ | N1 | Third PRACH resource configuration |
| 011 | 2 | E2 | $P_{CMAX,c}$ | N2 | Fourth PRACH resource configuration |
| 100 | 2 | E2 | $P_{CMAX,c}$ | N2 | Fifth PRACH resource configuration |
| 101 | 3 | E3 | $P_{CMAX,c}$ | N3 | Sixth PRACH resource configuration |
| 110 | 3 | E3 | $P_{CMAX,c}$ | N3 | Seventh PRACH resource configuration |
| 111 (reserved) | | | | | |

For each PRACH resource configuration in a respective Table of this disclosure, a number of repetitions can be associated with (provided by) a set of resources. The set of resources can define a starting SF, a time (SFs in certain frames) used for PRACH transmission/repetitions, a frequency index, and so on. An example is given in Table 4.

Figure 15:
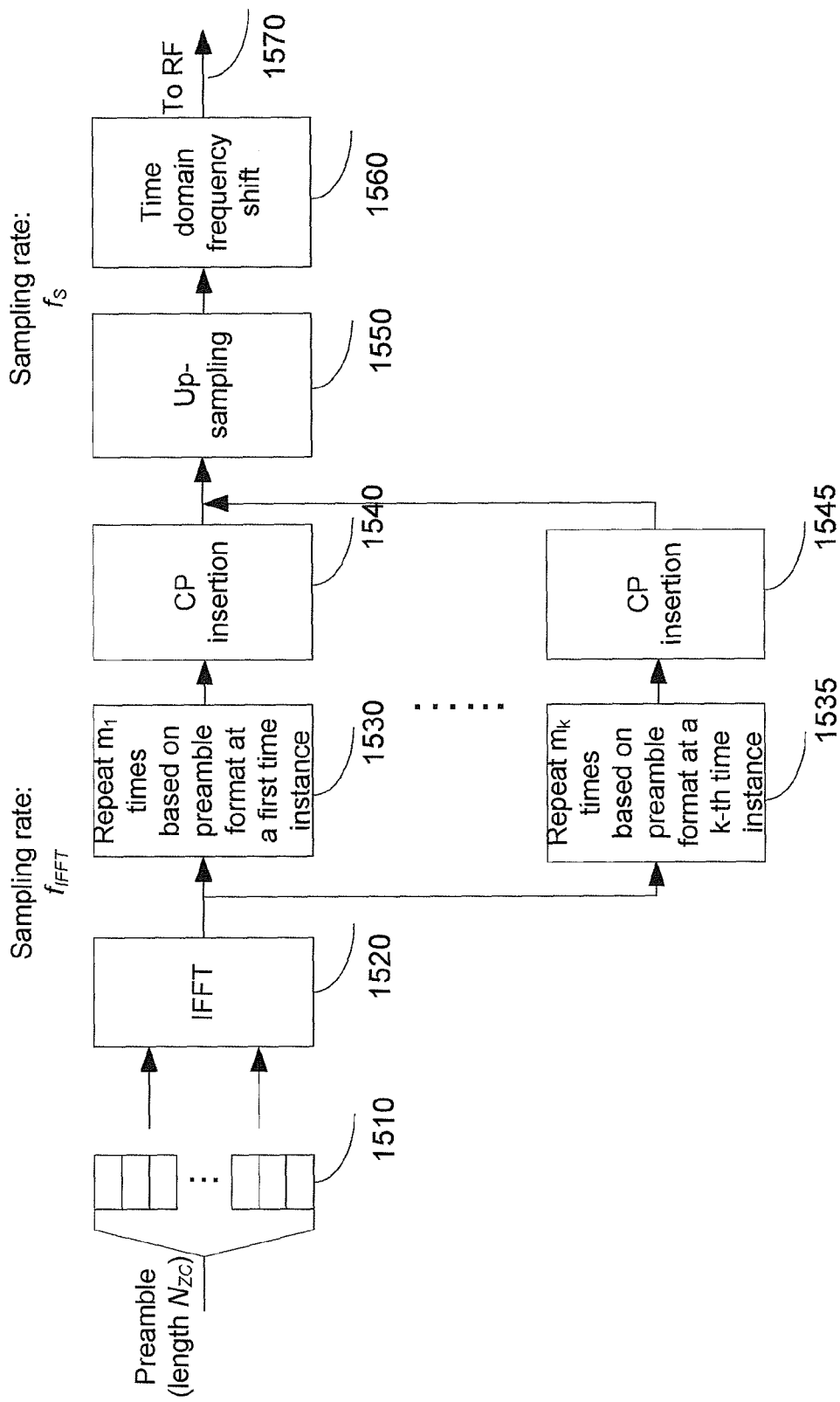
FIG. 15 illustrates an example process for a RA preamble transmission with R repetitions using a combination of different preamble formats for all repetitions according to this disclosure.

FIG. 15 illustrates an example process for a RA preamble transmission with R repetitions using a combination of different preamble formats for all repetitions according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE.

As shown in FIG. 15, a RA preamble 1510 with length $N_{ZC}$ is processed by an IFFT unit 1520. At a first time instance, the RA preamble 1510 is repeated once based on a preamble format 1530 if the preamble format is format 2 or format 3. If the preamble format is 0 or format 1, the RA preamble 1510 is not repeated. At a k-th time instance, the RA preamble 1510 is again repeated once based on the preamble format 1535 if the preamble format is format 2 or format 3, and it is not repeated if the preamble format is 0 or 1. CP is inserted 1240 in front of the RA-preamble 1510 of the first time instance. CP is inserted 1545 in front of the RA-preamble of the k-th time instance. Different CP insertion can be used depending on the format. Upsampling 1550 is applied for each transmit time instance and the signal is then processed by time domain frequency shift 1560 for each time instance and is finally transmitted by RF unit 1570.

In FIG. 15, each time instance is defined as a time duration for transmitting a RA preamble with a certain format. For a FDD system, there can be one or multiple time instances. For a TDD system, there can be one or multiple time instances where each time instance can be within UL SF(s) in a frame. For example, for TDD UL/DL configuration 6 and one frequency index, if RA preamble format 3 is used for a first time instance in the first half frame (hence $m_1=2$), a second time instance can be used in the second half frame with RA preamble format 1 (hence $m_2=1$); if RA preamble format 0 is used for a first/second/third time instance in the three UL SFs in the first half frame (hence $m_1=1$, $m_2=1$, $m_3=1$), a fourth time instance can be in the second half frame with RA preamble format 2 (hence $m_4=2$). To achieve R repetitions in case of one frequency index, $m_1+\ldots+m_k=R$, where $m_i=1$ or $m_i=2$ for $i=1,2,\ldots,k$ if formats illustrated in FIG. 7 are used.

Figure 16:
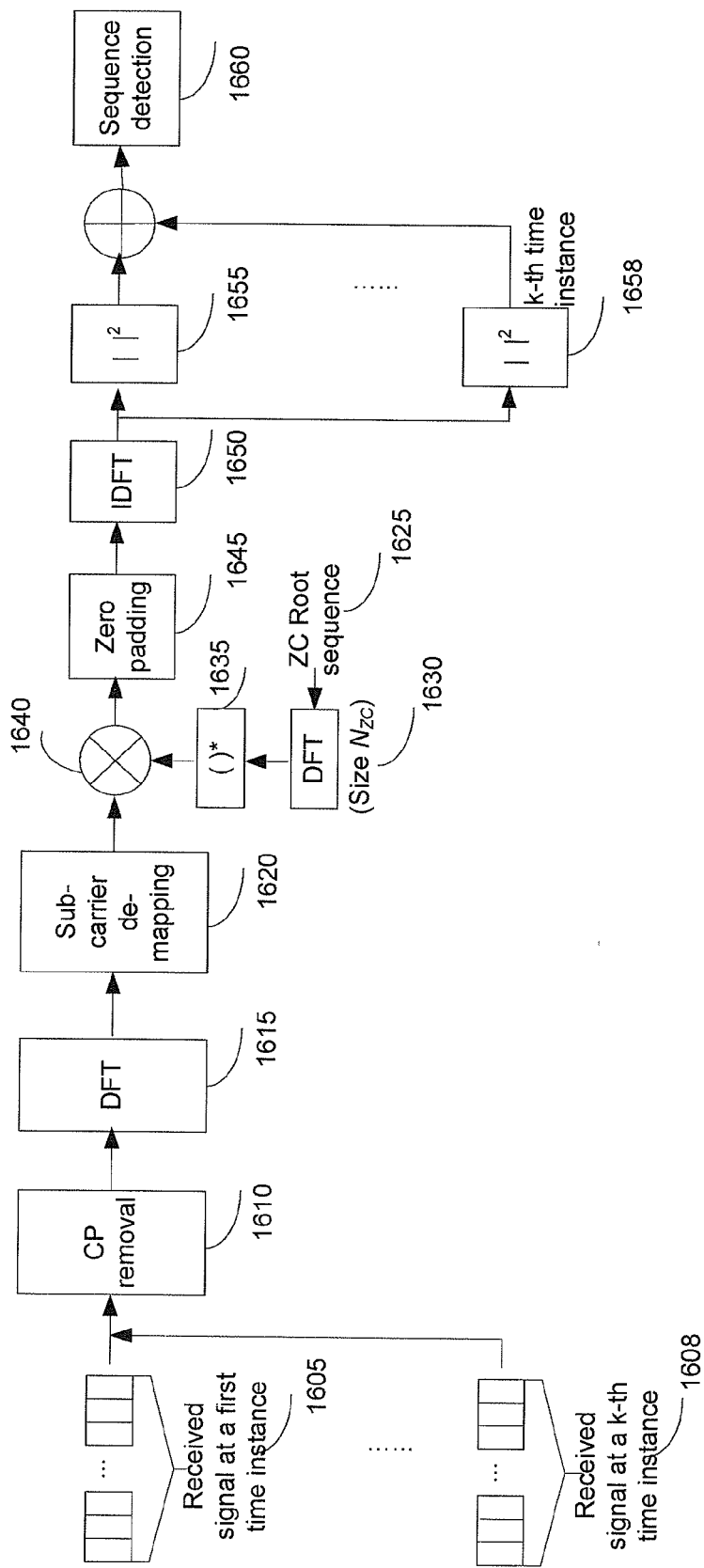
FIG. 16 illustrates an example process for RA preamble detection at an eNB where the RA preamble is transmitted with a same format for all repetitions according to this disclosure.

FIG. 16 illustrates an example process for RA preamble detection at an eNB where the RA preamble is transmitted with a same format for all repetitions according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE.

As shown in FIG. 16, a received signal at each time instance, such as a received signal at a first time instance 1605 and a received signal at k-th time instance 1608, is first processed by CP removal unit 1610, by DFT unit 1615, followed by subcarrier de-mapping 1620. A resulting signal is then processed by correlating 1640 with a local signal obtained by conjugating a DFT 1630 of a ZC root sequence 1625, where the ZC sequence 1625 can be any of the sequences used for contention based random access in case of contention based PRACH transmission. After zero padding 1645 and processing by IDFT unit 1650, an energy for each resulting signal at each respective time instance is obtained, such as an energy at the first time instance 1655 and an energy at the k-th time instance 1658. Resulting energies are then combined and processed by sequence detection unit 1660 where, for example, sequences 1625 resulting to a value above a threshold can be considered as detected.

Figure 17:
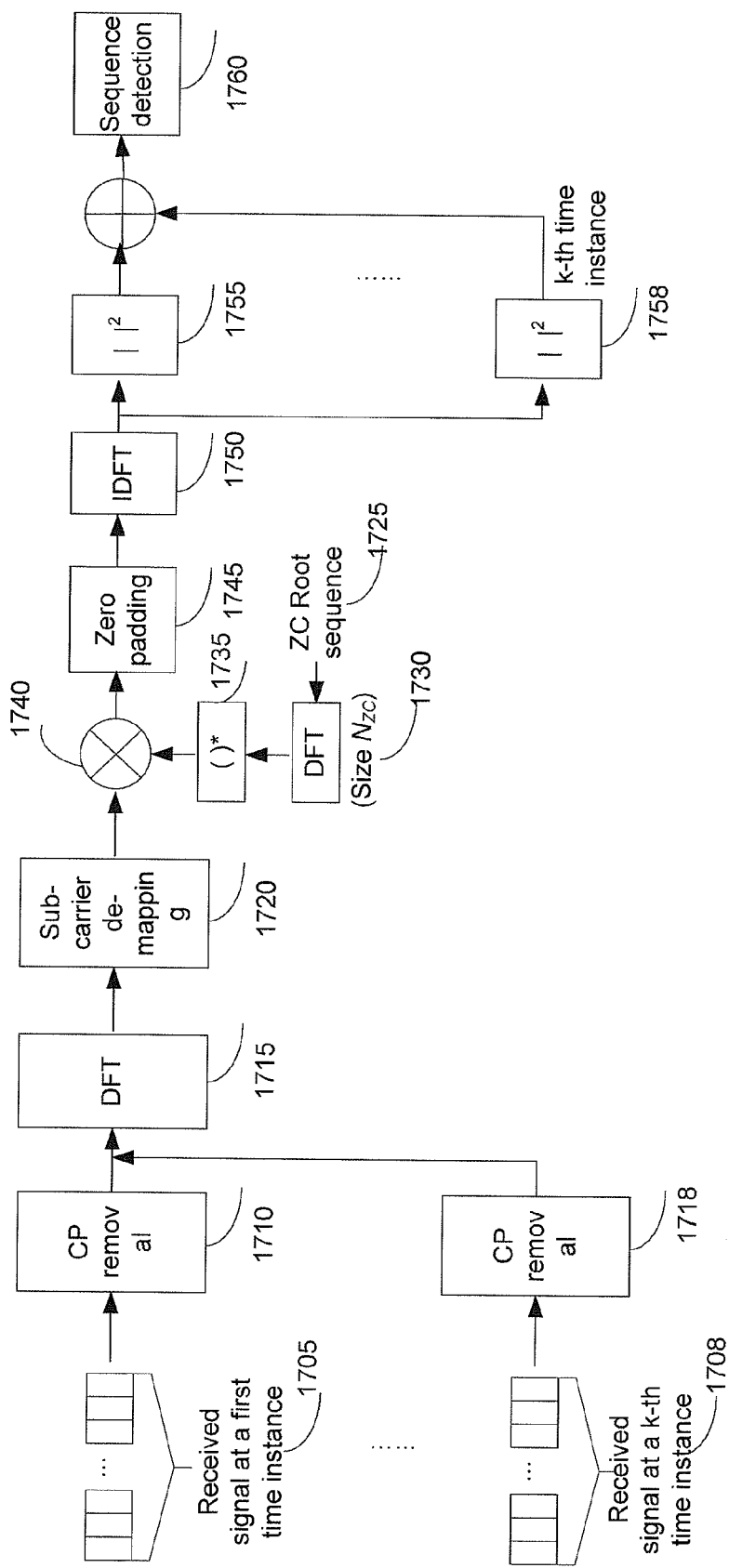
FIG. 17 illustrates an example process for RA preamble detection at an eNB where the preamble is transmitted with a combination of different formats for all repetitions according to this disclosure.

FIG. 17 illustrates an example process for RA preamble detection at an eNB where the RA preamble is transmitted with a combination of different formats for all repetitions according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE.

As shown in FIG. 17, a received signal at a first time instance 1705 is processed by CP removal unit 1710 and a received signal at a k-th time instance 1708 is processed by CP removal unit 1718. A resulting signal is subsequently processed by DFT unit 1715 and subcarrier de-mapping 1720 is then applied. An output signal is processed by matching or correlating 1740 with another signal obtained as a conjugate of a DFT 1730 of ZC root sequence 1725 where the ZC sequence 1725 can be any of the sequences used for contention based random access in case of contention based PRACH transmission. After zero padding 1745 and processing by IDFT unit 1750, an energy for each resulting signal at each time instance is obtained, such as an energy of a signal at a first time instance 1755 and an energy of a signal at a k-th time instance 1758. Resulting energies are then combined and processed by sequence detection 1755 where, for example, sequences 1725 resulting to a value above a threshold can be considered as detected.

If the UE 114 fails to successfully detect a RAR from the eNB 102 after transmitting a RA preamble using $P_{CMAX,c}$ and repetition parameters determined from an estimated path-loss in category i as in Table 2 then, for a subsequent transmission of a RA preamble using $P_{CMAX,c}$, the UE 114 can change configuration from category i to category i+1 (for example, increase a number of repetitions). The UE 114 can also select a new RA preamble for PRACH retransmission. UEs with an estimated path-loss in the last category perform RA preamble retransmissions use a same configuration as for an initial transmission.

For a retransmission of a RA preamble, if a preamble group selection (as in Table 3) is based on an estimated path-loss, a preamble group selection can be same as for an initial transmission. For such, the preamble Group A, 1, 1a, 1b can be same and Group B, 2, 2a, 2b can be same, so that the eNB 102 can know an amount of CE the UE 114 needs, regardless of the RA preamble in an initial transmission or in a retransmission.

A RA preamble retransmission from the UE 114 can depend on a method the NB 102 uses to convey a configuration of PRACH resources to the UE 114. If the UE 114 acquires only SIB-CE and does not acquire SIB2, PRACH resources indicated in SIB-CE can be for CE PRACH with a certain number of repetitions of a RA preamble, for example, as in Table 2 for categories 1-4. A second method is that a UE of a first category acquires both SIB2 and SIB-CE or only SIB2 and a UE of a second category acquires only SIB-CE. For example, a UE of the first category can be a UE that supports mobility that is typically not coverage limited while a UE of the second category can be a UE that does not support mobility and can be coverage limited.

The UE 114 can determine whether it operates in normal coverage mode or in CE mode. It can determine it is coverage limited if, for example, an estimated path loss is larger than a threshold, or a channel measurement such as reference signal received power (RSRP) is lower than a threshold, or a PSS/SSS cannot be detected after a predefined number of attempts, or a conventional PBCH cannot be detected after a predefined number of attempts, or a SIB or SIB-CE cannot be detected by a predefined or configured number of attempts, etc.

Figure 18:
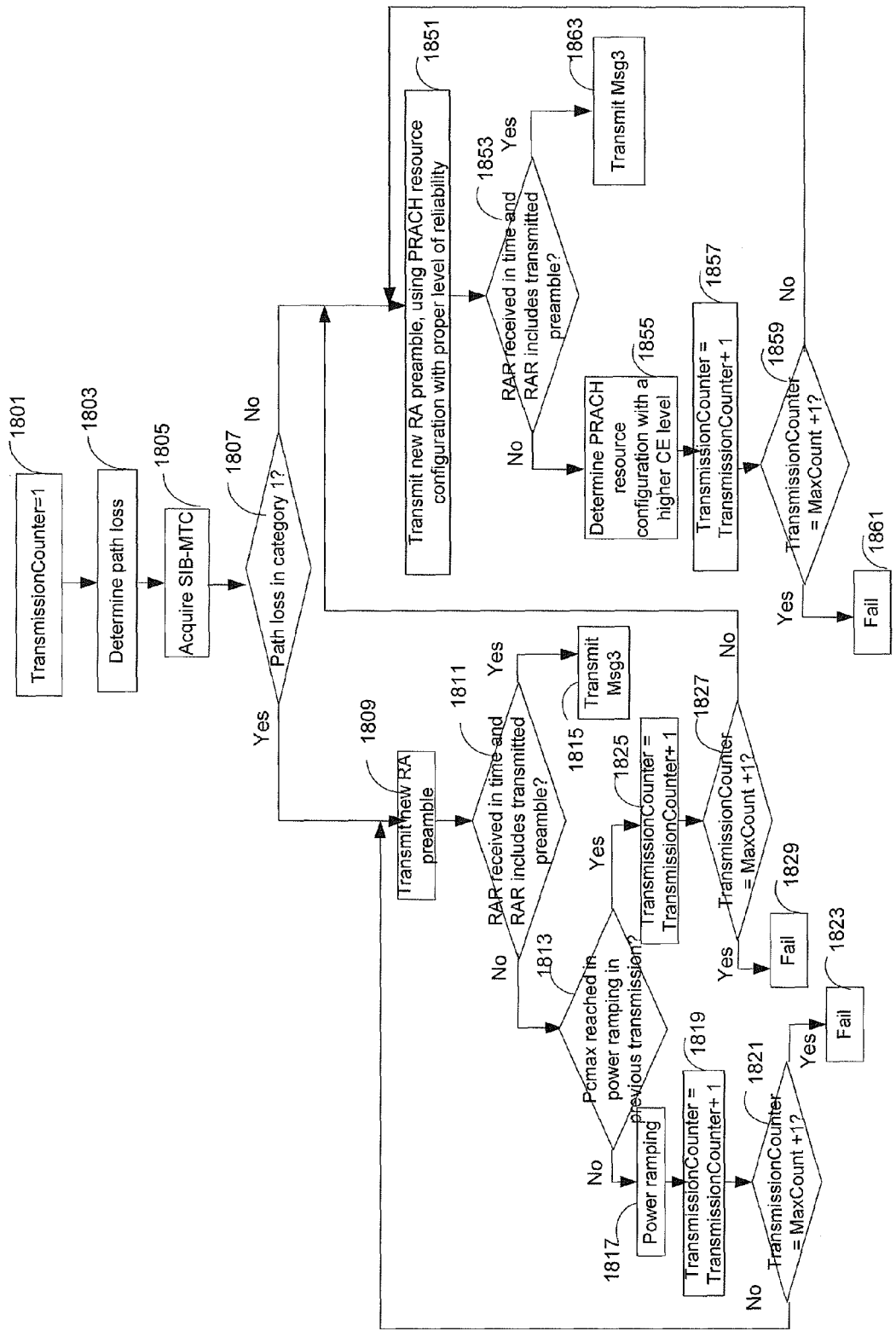
FIG. 18, illustrates a process for a UE for initial transmission and for a retransmission of a RA preamble for a first method for acquiring system information according to this disclosure.
Figure 19A:
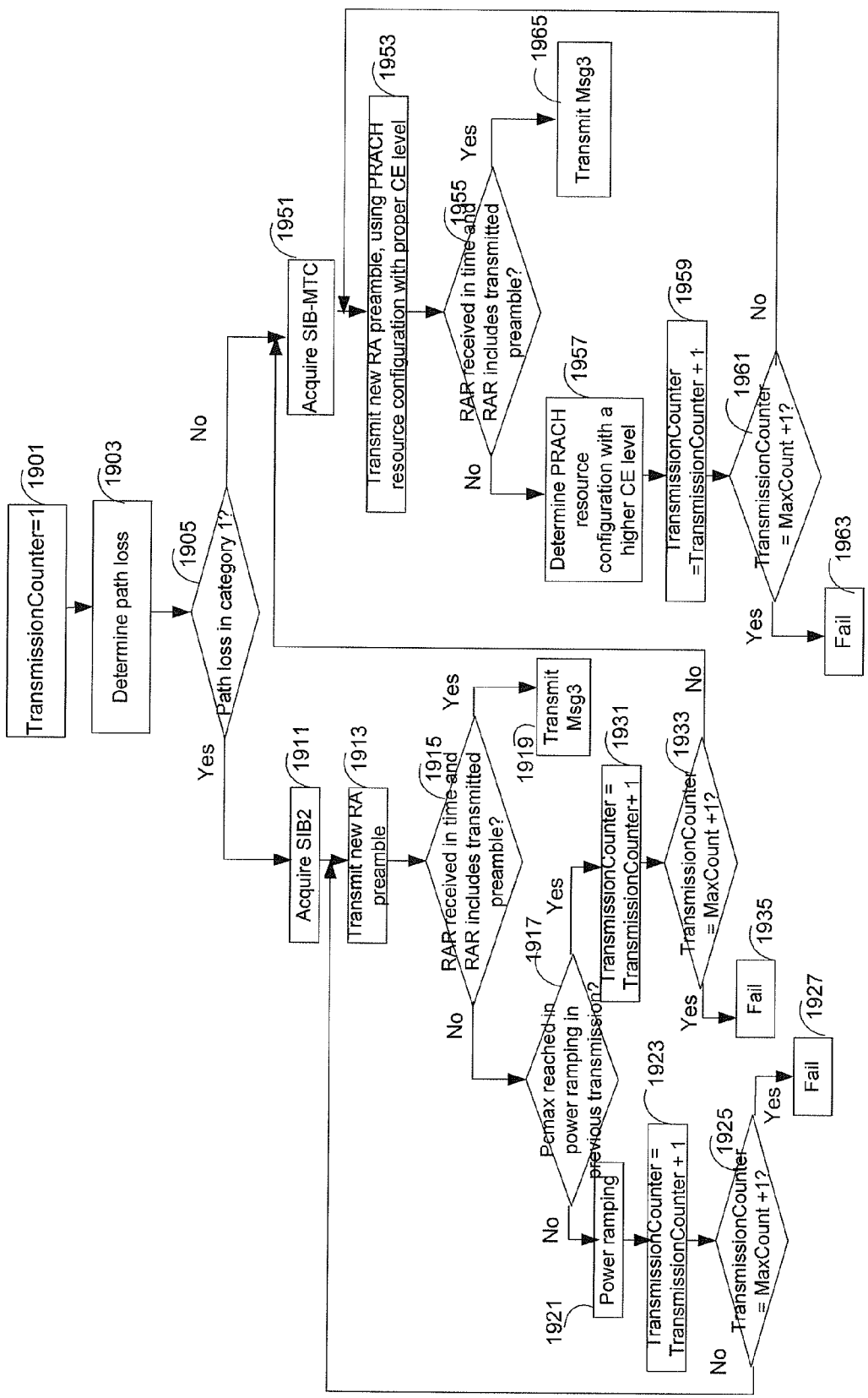
FIG. 19A illustrates a process for a UE for initial transmission and for a retransmission of a RA preamble for a second method for acquiring system information according to this disclosure.

FIGS. 18 and 19A illustrate examples of operations for a UE for initial transmission and for a retransmission of a RA preamble for a first method and for a second method, respectively, for acquiring system information according to this disclosure. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes depicted in the examples depicted are implemented by a transmitter chain in, for example, a UE.

As shown in FIG. 18, the UE 114 acquires only SIB-CE and does not acquire SIB2. The UE 114 can perform power ramping for a PRACH retransmission. When a number (maximum count) of RA preamble transmissions for a current CE level is reached, the UE 114 uses a PRACH resource configuration for a next CE level (for example, for CE level i+1 if a previously failed PRACH transmission was for CE level i). A total PRACH transmission count (including initial transmission and retransmissions) cannot exceed a maximum count. The maximum count can be same for all CE levels or can be configured (by system information) separately for each CE level. The UE 114 sets, in operation 1801, TransmissionCounter to 1 and determines a path-loss to the eNB 102 in operation 1803. The UE 114 acquires SIB-CE in operation 1805 (step 1801 can also occur after step 1803 or 1805) and determines, in operation 1807, whether the path-loss is in category 1 as in Table 1A or Table 2. If it is, the UE 114 transmits a new RA preamble in operation 1809, using a power determined by a power setting rule as for a non-CE UE. The UE 114 determines whether an RAR is decoded successfully in operation 1811 and whether the RAR is received in time (before a certain timer expires) and indicates the transmitted RA preamble. If the RAR decoding is successful, the UE 114 transmits Msg3; otherwise, the UE 114 determines whether a transmission power for the RA preamble was Pcmax 1813. If it wasn't, the UE 114 applies power ramping in operation 1817 and increases the TransmissionCounter by 1 in operation 1819. If the TranmissionCounter reaches MaxCount+1, where MaxCount can be a parameter the UE 114 acquired (for example, via SIB-CE or predefined), then the random access process fails in operation 1823; otherwise, the UE 114 selects and transmits a new RA preamble in operation 1809 using a transmission power after power ramping and the random access process is repeated. If in operation 1813, the RA preamble transmission power reached Pcmax in the previous transmission, that is in operation 1809, the UE 114 increases TranmissionCounter by 1. If the Tranmission-Counter reaches MaxCount+1, the RACH process fails in operation 1829; otherwise, the UE selects 114 and transmits a new RA preamble using $P_{CMAX,c}$ where for each transmission a new RA preamble can be selected and the TransmissionCounter will be increased by 1. If the random access process still fails, the UE 114 can use a PRACH resource configuration for a next CE level in operation 1851 (for example, with $R_1$ repetitions as in Table 1B). Then, the UE 114 determines whether a RAR is successfully decoded in operation 1853. If the RAR is successfully decoded, the UE 114 transmits Msg3 in operation 1863; otherwise, the UE 114 determines a PRACH resource configuration with a next higher CE level in operation 1855 (for example, with $R_2$ repetitions as in Table 1B). The UE 114 then increases TransmissionCounter by 1. If the TransmissionCounter reaches MaxCount+1, the RACH process fails in operation 1861; otherwise, the UE 114 selects and transmits a new RA preamble with a next CE level 1851 in operation 1855 (for example, with $R_2$ repetitions as in Table 1B) and the procedure is repeated. If the CE level in operation 1855 is already the highest, the PRACH resource configuration remains corresponding to this highest level. If in operation 1807 the UE 114 determines that the path-loss is not in category 1 as in Table 1A or Table 2, the UE 114 determines a PRACH resource configuration based on a CE level (for example, as in Table 2) and transmits a new RA preamble using a PRACH resource configuration with the determined CE level 1851. The subsequent operations are as previously described for a UE that determines a path-loss in category 1 and arrives at operation 1851. The operation in step 1803 can be omitted and operation in step 1807 can be replaced by "UE operates in normal coverage mode?" where whether the UE operates in normal coverage mode can be determined by other means such as by whether P-BCH can be detected by a number of attempts less than a predefined number.

FIG. 19A includes functionalities that are similar to those in FIG. 18 with a few variations as they are subsequently described according to this disclosure. As shown in FIG. 19A, the UE 114 acquires SIB2 if an estimated path-loss is in category 1 as in Table 2; otherwise, it acquires SIB-CE. If the UE 114 first acquires SIB2, the UE 114 can perform power ramping when it retransmits a RA preamble. When the UE 114 reaches a maximum transmission power and the random access process fails, the UE 114 acquires SIB-CE and determines a PRACH resource configuration with a next CE level (for example, category 2 as in Table 2), for a RA preamble retransmission. The UE 114 sets, in operation 1901, TransmissionCounter to 1, determines a path-loss in operation 1903, and further determines, in operation 1905, whether the estimated path-loss is in category 1 as in Table 2. If it is, the UE 114 acquires SIB2 1911 and transmits a new RA preamble, in operation 1913, using a power determined by a power setting rule as for a non-CE UE. The UE 114 follows operations 1915-1935, similar to operations 1811-1829 as in FIG. 18. If in operation 1917, the RA preamble transmission power reached Pcmax in a previous transmission, the UE 114 increases TransmissionCounter by 1. If the TranmissionCounter reaches MaxCount+1, the RACH process fails in operation 1935; otherwise, the UE 114 acquires SIB-CE in operation 1951 and selects and transmits a new RA preamble using a PRACH resource configuration with a next CE level in operation 1953 that in this case corresponds to category 2 as in Table 2. The subsequent operations 1955-1965 are similar to operations 1853-1863 as in FIG. 18. If in operation 1905 the UE 114 determines that the estimated path-loss is not in category 1 as in Table 2, the UE 114 acquires SIB-CE in operation 1951, determines a proper PRACH resource configuration based on the path-loss category as in Table 2, and transmits a new RA preamble using the determined PRACH resource configuration having a next higher CE level in operation 1953. If the CE level in operation 1953 is already the highest, a determined PRACH configuration remains corresponding to this highest level. The subsequent operations are as previously described when the UE 114 initially estimates a path-loss in category 1 and arrives at operation 1951. The operation in step 1903 may be omitted, and operation in step 1905 may be replaced by "UE operates in normal coverage mode?", where whether the UE operates in normal coverage mode can be determined by other means such as by whether P-BCH can be detected by a number of attempts less than a predefined number.

The UE 114 can determine an initial CE level to perform PRACH. The initial CE level can be, for example, an initial CE level indicated by the eNB 102 (for example, in a SIB or a SIB-CE), or an initial CE level determined by one or more measurements or statistics (such as an estimated path loss, a channel measurement such as a RSRP, a number of attempts to decode PSS/SSS, a number of attempts to decode P-BCH, or repeated P-BCH (referred to as P-BCH-CE), or SIBs or SIB-CEs, etc.), or a lowest CE level (for example, a configuration of one or multiple CE level can be indicated in SIB or SIB-CE or be predetermined in a system operation), or a highest CE level for PRACH (that can be determined as for a lowest one), or a randomly chosen CE level among all CE levels configured for PRACH, or a lowest CE level predetermined in the system operation, of the like. For example, if a path-loss measurement for the UE 114 in CE mode cannot be sufficiently accurate, the UE 114 can start RA preamble transmission using a first CE level and, if the random access process is not successful, progressively continue with next higher CE levels until the highest CE level is reached or until the RA process is successful.

The UE 114 first transmits a PRACH using a resource from a set of resources corresponding to the initial CE level. If a PRACH with an initial CE level fails, the UE 114 can retransmit the PRACH assuming a next higher CE level (if any). If the UE 114 transmits PRACH with a resource from a set of resources corresponding to a highest CE level, subsequent retransmissions for a same random access process again use a resource from this set of resources. For a CE level (whether initial or not), the UE 114 can determine respective PRACH resources based on a mapping from a CE level to PRACH resources. Such a mapping can be, for example, a set of RBs or a set of SFs configured for a respective CE level.

If an initial CE level is determined by one or more of the parameters (such as the estimated path-loss, channel measurement such as RSRP, a number of attempts to decode PSS/SSS, a number of attempts to decode conventional P-BCH, or repeated P-BCH-CE, or SIBs or SIB-CEs, etc.), the UE 114 can use a predefined or configured mapping function or mapping table to determine an initial CE level, where for example, each range of a parameter can be mapped to a CE level. In another example, a combination of the ranges of two or more parameters can be mapped to a CE level. The configuration of the mapping function or mapping table can be indicated in a SIB or a SIB-CE or be predetermined in the system operation. Indication by system information is beneficial for capturing different eNB receiver characteristics, such as a different number of receiver antennas, thereby requiring different CE level for a same path-loss (for example, for a same path-loss, an eNB with less receiver antennas will require more repetitions than an eNB with more receiver antennas). For example, a mapping from estimated path-loss to initial CE level is provided in part of Table 2. Table 4G provides an exemplary mapping from RSRP in cell c ($RSRP_c$) to initial CE level, where $RSRP_{Th}$, is a threshold, and $\delta_{RSRP1}$ is an offset relative to the threshold $RSRP_{Th}$. Table 4H provides an exemplary mapping from a number of decoding attempts in cell c ($Num\_dec_c$) to an initial CE level, where $Num\_dec_{Th}$ is a threshold, and $\delta_{Numdec\_1}$ is an offset relative to the threshold $Num\_dec_{Th}$, where the decoding can be for PSS/SSS, P-BCH, or P-BCH-CE, or SIBs or SIB-CEs, or the like. Table 4I provides an exemplary mapping from two numbers of decoding attempts (for example, each number can be for a channel) in cell c ($Num\_dec\_ch1_c$ for a first channel, $Num\_dec\_ch2_c$ for a second channel), to an initial CE level, where $Num\_dec\_ch1_{Th}$, $Num\_dec\_ch2_{Th}$ are respective thresholds, and $\delta_{Num\_dec\_ch1}$, $\delta_{Num\_dec\_ch2}$ are respective offsets relative to the threshold $Num\_dec\_ch1_{Th}$, $Num\_dec\_ch2_{Th}$, where the decoding can be for channels PSS/SSS, P-BCH, or P-BCH-CE, or SIBs or SIB-CEs, or the like. For example, a first channel can be for P-BCH, a second channel can be for SIB or SIB-CE. One or more sets of conditions on the numbers of decoding attempts can be mapped to one CE level, for example, there is one set of conditions mapping to CE level 1 and there are two sets of conditions mapping to CE level 3 as in Table 4I.

TABLE 4G

Exemplary mapping from RSRP to initial CE level

| CE level | RSRP |
|---|---|
| 0 | $RSRP_c \geq RSRP_{Th}$ |
| 1 | $RSRP_{Th} > RSRP_c \geq RSRP_{Th} - \delta_{RSRP1}$ |
| 2 | $RSRP_{Th} - \delta_{RSRP1} > RSRP_c$ |

TABLE 4H

Exemplary mapping from a number of decoding attempts to an initial CE level

| CE level | Number of decoding attempts |
|---|---|
| 0 | $Num\_dec_c \leq Num\_dec_{Th}$ |
| 1 | $Num\_dec_{Th} < Num\_dec_c \leq Num\_dec_{Th} + \delta_{Num\_dec1}$ |
| 2 | $Num\_dec_{Th} + \delta_{Num\_dec1} < Num\_dec_c$ |

TABLE 4I

Exemplary joint mapping from a number of decoding attempts for a first channel and a number of decoding attempts for a second channel to an initial CE level

| CE level | Number of decoding attempts for a first channel | Number of decoding attempts for a second channel |
|---|---|---|
| 0 | $Num\_dec\_ch1_c \leq$ | $Num\_dec\_ch2_c \leq Num\_dec\_ch_{Th}$ |
| 1 | $Num\_dec_{Th}$ | $Num\_dec\_ch2_{Th} < Num\_dec\_ch2_c \leq Num\_dec\_ch2_{Th} + \delta_{Num\_dec\_ch2}$ |

TABLE 4I-continued

Exemplary joint mapping from a number of decoding attempts
for a first channel and a number of decoding attempts
for a second channel to an initial CE level

| CE level | Number of decoding attempts for a first channel | Number of decoding attempts for a second channel |
|---|---|---|
| 3 | | Num_dec_ch2$_{Th}$ + $\delta_{Num\_dec\_ch2}$ < Num_dec_ch2$_c$ |
| 2 | Num_dec_ch1$_{Th}$ < | Num_dec_ch2$_c$ <= Num_dec_ch$_{Th}$ |
| 3 | Num_dec_ch1$_c$ <= Num_dec_ch1$_{Th}$ + $\delta_{Num\_dec\_ch1}$ | Num_dec_ch2$_{Th}$ < Num_dec_ch2$_c$ <= Num_dec_ch2$_{Th}$ + $\delta_{Num\_dec\_ch2}$ |
| 4 | $\delta_{Num\_dec\_ch1}$ | Num_dec_ch2$_{Th}$ + $\delta_{Num\_dec\_ch2}$ < Num_dec_ch2$_c$ |
| 4 | Num_dec_ch1$_{Th}$ + $\delta_{Num\_dec\_ch1}$ < | Num_dec_ch2$_c$ <= Num_dec_ch$_{Th}$ |
| 4 | Num_dec_ch1$_c$ | Num_dec_ch2$_{Th}$ < Num_dec_ch2$_c$ <= Num_dec_ch2$_{Th}$ + $\delta_{Num\_dec\_ch2}$ |
| 5 | | Num_dec_ch2$_{Th}$ + $\delta_{Num\_dec\_ch2}$ < Num_dec_ch2$_c$ |

The UE 114 can determine a CE level required for initial access to the eNB 102 and select PRACH resources, from a set of PRACH resources indicated by the eNB 102 via a SIB-CE (or a SIB), based on a determined CE level. For the subsequent access to the eNB 102, including access from RRC_IDLE and other access events, the UE 114 can either perform a same procedure as for initial access or can transmit PRACH according to a CE level configured by the eNB 102.

The UE 114 can determine a CE level that UE 114 requires to establish communication with the eNB 102 based on a Reference Signal Received Power (RSRP) measurement. After detecting a SIB or SIB-CE, information of a transmission power for a RS, such as a CRS or a CSI-RS, transmitted by eNB 102 and used for RSRP measurement can be obtained. Based on the RSRP, the UE 1.14 can estimate a path-loss (based on the difference between the indicated RS transmission power and the RSRP) and can determine a PRACH CE level based on the path-loss, for example by using Equation (1) to determine a difference between (PREAMBLE_RECEIVED_TARGET_POWER+ $PL_c$) and $P_{CMAXc}(i)$ that can be used to indicate an additional required CE level.

In an alternative, the UE 114 can use as a metric for estimating a CE level a number of decoding attempts or a time required to detect PSS/SSS, PBCH, PBCH-CE, or a SIB, or a SIB-CE. For example, if a number of decoding attempts for detecting a PSS/SSS is smaller than or equal to a predefined number, the UE 114 can assume operation in a normal coverage mode, while if a number of decoding attempts for detecting a PSS/SSS is larger than the first predefined number and smaller than or equal to a second predefined number, it can assume operation with a first CE mode, and so forth.

The UE 114 can assume it is coverage limited if it does not detect a conventional signal (PSS/SSS) or channel (MIB/SIB) after a predetermined number of decoding attempts. For example, if the UE 114 cannot detect a conventional PBCH after a predefined number of MAX_MIB_Attempt decoding attempts it can assume it is coverage limited. If the UE 114 detects a conventional PBCH with a number of attempts no greater than MAX_MIB_Attempt but fails to detect a SIB after a predefined number MAX_SIB_Attempt of decoding attempts, the can assume it is coverage limited. Alternatively, the UE 114 can perform a channel measurement and, if the channel measurement metric (such as RSRP) is lower than a predefined threshold (or if a path-loss is larger than another predefined threshold) informed in a SIB or a SIB-CE, the UE 114 can assume it is coverage limited. Multiple CE levels can also be defined and the UE 114 can determine a CE level for subsequent operation based on a number of decoding attempts before detection a PSS/SSS or a MIB or a SIB or based on a channel measurement metric.

The aforementioned approaches can be used for the UE 114 to determine an initial coverage mode or CE level for initial access such as an initial access when it first powers on. It can also be used for the UE 114 to determine an initial coverage mode or CE level in subsequent access, such as an access from RRC_IDLE, access in other events such as when it performs cell re-selection, and so on. The access can include contention-based RACH, such as access from RRC_IDLE, RRC connection re-establishment procedure, handover when UL synchronization needs to be established to a new cell, DL data arrival during RRC_CONNECTED requiring random access procedure (for example, when UL synchronization status is "non-synchronized"), UL data arrival during RRC_CONNECTED requiring random access procedure (for example, when UL synchronization status is "non-synchronized" or there are no PUCCH resources available for transmission of a service request), or contention-free RACH, such as re-establishing UL synchronization upon DL data arrival, handover, and positioning.

For the subsequent access, as an alternative to the approaches for initial access after a first power-on, the UE 114 can use a previously used, or cached, or network-configured, coverage mode (such as a normal coverage mode or an enhanced coverage mode) or CE level (including a number of PRACH repetitions and a TX power), with respect to a certain cell, as the initial coverage mode or CE level for the UE 114 to perform the access to the said cell. The UE 114 can cache its coverage mode or CE level that it used before. A cached coverage mode or CE level can be, for example, one that results a most recent successful access to a respective cell or the latest one attempted to access a respective cell. The UE 114 also can memorize a coverage mode or CE level for accessing certain cell previously configured by the network, and uses such coverage mode and CE level to access the cell.

If the UE 114 is re-entering the network (for example, after a certain sleep period or idle period), the initial CE level can be one of (but not limited to) the one configured to the UE 114 prior to its re-entering the network, or a cached CE level, and so on. For example, before the UE 114 transitions to RRC_IDLE from RRC_CONNECTED, the eNB 102 can configure the UE 114, using for example a RRC connection release message, whether the UE 114 applies a CE mode or a normal, non-CE mode when it performs access from RRC_IDLE, or configure the UE 114 to use an initial CE level using, for example, a RRC connection release message The UE 114 uses the configured coverage mode or CE level to access the eNB 102. Alternatively, the UE 114 can apply a timer with a value that can be configured, for example by RRC signaling. The timer value can be related to mobility. For example, for high mobility the timer value can be lower, while for low mobility the timer value can be larger. The timer can start when the UE 114 is configured with a CE mode. In case of initial access from RRC_IDLE, the timer can start when the UE 114 enters RRC_IDLE. If the timer expires before the UE 114 starts a new access, the UE 114 can apply one of the aforementioned approaches that are applicable to an initial access when the UE 114 powers on. If the timer does not expire before the UE 114 starts a new access, the UE 114 stops the timer, and the UE 114 can apply one of the aforementioned approaches which are applicable to a subsequent access.

Figure 19B:
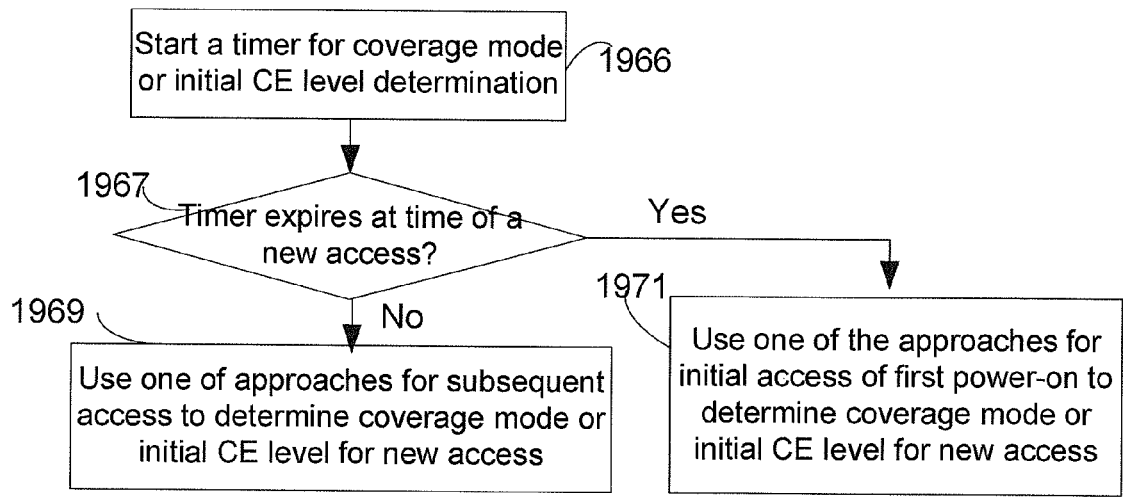
FIG. 19B illustrates procedure process for a UE to determine an initial coverage enhancement level according to a timer.

FIG. 19B illustrates an example procedure for a UE 114 to determine an initial CE level according to a timer. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes depicted in the examples depicted are implemented by a transmitter chain in, for example, a UE.

As shown in FIG. 19B, the UE 114 starts a timer for coverage mode or initial CE level determination in operation 1966. For example, the UE 114 can start the timer when the UE 114 enters RRC_IDLE. The UE 114 determines whether the timer expires at the time of a new access in operation 1967. If the timer has expired, in operation 1971, the UE 114 uses one of the approaches applicable for initial access of first power-on to determine a coverage mode or initial CE level to perform a new access; otherwise, in operation 1969, the UE 114 uses one of the approaches applicable for subsequent access to determine a coverage mode or initial CE level to perform the new access.

A use of the previous approach can be configured by the eNB 102 to the UE 114 and can be based, for example, on a UE status or property such as a UE type or usage, a UE mobility, or a UE location. For example, to determine an initial CE level for a subsequent access, a UE with limited mobility can be configured one of the approaches that are applicable for subsequent access to determine a coverage mode; a UE with mobility can be configured one of the approaches that are applicable for initial access of first power-on to determine an initial CE level for a subsequent access. As an alternative, a UE can always first use a cached or previously configured initial CE level, if any, for an access regardless of the type or property of the UE.

Figure 19C:
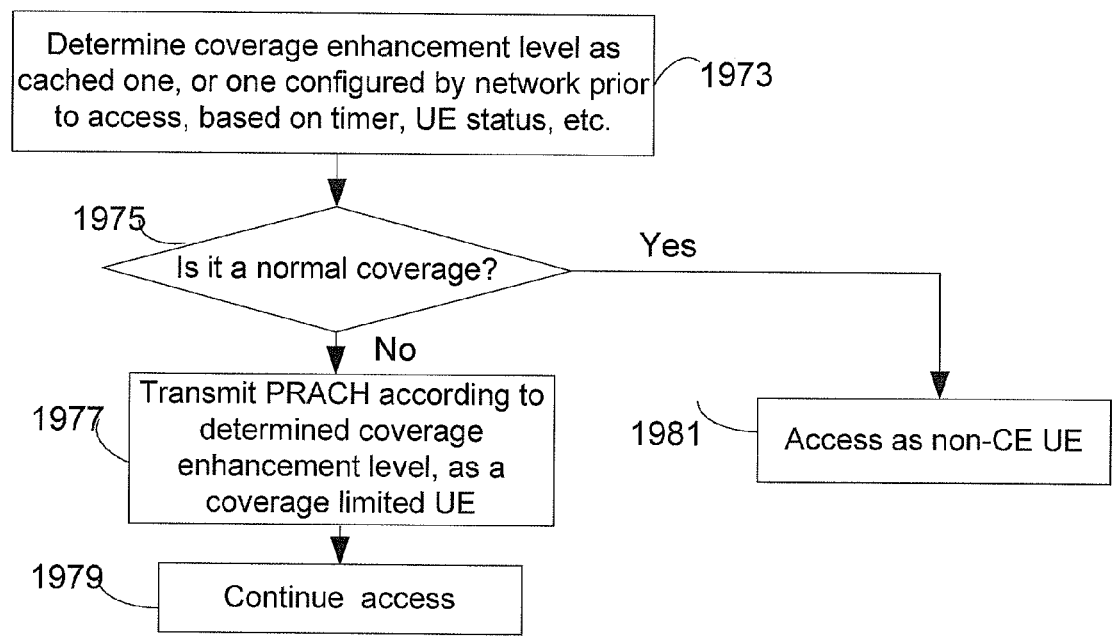
FIG. 19C illustrates a process for a UE to perform access according to an initial CE level for subsequent access.

FIG. 19C illustrates an example procedure for a UE to perform access according to an initial CE level for subsequent access. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes depicted in the examples depicted are implemented by a transmitter chain in, for example, a UE.

As shown in FIG. 19C, for subsequent access, the UE 114 determines an initial CE level from a cached one or one configured by an eNB 102 prior to a new access in operation 1973, based on certain timer, or based on the UE's status (for example, mobility), and so on. The UE 114 considers whether the determined CE level indicates a normal coverage 1975. If it does, the UE 114 performs a conventional access 1981. Otherwise, the UE 114 determines PRACH resources according to a determined CE level, transmits PRACH as a coverage limited UE 1977 and continues the access procedure 1979. The UE 114 can assume a next CE level if access using a current CE level fails.

System information that includes a mapping between a CE level and respective resources for PRACH transmissions can also be indicated via RRC signaling, prior to a new access (for example, before a UE enters RRC_IDLE). The UE 114 alternatively can use cached resources for PRACH transmission. The UE 114 can then skip decoding of a SIB-CE.

For subsequent access, if the UE 114 operates in a CE mode (for example, non-zero CE level), the UE 114 can directly attempt to detect a PBCH according to the CE mode and consider existence of PBCH repetitions rather than first attempt to detect a conventional PBCH for a number of MAX_MIB_Attempt decoding attempts.

As an alternative to the operations illustrated in FIG. 18 or FIG. 19A, a UE 114 can first determine whether the UE needs to operate in a CE mode and determine an initial CE level. For example, for initial random access, a first CE level, such as the one including $R_1$ repetitions in Table 1A, can always be used. The UE 114 also determines a $P_{PRACH}$ as in Equation (3). If $P_{PRACH}$ is smaller than $P_{CMAX,c}$, the UE 114 can apply conventional power ramping for retransmissions of a RA preamble while maintaining a same number of $R_1$ repetitions for the RA preamble for each retransmission as it was previously described. In another alternative, an initial $P_{PRACH}$ determined by Equation 3 can have an offset to set the initial $P_{PRACH}$ to a lower value.

Figure 19D:
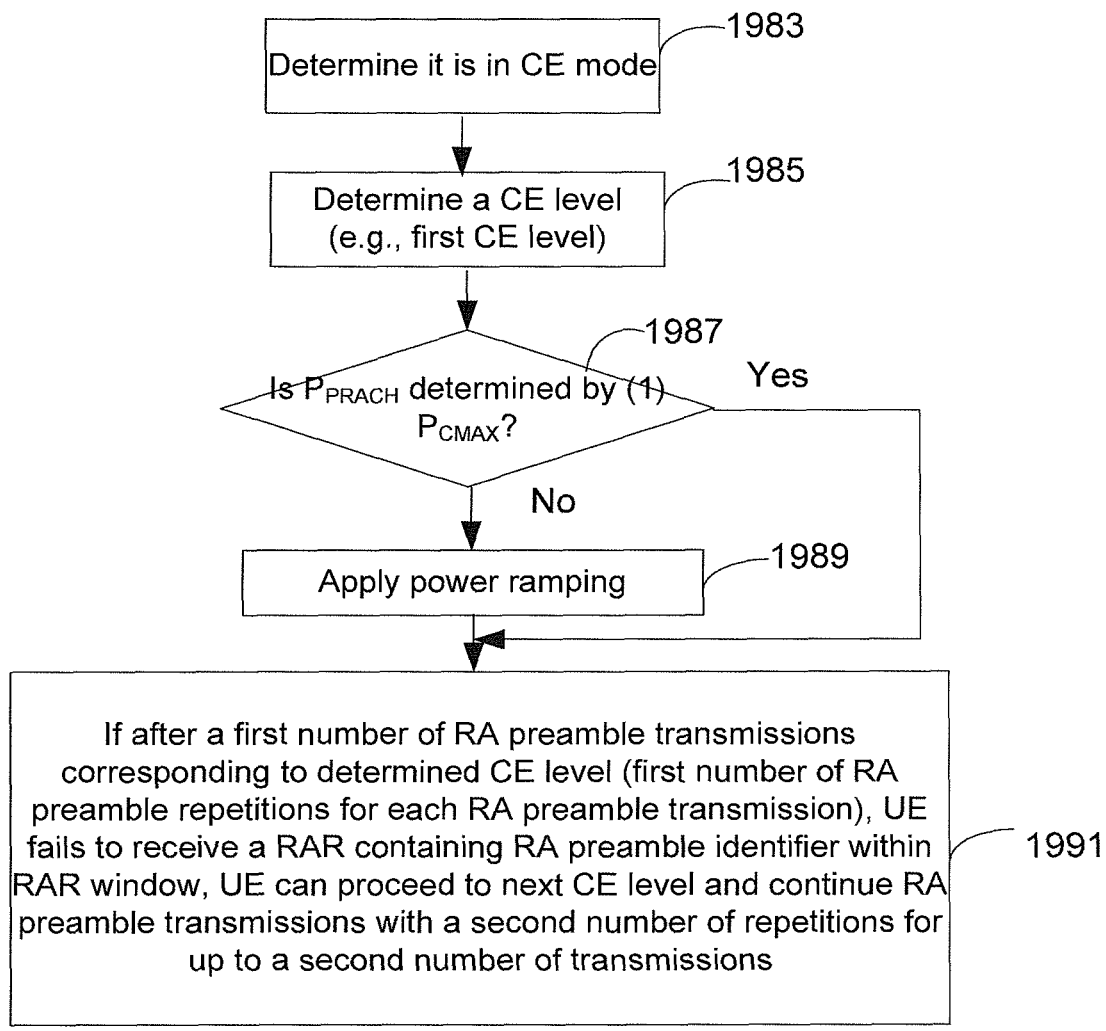
FIG. 19D illustrates a process for an initial transmission and for a retransmission of a RA preamble by a UE according to this disclosure.

FIG. 19D illustrates example operations for an initial transmission and for a retransmission of a RA preamble by a UE 114 according to this disclosure. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes depicted in the examples depicted are implemented by a transmitter chain in, for example, a UE.

As shown in FIG. 19D, the UE first determines whether it needs to operate in a CE mode in operation 1983 for a RA preamble transmission. For example, the UE 114 can determine that an initial RA preamble needs to be according to a CE mode if a measured path-loss is larger than a threshold informed by system information. The UE 114 determines an initial CE level (for example, a first CE level can always be used as the initial CE level or a first CE level can be determined according to the path-loss measurement by the UE 114 and information in a SIB as previously described) in operation 1985. The UE 114 also determines a $P_{PRACH}$ as in Equation 3 in operation 1987. If $P_{PRACH}$ is less than $P_{CMAX}$, the UE 114 can apply power ramping in operation 1989 for RA preamble transmissions according to the determined initial CE level that corresponds to a first number of RA preamble repetitions. If after a first number of RA preamble retransmissions corresponding to the determined CE level (first number of RA preamble repetitions for each RA preamble transmission) the UE fails to receive a RAR containing the RA preamble identifier within the RAR window, the UE can proceed to the next CE level and continue RA preamble transmissions with a second number of repetitions for up to a second number of transmissions in operation 1991.

Random Access Response (RAR) for a CE UE

In certain embodiments, transmission of a RAR to the UE 114 operating in CE mode is considered. Once a RA Preamble is transmitted and regardless of a possible occurrence of a measurement gap, a UE 114 monitors a PDCCH for RAR(s) identified by a RA-RNTI in a RAR window that starts at a SF that contains the end of a RA preamble transmission plus three SFs and has a length of ra-ResponseWindowSize SFs. A RA-RNTI associated with a PRACH in which a RA Preamble is transmitted is computed as:

$$RA\text{-}RNTI = 1 + t\_id + 10 * f\_id \quad (4)$$

where t_id is an index of a first SF of a specified PRACH ($0 \leq t\_id < 10$) and f_id is a frequency resource index of a specified PRACH within that SF in ascending order of frequency domain ($0 \leq f\_id < 6$). In case of multiple frequency resource indexes in a SF for transmissions of repetitions of RA preambles, f_id can be a first frequency resource index of a PRACH within the SF. The UE 114 may stop monitoring RAR(s) after successful reception of a RAR containing RA Preamble identifiers that matches a transmitted RA Preamble.

A PDCCH conveying a DCI format with CRC scrambled by a RA-RNTI for the UE 114 having repetitions of RA-preamble transmissions (for example, for path-loss category 2-4 in Table 2) can be repeated, or generally transmitted with additional reliability, for CE. However, as previously discussed, repetitions for a PDCCH transmission conveying a DCI format with CRC scrambled by a RA-RNTI or for a PDSCH transmission conveying a respective RAR can be independent of repetitions for a RA preamble transmission as the UE 114 can be DL coverage limited but not UL coverage limited or the reverse.

In a first approach, a CE UE and a non-CE UE can have a same RA-RNTI but have different configurations for a transmission of an associated PDCCH. For example, a PDCCH configuration for a CE UE can be with a first DCI format, or a first CCE aggregation level, or a first number of repetitions across SFs while a PDCCH configuration for a non-CE UE can be with a second DCI format, or a second CCE aggregation level, and a single PDCCH transmission. For example, a same DCI format, DCI format 1C, can schedule a RAR for either a CE UE or a non-CE UE but a respective PDCCH for a CE UE can be with an aggregation level of 16 CCEs and transmitted in a single or in multiple SFs or in first resources while a PDCCH for a non-CE UE can be with a maximum aggregation level of 8 CCEs and transmitted in a single SF or in second resources.

In a second approach, a PDCCH scheduling a RAR for a CE UE can convey a DCI format with CRC scrambled by a RA-CE-RNTI that can be different than a RA-RNTI for non-CE UEs and can further be predefined.

The UE 114 can monitor PDCCH conveying a DCI format with CRC scrambled by a RA-RNTI according to its path-loss category and assume a respective PDCCH configuration (such as a CCE aggregation level or a number of repetitions) in detecting a PDCCH scheduling a transmission of a RAR from an eNB. The mapping of the path-loss can be different for the RAR than for the RA preamble as the respective DL coverage and UL coverage requirements can be different. For example, for a given path-loss measurement by the UE 114, an indication in a SIB transmitted by a serving eNB 102 can be for transmitting the RA preamble with $R_1$ repetitions but receiving a respective RAR (and the PDCCH conveying an associated DCI format with CRS scrambled by a RA-RNTI) without repetitions.

If the UE 114 that operates in CE mode for RA preamble transmission also operates in CE mode for RAR reception, a mapping of a path-loss or, equivalently, a mapping of PRACH resources (including PRACH resource configuration in time, frequency, and ZC sequence) to a configuration for transmission of PDCCH scheduling a respective RAR can be predefined or can be informed by system information to the UE 114. Table 5 provides an example for a transmission configuration of a PDCCH conveying a DCI format with CRC scrambled by a RA-RNTI as a function of a path-loss range and PRACH resources. In Table 5, configurations 1, 2, 1a, 2a, 1b, 2b, can either be mutually different or can depend on a path-loss category and be same for a same path-loss category (for example, Configurations 1, 2 can be same, Configurations 1a, 2a can be same, and Configurations 1b, 2b can be same) where configurations 1, 2, 1a, 2a, 1b, 2b are not dependent on the preamble groups, which is shown in Table 5A.

In Table 5A, a transmission configuration for a PDCCH conveying a DCI format with CRC scrambled by a RA-RNTI is relative to path-loss ranges and PRACH resources but not relative to preamble groups. It is assumed that a number of repetitions for a PDCCH scheduling a RAR is implicitly determined from a number of repetitions used for transmission of a respective RA preamble. For example, if the RA preamble is transmitted with $R_1$ repetitions, the PDCCH scheduling the RAR is transmitted with $2 \cdot R_1$ repetitions.

TABLE 5

An exemplary transmission configuration for PDCCH conveying a DCI format with CRC scrambled by a RA-RNTI relative to path-loss ranges and PRACH resources

| Category | Path-loss | Number of repetitions | Resources | Preamble | PDCCH with RA-RNTI |
|---|---|---|---|---|---|
| 1 | $PL_c \leq PL_{Th}$ | 1 | First PRACH resource configuration | Group A<br>Group B | Conventional design |
| 2 | $PL_{Th} < PL_c \leq PL_{Th} + \delta_{PL1}$ | $R_1$ | Second PRACH resource configuration | Group 1<br>Group 2 | Configuration 1<br>Configuration 2 |
| 3 | $PL_{Th} + \delta_{PL1} < PL_c \leq PL_{Th} + \delta_{PL2}$ | $R_2$ | Third PRACH resource configuration | Group 1a<br>Group 2a | Configuration 1a<br>Configuration 2a |
| 4 | $PL_{Th} + \delta_{PL2} < PL_c$ | $R_3$ | Fourth PRACH resource configuration | Group 1b<br>Group 2b | Configuration 1b<br>Configuration 2b |

TABLE 5A

An exemplary transmission configuration for PDCCH conveying a DCI format with CRC scrambled by a RA-RNTI relative to path-loss ranges and PRACH resources

| Category | Path-loss | repetitions | Resources | PDCCH with RA-RNTI |
|---|---|---|---|---|
| 1 | $PL_c \leq PL_{Th}$ | 1 | First PRACH resource configuration | Conventional design |
| 2 | $PL_{Th} < PL_c \leq PL_{Th} + \delta_{PL1}$ | $R_1$ | Second PRACH resource configuration | Configuration 1 |
| 3 | $PL_{Th} + \delta_{PL1} < PL_c \leq PL_{Th} + \delta_{PL2}$ | $R_2$ | Third PRACH resource configuration | Configuration 1a |
| 4 | $PL_{Th} + \delta_{PL2} < PL_c$ | $R_3$ | Fourth PRACH resource configuration | Configuration 1b |

Figure 20:
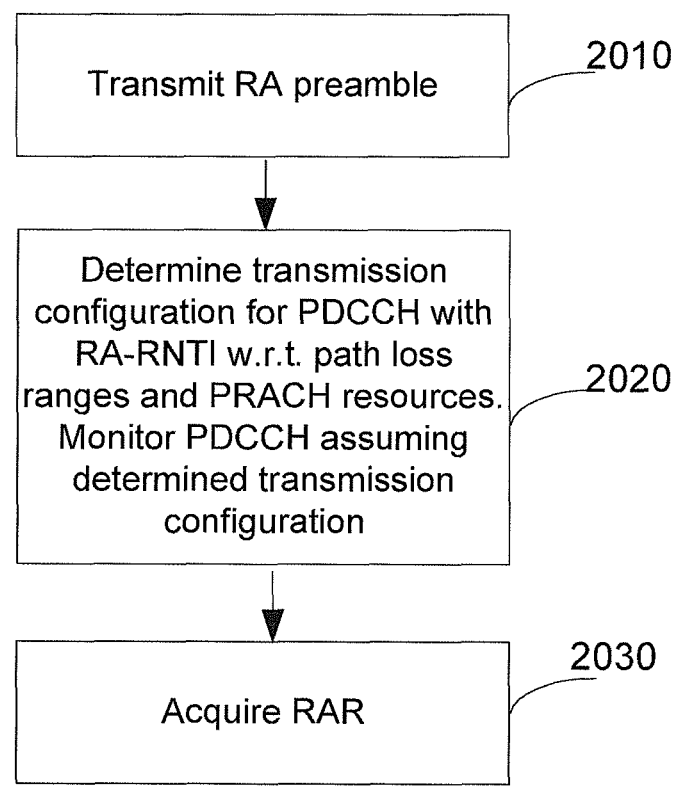
FIG. 20 illustrates an example process for a CE UE to acquire RAR according to this disclosure.

FIG. 20 illustrates example operations for a CE UE to acquire RAR according to this disclosure. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes depicted in the examples depicted are implemented by a transmitter chain in, for example, a UE.

As shown in FIG. 20, after a CE UE transmits a RA preamble in operation 2010, the CE UE determines a transmission configuration for PDCCH conveying a DCI format with CRC scrambled by a RA-RNTI (and scheduling a RAR in a PDSCH in response to a possible RA preamble detection by a respective eNB) relative to a respective path-loss range and respective PRACH resources (for example, using Table 4). Using the determined transmission configuration for PDCCH, the CE UE performs respective decoding operations to detect the PDCCH conveying a DCI format scheduling a RAR in operation 2020. After successfully detecting the PDCCH scheduling a RAR, the CE UE receives the RAR in a PDSCH in operation 2030.

As described in the first embodiment, if the UE 114 fails to receive a RAR from the eNB 102 after transmitting a RA preamble according to repetition parameters determined from an estimated path-loss in category i as in Table 2 then, for a subsequent transmission of a RA preamble, the UE can change configuration from category i to category i+1.

A configuration for a PDCCH scheduling RAR can be based on a number of repetitions for a RA preamble transmission or, equivalently, on respective resources where a RA preamble is detected. This can be particularly applicable for contention-based PRACH transmission where the eNB 102 may not know a path-loss estimate for the UE 114 and can only infer the path-loss estimate from the resources where the eNB 102 detected a respective RA preamble. A configuration for PDCCH scheduling a RAR is different for an initial transmission and a retransmission of a RA preamble, in case the retransmission uses different resources than the initial transmission, regardless of an actual path-loss the UE 114 experiences. For example, for an initial RA preamble transmission, the UE 114 can use $R_1$ repetitions and assume configuration 1 as a configuration for a PDCCH scheduling a RAR. If a RAR is not received by the UE 114, the UE 114 can retransmit a RA preamble using $R_2$ repetitions and assume configuration 1a for a PDCCH scheduling a RAR.

It is also possible that a RAR reception and a subsequent Msg3 transmission are not scheduled by respective PDCCHs. Instead, a random access process for a DL coverage limited UE can be without any associated PDCCH transmission from a serving eNB. After the UE 114 estimates a path-loss to the serving eNB 102 (or by other means as previously described), it can determine a PRACH resource configuration for a RA preamble transmission as it was previously described. This can be further extended to the UE 114 determining parameters and resources for a RAR reception (similar to a SIB-CE reception without an associated PDCCH, as it was previously described) and determining parameters and resources for a Msg3 transmission and for a subsequent Msg4 reception for contention resolution. It is noted that the serving eNB 102 can also determine the previous parameters and resources for RAR transmission, Msg3 reception, and Msg4 transmission based on the resources where it detected the associated RA preamble (for example, each category of a path-loss range can be associated with orthogonal resources for a random access process for all four steps).

PDSCH resources for a RAR transmission can be associated with RA preambles. Even for a same UL CE level, different PDSCH RAR resources can be associated with different groups of RA preambles as it may not be possible to convey a RAR for all RA preambles in a same PDSCH. There can be M RARs for a same UL CE level having respective PDSCH resources and the UE 114 determines the PDSCH resources to monitor for a RAR reception according to the group, from the M groups, the RA preamble it transmitted belongs to (for example, an ordering can be according to an increasing RA preamble number). Having different PDSCH RAR resources correspond to RA preambles for a same UL CE level is also beneficial in case of UEs with a same UL CE level but with different DL CE levels such as for a first UE having two receiver antennas and a second UE having a single receiver antenna when both UEs have a single transmitter antenna. As in Table 5, two RA preamble groups can be used for a same CE level and different groups can be associated with different RAR repetitions and resources.

It is possible that with a predefined mapping between a number of RA preamble repetitions and a number of RAR repetitions, the latter can convey information for UEs that can be in different UL CE mode and therefore require a different number of RA preamble repetitions.

Alternatively, a same RAR can be for UEs having different CE levels for the RA preamble transmission. A UE with a lower DL CE level can decode the RAR sooner (with fewer number of repetitions) than a UE with a higher DL CE level. It is not necessary that a RAR is only for UEs at a same RA preamble repetition level or that a UE needs to wait for the maximum number of RAR repetitions (or even know what this maximum number is). In that case, a UE-common set of RAR resources can be configured by system information.

A UE can use a respective RAR monitoring window size to monitor RAR. The different RAR monitoring window size can be a mapping from the different number of RA preamble repetitions. A serving eNB can provide, through a SIB, an association (mapping) between RA preamble CE levels and respective RAR CE levels by associating each RA preamble CE level (number of repetitions) with a RAR CE level (number of repetitions). Different RAR CE levels can also exist for different RA preamble groups for a same CE level to differentiate UEs with a same UL CE level but with two different DL CE levels. For example, a SIB can associate a number of path-loss ranges with a CE level for a RA preamble and a CE level for a RAR as in Table 6.

Once the UE 114 determines the CE level for RA preamble transmission and for RAR transmission, CE levels for other UL channels or DL channels can be uniquely determined based on the respective BLERs that can provide predetermined offsets to the path-loss measurements until the serving eNB 102 explicitly configures the CE levels by higher layer signaling. For example, if Msg3 requires 2 dB less SINR than the RA preamble to achieve respective target reliabilities, the UE 114 can determine a number of repetitions for Msg3 by determining the category for an effective path-loss $PL_c - 2$ dB according to Table 6.

TABLE 6

Exemplary association between CE level
for RA preamble and CE level for RAR

| Category | Path-loss | Number of repetitions for RA preamble | Number of repetitions for RAR |
|---|---|---|---|
| 1 | $PL_c \leq PL_{Th}$ | 1 | 1 |
| 2 | $PL_{Th} < PL_c \leq PL_{Th} + \delta_{PL1}$ | $R_1$ | 1 |
| 3 | $PL_{Th} + \delta_{PL1} < PL_c \leq PL_{Th} + \delta_{PL2}$ | $R_2$ | $R_4$ |
| 4 | $PL_{Th} + \delta_{PL2} < PL_c$ | $R_3$ | $R_4$ |

Figure 21:
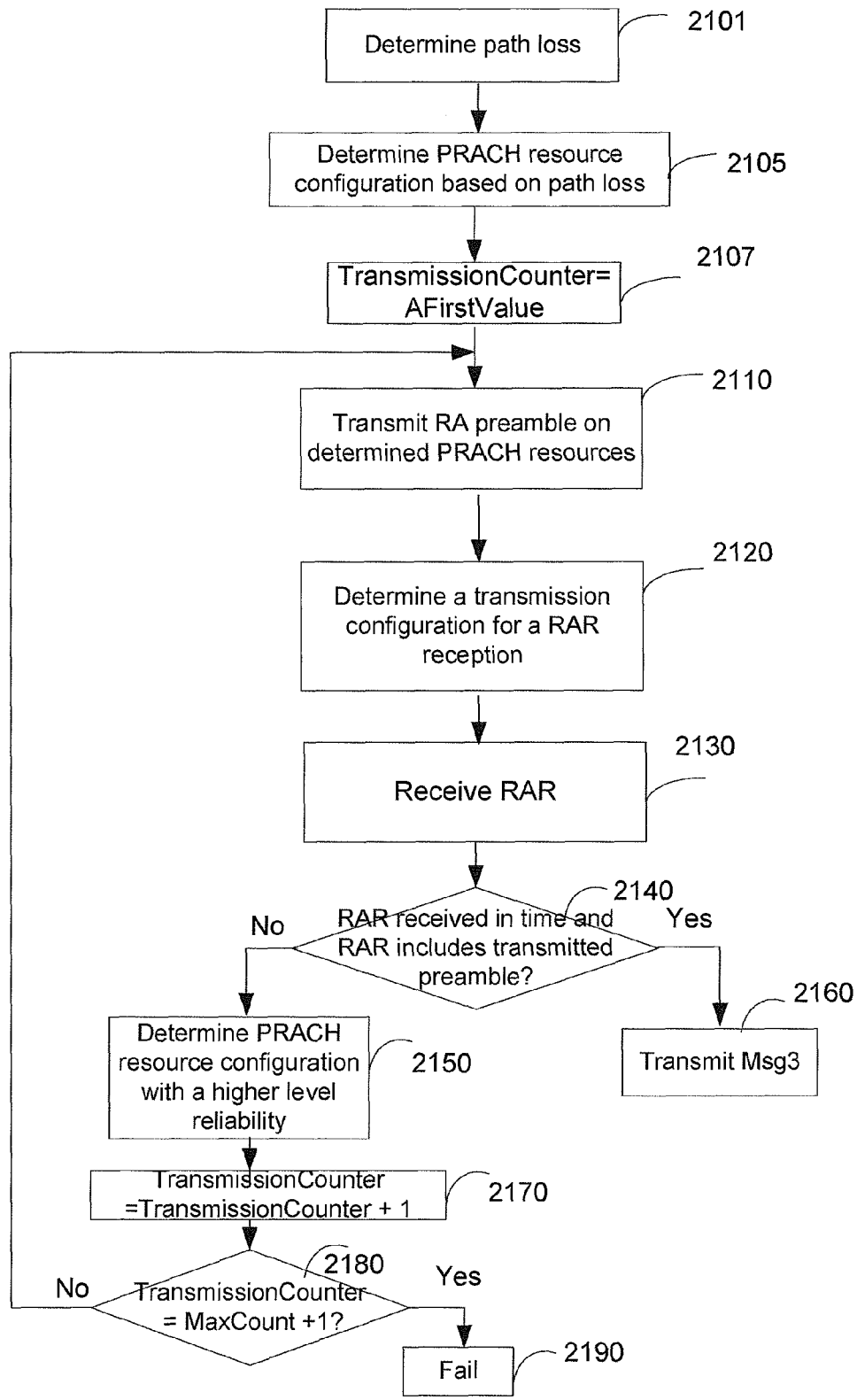
FIG. 21 illustrates an example process for a UE to acquire RAR when there is a retransmission of a RA preamble according to this disclosure.

FIG. 21 illustrates example operations for a UE to acquire RAR when there is a retransmission of a RA preamble according to this disclosure. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes depicted in the examples depicted are implemented by a transmitter chain in, for example, a UE.

As shown in FIG. 21, the UE 114 determines a path-loss in operation 2101 to the serving eNB 102 and subsequently determines a PRACH (RA preamble) resource configuration in operation 2105 corresponding to a path-loss range that includes the determined path-loss. The UE 114 has a TransmissionCounter having a value of AFirstValue in operation 2107 (AFirstValue equals 1 for an initial RA preamble transmission and it is larger than 1 for a RA preamble retransmission). The UE 114 transmits a RA preamble in operation 2110 using the determined PRACH resources in operation 2105 and subsequently determines a transmission configuration for a RAR reception in operation 2120, receives the RAR in operation 2130, and determines whether the RAR is successfully decoded in operation 2140. If the RAR decoding is successful and the RAR message indicates the transmitted RA preamble, the UE 114 transmits Msg3 in operation 2160; otherwise, the UE 114 determines a PRACH resources configuration with a next higher level of reliability (or next higher level of CE, if any) (for example, the (i+1)-th category if the previously used category is i as in Table 2) in operation 2150 (if it is already the highest level of CE, it uses the PRACH resources configuration with the highest level of CE) and increases TransmissionCounter by 1 in operation 2170. If the TransmissionCounter reaches MaxCount+1 in operation 2180, the random access process fails in operation 2190; otherwise, the UE 114 selects a new RA preamble and transmits the RA preamble according to the determined PRACH resource configuration (as in operation 2150). The UE 114 then determines a transmission configuration for a RAR reception corresponding to the PRACH resources the UE 114 used to transmit the RA preamble in operation 2110. Then the procedure repeats. It is noted that the function in operation 2101 can be replaced by 'determine CE level', and the function in operation 2105 can be replaced by 'determine PRACH resource configuration based on the determined CE level'.

A RAR for a CE UE, with path-loss in category other than a first category that is associated with no repetitions, can be in a different MAC PDU than for a non-CE UE. In this manner, a MAC RAR for a CE UE can be transmitted with a different CE level.

A DCI format with CRC scrambled by a RA-RNTI can indicate a configuration for a transmission of a MAC PDU conveying a RAR in a PDSCH. For example, the DCI format can indicate, in addition to respective PDSCH frequency resources, a number of SFs where the PDSCH conveying the RAR is transmitted in the indicated frequency resources. A UE can then combine a number of PDSCH transmissions over a respective number of SFs before performing a decoding operation to obtain a RAR.

Alternatively, particularly for a DL coverage limited UE, a PDCCH scheduling a PDSCH conveying a RAR can be omitted and only the PDSCH conveying the RAR is transmitted (for example, with predetermined or configured transmission parameters and over a number of SFs determined by a respective configuration used for a transmission of an associated RA preamble similar to the previously described second approach for determining a configuration of a PDCCH scheduling a RAR (in case a RAR is scheduled by a PDCCH).

A RAR for a CE UE can include information for a transmission of Msg3 by the CE UE. For example, if the number of SFs over which the CE UE transmits Msg3 is not determined by the CE level of a respective RA preamble, the RAR can inform of a number of SFs over which the CE UE transmits Msg3. For example, as a CE UE (path-loss in a category other than category 1 in Table 2) can be assumed to transmit Msg3 with maximum power ($P_{CMAX,c}$), a TPC command in a DCI format scheduling a PUSCH conveying Msg3 (see REF 2) can instead be used to indicate a number of SFs to be bundled. Alternatively, contents for a RAR can be extended to include new information such as for multi-SF bundling for Msg3.

Alternatively, the transmission of Msg3 can be with predetermined parameters in predetermined resources associated with a corresponding RA preamble, based on a mapping of Msg3 resources and a resource configuration used to transmit a respective RA preamble. A CE UE transmits Msg3 in a PUSCH as determined from a mapping of a respective RA preamble resource configuration.

If PHICH transmissions are supported for UEs in CE mode, Msg3 retransmissions can be triggered by a PHICH conveying a NACK. If PHICH is not supported for a UE in CE mode then, if Msg3 retransmissions are not scheduled by PDCCH, it can be necessary to target a smaller error rate (higher detection reliability) for an initial Msg3 transmission in order to reduce a probability of repeating the random access process as there are no means provided to the UE to determine that it needs to retransmit Msg3. Then, a network can configure Msg3 transmissions from a UE that operates in a CE mode to have higher reception reliability than from a UE that does not operate in a CE mode as the latter UE can have Msg3 retransmissions triggered by a PHICH or by a PDCCH.

Figure 22:
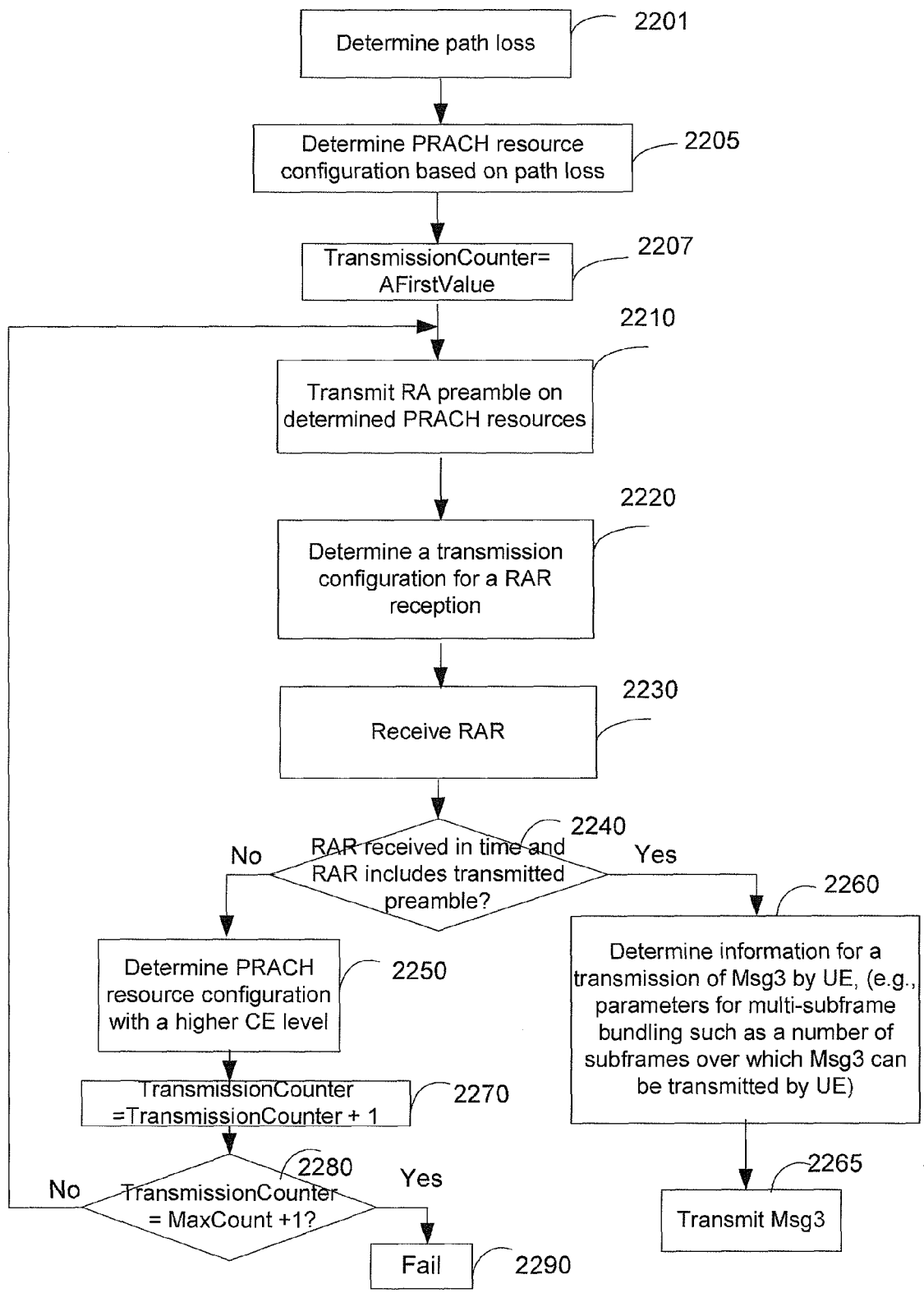
FIG. 22 illustrates example operations for a UE to determine a transmission configuration for Msg3 according to this disclosure.

FIG. 22 illustrates example operations for a UE to determine a transmission configuration for Msg3 according to this disclosure. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes depicted in the examples depicted are implemented by a transmitter chain in, for example, a UE.

As shown in FIG. 22, the steps are similar to the steps in FIG. 21, with the exception of operation 2260 and 2265 relative to operation 2160. After successful detection of a RAR, the UE 114 determines a transmission configuration for Msg3 including information such as a number of SFs in operation 2260. If transmission of Msg3 is scheduled by a PDCCH conveying a DCI format with CRC scrambled by a RA-RNTI, the information for the transmission of Msg3 is provided by the DCI format and a field used to control a transmission power of Msg3 in case a respective RA preamble is transmitted without repetitions can instead be used to indicate a number of SFs in case the RA preamble is transmitted with repetitions (as a transmission power of Msg3 can be assumed to be a maximum one). If transmission of Msg3 is with predetermined parameters and resources that are associated with a corresponding RA preamble, based on a respective mapping, the UE 114 transmits Msg3 in a PUSCH as determined from a mapping of a respective RA preamble resource configuration. The function in operation 2201 can be replaced by 'determine CE level', and the function in operation 2205 can be replaced by 'determine PRACH resource configuration based on the determined CE level'.

Figure 23:
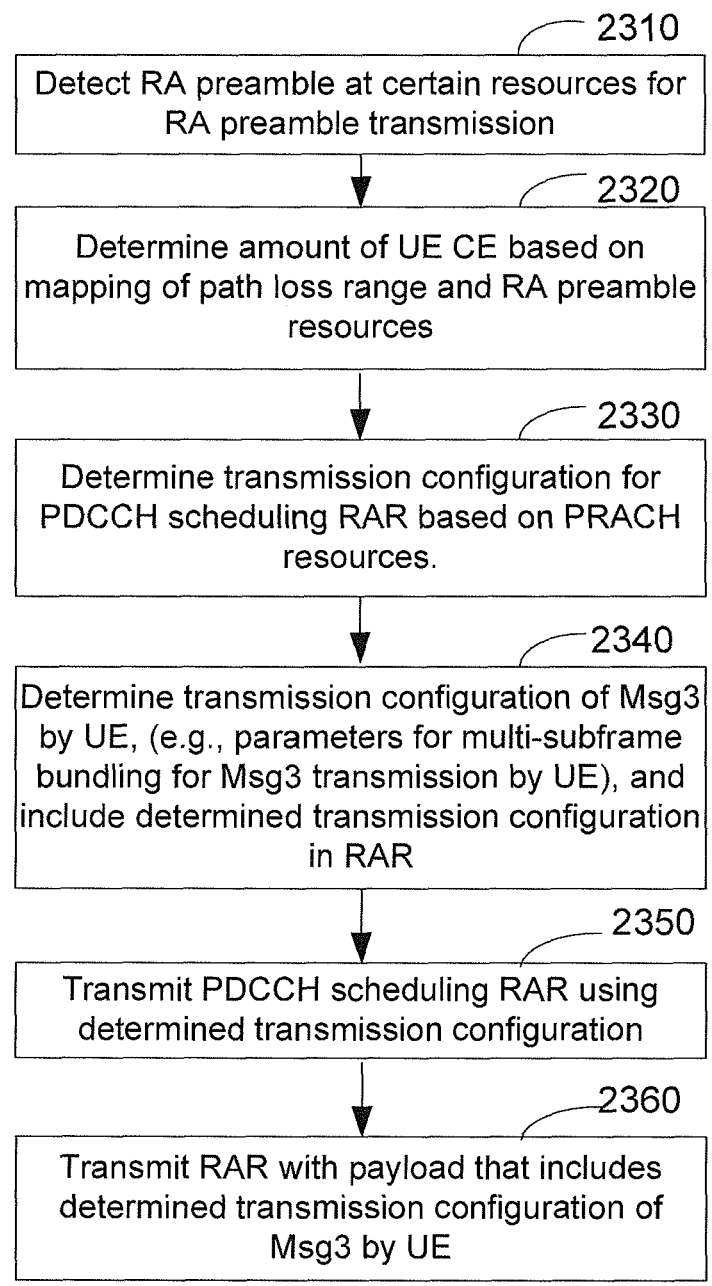
FIG. 23 illustrates an example process for an eNB to determine a transmission configuration for Msg3 according to this disclosure.

FIG. 23 illustrates example operations for an eNB to determine a transmission configuration for Msg3 according to this disclosure. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes depicted in the examples depicted are implemented by a transmitter chain in, for example, a UE.

As shown in FIG. 23, the eNB 102 detects a RA preamble in respective resources for a RA preamble transmission in operation 2310 and determines a required CE for the UE 114 that transmitted the RA preamble based on a mapping between a path-loss range and RA preamble resources in operation 2320. The eNB 102 also determines in operation 2330 a transmission configuration for a PDCCH scheduling a RAR based on the RA preamble resources (in operation 2310), if the RAR transmission is scheduled by a PDCCH and is not with predetermined parameters for a respective RA preamble resource configuration, and a transmission configuration for the PDSCH conveying the RAR. The eNB 102 also determines a transmission configuration for Msg3 by the UE 114, such as a number of SFs over which Msg3 is transmitted. The eNB 102 can either include the determined transmission configuration in the RAR message in operation 2340 or this transmission configuration can also be determined from the RA preamble resource configuration through a respective mapping. If a PDSCH conveying a RAR is scheduled by a PDCCH, the eNB 102 transmits in operation 2350 the PDCCH scheduling the RAR using the determined transmission configuration (determined in operation 2330) and transmits the RAR in operation 2360 that includes the transmission configuration for Msg3 (determined in operation 2340).

A RAR for a UE can also include information of subsequent PDCCH transmissions from an eNB such as a PDCCH transmission configuration (similar to Table 5, 5a) that an eNB can use to transmit a PDCCH for PRACH contention resolution. Such information can use an existing field in a RAR, can be implicitly determined by a configuration of a PDSCH conveying the RAR, or it can be additionally included.

Transmission of Msg3 and Contention Resolution

A UE transmission timing after a RAR reception can be as follows.

If a data transport block in a PDSCH containing a RAR for a transmitted RA preamble is detected in SF n, where n is a last SF that a UE detects a data transport block in case there are multiple SFs used to transmit the data transport block, the UE shall, according to information in the RAR, transmit a data transport block in a first SF $n+k_1$, $k_1 \geq 6$, if an UL delay field in the RAR is set to zero where $n+k_1$ is a first available SF for PUSCH transmission. A UE shall postpone a PUSCH transmission to a next SF after $n+k_1$ if the UL delay field is set to 1.

If a RAR is received in SF n, where n is a last SF a UE receives the RAR if there are multiple SFs for a RAR transmission, and a corresponding data transport block does not contain a response to a transmitted preamble sequence, a UE shall, if requested by higher layers, transmit a new RA preamble sequence no later than in SF n+5.

In case a random access procedure is initiated by a "PDCCH order" in SF n, where n is a last SF a UE detects the PDCCH order if there are multiple SFs conveying the PCDDH order, the UE shall, if requested by higher layers, transmit RA preamble in a first SF $n+k_2$, $k_2 \geq 6$, where a PRACH resource is available. Therefore, the index of n is redefined when control or data associated with a RAR is transmitted over multiple SFs.

The UE 114 can include a channel measurement report in Msg3. For example, a measurement report a reference signal received power (RSRP) report. Alternatively, the UE 114 can include information for a CE level (for example, a category of path-loss as shown in Table 2). After an eNB receives Msg3 from the UE 114, the eNB 102 can obtain an estimate of a path-loss for the UE 114. Both the UE 114 and the eNB 102 can assume that subsequent communication is according to a CE level indicated by the measurement report in Msg3. If the UE 114 does not include a measurement report in Msg3, the UE 114 can include the measurement report in a subsequent signaling (for example, RRC signaling) after Msg4. The eNB 102 can then configure the resources for subsequent communication such as the resources for PDCCH/PDSCH/PUCCH/PUSCH and notify the UE 114 or both the eNB 102 and the UE 114 can assume that subsequent communication is with a number of repetitions corresponding to the measurement report provided by the UE 114 to the eNB 102.

Figure 24:
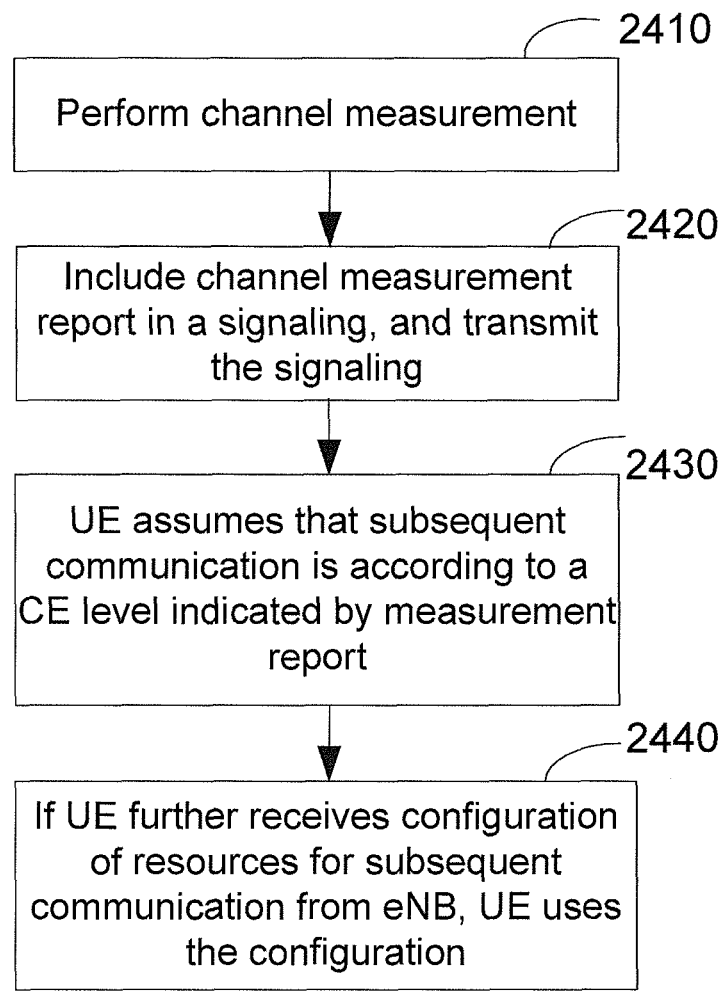
FIG. 24 illustrates an example process for a UE to determine a transmission configuration after a signaling containing channel measurement report according to this disclosure.

FIG. 24 illustrates example operations for a UE to determine a transmission configuration after a signaling containing channel measurement report according to this disclosure. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes depicted in the examples depicted are implemented by a transmitter chain in, for example, a UE.

As shown in FIG. 24, the UE 114 performs channel measurement and determines a CE level in operation 2410. The UE 114 includes a channel measurement report (or, indication of path-loss category for CE level) in a signaling to the eNB 102 (for example, in Msg3 or in RRC signaling), and transmits the signaling in operation 2420. The UE 114 can then assume that subsequent communication is according to a CE level indicated by the measurement report in operation 2430. If the UE 114 knows the mapping of the CE level and the communication configuration (for example, Table 5, 5a, for the PDCCH configuration), the UE 114 can assume the configuration according to the CE level. If the UE 114 further receives configuration of resources for subsequent communication (for example, for PDCCH/PUCCH/PDSCH/PUSCH, and so on) from the eNB 102, the UE 114 uses the configuration indicated by the eNB 102 in operation 2440 and ceases from further using the configuration determined from the CE level (if different from the one configured by the eNB 102).

Figure 25:
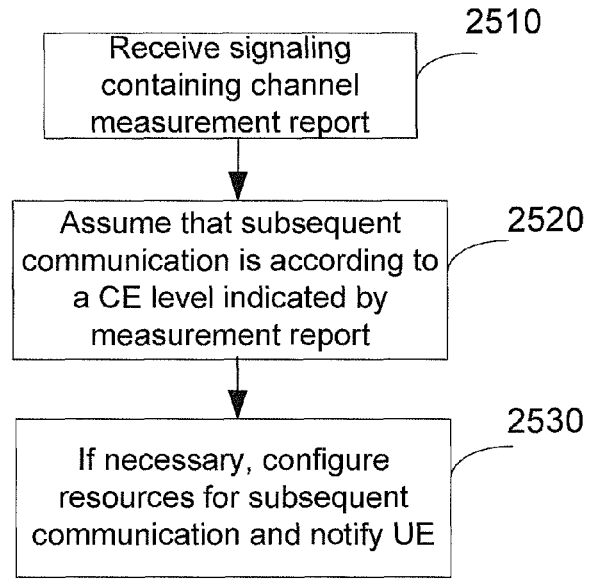
FIG. 25 illustrates an example process for an eNB to determine a transmission configuration after receiving a signaling containing channel measurement report from a UE according to this disclosure.

FIG. 25 illustrates example operations for an eNB to determine a transmission configuration after receiving a signaling containing channel measurement report from a UE according to this disclosure. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes depicted in the examples depicted are implemented by a transmitter chain in, for example, a UE.

As shown in FIG. 25, the eNB 102 receives a signaling containing channel measurement report (or, indication of path-loss category for a CE level) from the UE 114 in operation 2510. The eNB 102 considers that the UE 114 assumes that subsequent communication is according to the indicated CE level in operation 2520. If needed, the eNB 102 can separately configure to the UE 114 the resources for subsequent communication (for example, if eNB 102 wants to override resource configurations of some channels as determined by the CE level) and notify the UE 114 in operation 2530.

A contention resolution message (Msg4) for the UE 114 can include information for transmission by the eNB 102 of subsequent PDCCH for the UE 114. For example, the contention resolution message can include a PDCCH transmission configuration (as in Table 5 or 5a) the eNB 102 would use to transmit PDCCH for subsequent scheduling of data information. Alternatively or additionally, the contention resolution message can include a resource allocation for subsequent PDSCH transmissions to the UE 114 or PUSCH transmissions from the UE 114. The resource allocation can include one or more RBs in a transmission bandwidth and specific SFs for PDSCH or PUSCH transmissions. In this manner, PDCCH transmissions to a UE 114 to schedule respective PDSCH or PUSCH transmissions can be avoided. Parameters other than a resource allocation that are associated with a conventional PDSCH or PUSCH transmission, such as a Modulation and Coding Scheme (MCS), can also be provided by the contention resolution message and remain fixed (similar to the allocated resources) unless they are re-configured by an RRC massage from the eNB 102. For example, an eNB 102 can determine the initial MCS assignment for PDSCH or PUSCH transmissions as part of the random access process and a lowest MCS can be assigned to a DL coverage or UL coverage limited UE, respectively. Other parameters, such as a HARQ process number or a redundancy version for HARQ retransmissions based on incremental redundancy may not be used as a single HARQ process or chase combining, respectively, can be sufficient for coverage limited UEs. Similar, support of other conventional functionalities, such as spatial multiplexing, power control, and so on, may not be provided for coverage limited UEs.

Although the second embodiment and the third embodiment focus on a random access process, they are not limited only to a random access process and can be applicable to control or data transmission in general for a UE requiring CE.

When a UE is RRC_CONNECTED, an eNB can configure the UE, for example by RRC signaling, to switch coverage modes from normal or CE mode to CE or normal mode, respectively. For example, the eNB 102 can make such a decision either based on a reported channel measurement, such as a RSRP or a path-loss, from the UE 114 or based on statistics such as for example outcomes (correct or incorrect) of receptions of data transport blocks at the eNB 102 or at the UE 114 (as obtained by the eNB 102 through subsequent acknowledgement signaling from the UE 114). A reconfiguration of a UE 114 coverage mode can further include a time for a new coverage mode to become effective (for example, after a number of frames or at a beginning of a frame with an indicated system frame number), to allow the UE 114 a transition time and ensure that the eNB 102 and the UE 114 have a common understanding when the new mode takes effect. The RRC signaling can also include some SIBs that the UE 102 is required to use in the new coverage mode, if the SIBs in the new coverage mode are different from the current coverage mode.

Figure 26:
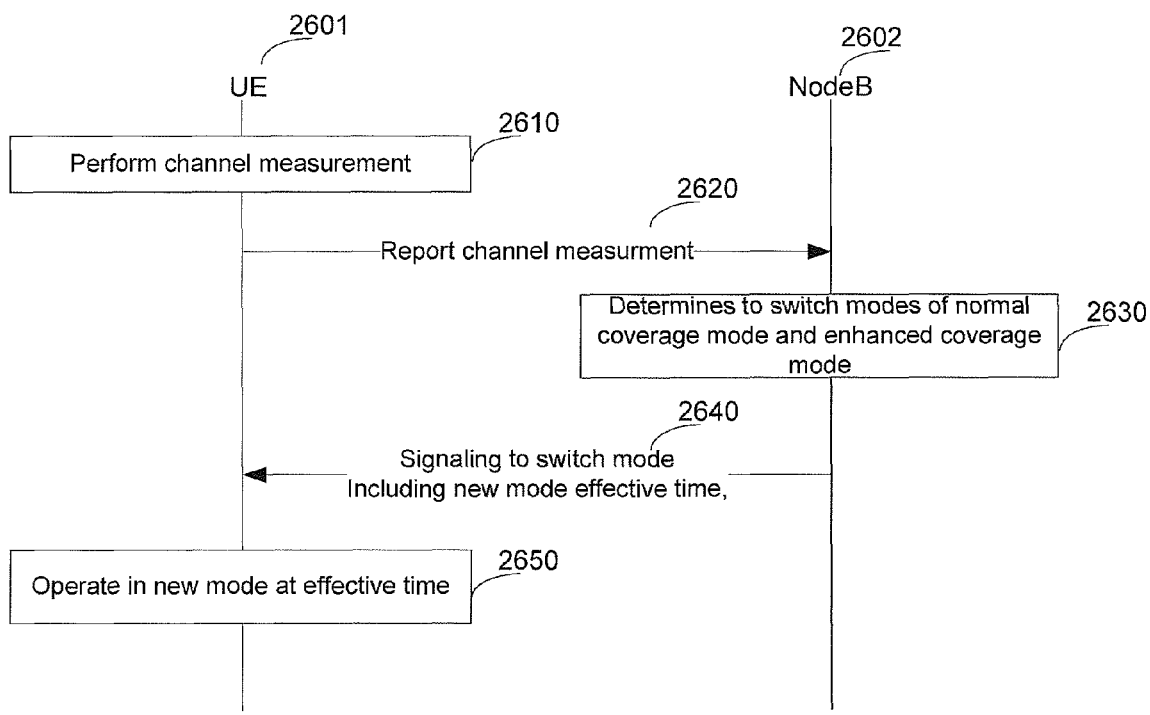
FIG. 26 illustrates an example process for coverage mode switch of a UE according to this disclosure.

FIG. 26 illustrates an exemplary procedure of UE coverage mode switch according to the present disclosure. While the flow charts depict a series of sequential signals, unless explicitly stated, no inference should be drawn from that sequence regarding specific order of performance, performance of steps or portions thereof serially rather than concurrently or in an overlapping manner, or performance of the signals depicted exclusively without the occurrence of intervening or intermediate signals. The processes depicted in the examples depicted are implemented by a transmitter chain in, for example, a UE. In certain embodiments, UE 2601 is the same as one of UEs 111-116 and eNB 2602 is the same as one of eNBs 101-103.

As shown in FIG. 26, a UE 2601 performs a channel measurement 2610 based on a RS transmitted by an eNB 2602 and reports the channel measurement 2620 to the eNB. Based on the channel measurement report, the eNB 2602 determines whether or not to switch coverage modes 2630 for the UE 2601 where the coverage modes can include a normal coverage mode and a CE mode. Alternatively, as previously mentioned, the eNB 2602 can determine a coverage mode for a UE 2601 based on other measurements or statistics. The eNB 2602 can signal to the UE 2601, for example by RRC signaling, a mode reconfiguration 2640. The signaling can also include an effective time for the new coverage mode. The UE 2601 operates in the new coverage mode at the effective time 2650.

Although the present disclosure has been described with example embodiments, various changes and modifications may be suggested to one skilled in the art. It is intended that the present disclosure encompass such changes and modifications that fall within the scope of the appended claims.

What is claimed is:

1. A method comprising:
    transmitting, by a base station to a User Equipment (UE), a system information block (SIB) that informs a number of resource sets for random access (RA) preamble transmission in a resource from a resource set, wherein each resource set includes time, frequency, and code resources and is associated with a number of repetitions for a RA preamble transmission and with a maximum number of RA preamble transmissions, wherein the SIB is configured to enable the UE to determine the first number of repetitions for a transmission of a RA preamble, a corresponding first resource set, and a corresponding first maximum number of transmissions and a second number of repetitions for a transmission of a RA preamble, a corresponding second resource set, and a corresponding second maximum number of transmissions, and wherein the second number of repetitions is larger than the first number of repetitions; and
    receiving, from the UE:
        the RA preamble, in a resource from the first resource set and with the first number of repetitions, until the UE receives a response for a RA preamble transmission with the first number of repetitions or until the first maximum number of RA preamble transmissions is reached; and
        the RA preamble, in a resource from the second resource set and with the second number of repetitions, after the first maximum number of RA preamble transmissions is reached.

2. The method of claim 1, wherein for each resource set, the SIB further informs an association between a range of reference signal received power (RSRP) values and a number of RA preamble repetitions and the UE determines the first number of repetitions as the one corresponding to the range of RSRP values that includes a RSRP value measured by the UE.

3. The method of claim 2, wherein a maximum number of RSRP ranges is four.

4. The method of claim 1, wherein the SIB further informs of a set of valid UL subframes and the repetitions of the RA preamble transmission occur only in subframes that are subframes informed by a SIB for RA preamble transmission and are subframes from the set of valid UL subframes.

5. The method of claim 1, wherein the RA preamble transmission uses a first RA preamble format for a first repetition and uses a second RA preamble format for a second repetition.

6. The method of claim 1, wherein when the second number of repetitions is smaller than the maximum number of repetitions informed by the SIB, a second RA preamble transmission with the second number of repetitions is with a power that is larger than the power of a first RA preamble transmission with the second number of repetitions, and wherein when the second number of repetitions is equal to the maximum number of repetitions informed by the SIB, each RA preamble transmission with the second number of repetitions is with maximum power.

7. A method comprising:
    receiving, from a base station by a UE, a system information block (SIB) that informs a number of resource sets for random access (RA) preamble transmission in a resource from a resource set, wherein each resource set includes time, frequency, and code resources and is associated with a number of repetitions for a RA preamble transmission and with a maximum number of RA preamble transmissions;
    receiving, by the UE from the base station, the system information block;
    determining by the UE a number of repetitions for a transmission of a RA preamble and a corresponding resource set;
    transmitting by the UE the RA preamble for the number of repetitions in a resource from the resource set; and
    receiving, by the UE from the base station, a second message in response to the RA preamble transmission wherein the UE receives the second message for a number of repetitions that is indicated by downlink control information in a control channel scheduling the second message relative to a maximum number of repetitions that is informed by the SIB in association with the number of repetitions for the RA preamble transmission.

8. The method of claim 7, wherein after receiving the second message, the UE transmits to the base station a third message with a number of repetitions determined from an indication in the second message relative to the maximum number of repetitions that is informed in the SIB in association with the number of repetitions for the transmission of the RA preamble.

9. The method of claim 8, wherein the second message includes information for the configuration of resources for reception of a control channel conveying downlink control information that schedules a retransmission of the third message or schedules a reception of a fourth message.

10. The method of claim 7, wherein the SIB informs a configuration for the resources of the control channel transmission in association with the number of repetitions for the RA preamble transmission.

11. A User Equipment (UE) comprising:
    a receiver configured to receive from a base station a system information block (SIB) that informs a number of resource sets for random access (RA) preamble transmission in a resource from a resource set, wherein each resource set includes time, frequency, and code resources and is associated with a number of repetitions for a RA preamble transmission and with a maximum number of RA preamble transmissions;
    a controller configured to:
        determine a first number of repetitions for a transmission of a RA preamble, a corresponding first resource set, and a corresponding first maximum number of transmissions; and
        determine a second number of repetitions for a transmission of a RA preamble, a corresponding second resource set, and a corresponding second maximum number of transmissions wherein the second number of repetitions is larger than the first number of repetitions; and a transmitter configured to:
  transmit to the base station, in a resource from the first resource set and with the first number of repetitions, the RA preamble until the apparatus receives a response for a RA preamble transmission with the first number of repetitions or until the first maximum number of RA preamble transmissions is reached; and
  transmit to the base station, in a resource from the second resource set and with the second number of repetitions, the RA preamble after the first maximum number of RA preamble transmissions is reached.

12. The UE of claim 11, wherein for each resource set, the SIB further informs an association between a range of reference signal received power (RSRP) values and a number of RA preamble repetitions and the UE determines the first number of repetitions as the one corresponding to the range of RSRP values that includes a RSRP value measured by the apparatus.

13. The UE of claim 12, wherein a maximum number of RSRP ranges is four.

14. The UE of claim 11, wherein the SIB further informs of a set of valid UL subframes and the repetitions for a transmission of the RA preamble occur only in subframes that are subframes informed by a SIB for RA preamble transmission and are subframes from the set of valid UL subframes.

15. The UE of claim 11, wherein when the second number of repetitions is smaller than the maximum number of repetitions informed by the SIB, a second RA preamble transmission with the second number of repetitions is with a power that is larger than the power of a first RA preamble transmission with the second number of repetitions, and wherein when the second number of repetitions is equal to the maximum number of repetitions informed by the SIB, each RA preamble transmission with the second number of repetitions is with maximum power.

16. The UE of claim 11, wherein the RA preamble transmission uses a first RA preamble format for the first number of repetitions and uses a second RA preamble format for the second number of repetitions.

17. A User Equipment (UE) comprising:
  a receiver configured to receive from a base station
    a system information block (SIB) that informs a number of resource sets for random access (RA) preamble transmissions wherein each resource set is associated with a number of repetitions for a RA preamble transmission in a resource from the resource set and with a maximum number of RA preamble transmissions; and
  a second message in response to a RA preamble transmission wherein the second message is received for a number of repetitions that is indicated by downlink control information in a control channel scheduling the second message relative to a maximum number of repetitions that is informed by the SIB in association with the number of repetitions for the RA preamble transmission;
  a controller configured to determine a number of repetitions for a transmission of a RA preamble and a corresponding resource set; and
  a transmitter configured to transmit the RA preamble for the number of repetitions in a resource from the resource set.

18. The UE of claim 17, wherein the SIB informs a configuration for the resources of the control channel transmission in association with the number of repetitions for the RA preamble transmission.

19. The UE of claim 17, wherein in response to the reception of the second message, the transmitter is further configured to transmit a third message with a number of repetitions determined from an indication in the second message relative to a maximum number of repetitions that is informed in the SIB in association with the number of repetitions for the transmission of the RA preamble.

20. The UE of claim 19, wherein the second message includes information for the configuration of resources for reception of a control channel conveying downlink control information that schedules a retransmission of the third message or schedules a reception of a fourth message.

* * * * *